United States Patent
Kikuchi

(10) Patent No.: US 7,292,984 B2
(45) Date of Patent: Nov. 6, 2007

(54) METHOD OF PRODUCING VOICE DATA METHOD OF PLAYING BACK VOICE DATA, METHOD OF PLAYING BACK SPEEDED-UP VOICE DATA, STORAGE MEDIUM, METHOD OF ASSISTING MEMORIZATION, METHOD OF ASSISTING LEARNING A LANGUAGE, AND COMPUTER PROGRAM

(75) Inventor: Akio Kikuchi, Ehime (JP)

(73) Assignee: Global Success Co., Ltd., Ehime (JP)

( * ) Notice: Subject to any disclaimer, the term of this patent is extended or adjusted under 35 U.S.C. 154(b) by 800 days.

(21) Appl. No.: 10/419,102

(22) Filed: Apr. 21, 2003

(65) Prior Publication Data

US 2004/0015347 A1    Jan. 22, 2004

(30) Foreign Application Priority Data

Apr. 22, 2002  (JP)  ............................ 2002-119896
Oct. 11, 2002  (JP)  ............................ 2002-298307

(51) Int. Cl.
*G10L 21/06* (2006.01)
*G10L 15/06* (2006.01)

(52) U.S. Cl. ...................................... 704/260; 704/270

(58) Field of Classification Search ................ 704/260, 704/270
See application file for complete search history.

(56) References Cited

U.S. PATENT DOCUMENTS 5,169,342 A * 12/1992 Steele et al. ................. 434/112
6,853,962 B2 * 2/2005 Appleby ......................... 703/2

* cited by examiner

*Primary Examiner*—Susan McFadden
(74) *Attorney, Agent, or Firm*—Finnegan, Henderson, Farabow, Garrett & Dunner, L.L.P.

(57) ABSTRACT

A computer-assisted method of assisting a user of a computer to memorize includes steps of displaying an image indicating a content to be memorized, on a left-hand side of a computer screen for a particular period; displaying text data indicating language information related to the image displayed in this displaying step, on a right-hand side of the computer screen for a particular period; and setting, by the user of the computer, an overlap ratio to indicate a degree of overlap between an area in which images are displayed in the image displaying step and an area in which text data is displayed in the text data displaying step. Once the overlap ratio is set, the image displaying step and the text displaying step are performed in accordance with the set overlap ratio, and the image displaying step and the text displaying step are performed repeatedly, thereby assisting the user of the computer to memorize.

18 Claims, 63 Drawing Sheets

Fig. 1
(a) 
(b) 
(c) 
(d) 

Fig. 4
(a) 
(b) 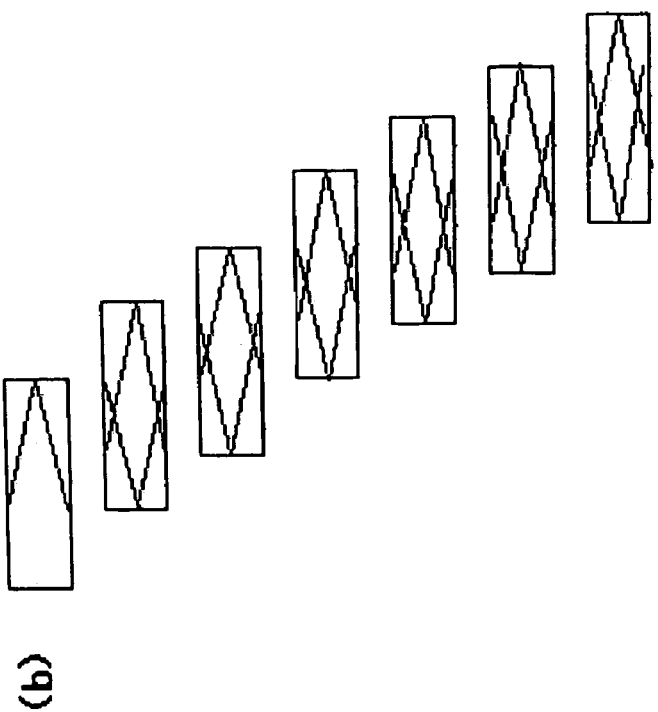
(c) 

Fig. 14

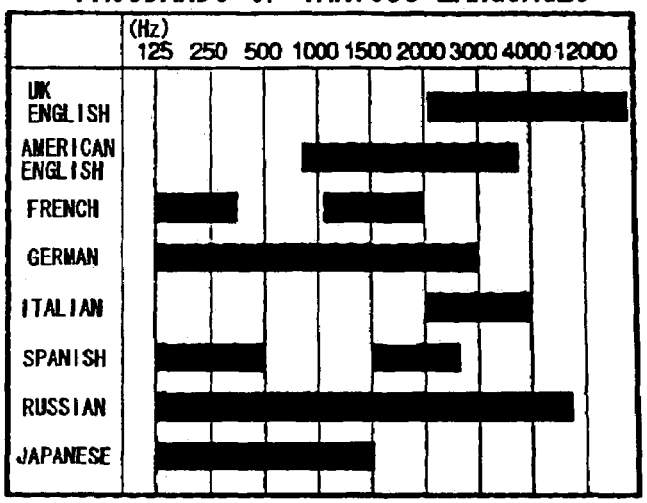

The passband of English lies higher than 2000 Hz. In contrast, the passbands of Spanish, French, and Japanese lye lower than 2000 Hz.
( "Most Effective Method of Learning Foreign Languages", Nippon Jitsugyo Publishing Co., Ltd.)

Why Japanese People Have a Difficulty in Learning English.

1. Ears of the Japanese are Tuned to Japanese Language
    Did you know how important characteristics of ears are in learning a foreign language? You will be surprised to see that the characteristics of ears make it difficult for Japanese people to acquire skill in speaking English even though they practice English for 6 years in junior and senior high schools and further 4 years in universities. The true reason for the difficulty for Japanese people to learn English is far from common sense. Sounds of Japanese words have frequency components lower than a few kHz. However, spoken English words include frequency components up to 10 kHz.
    Ears tuned to Japanese language cannot hear high-frequency sounds in English words, and thus Japanese people cannot understand English. In other words, when Japanese people practice English, it is necessary to adapt their ears so as to be capable of hearing English words. This fact should be understood by teachers who teach English, otherwise teachers cannot give their students skill of English 2. English is spoken at a high speed
    If you become used to hearing a sound at a very high speed, you will feel that English is spoken at a very low speed even if it is actually spoken at a high speed.

3. Listening English for much longer hours is necessary
    It is important to practice English periodically in an efficient manner. If a 1000-hour listening drill is played back at a speed 4 times higher than a normal speed, the entire drill can be finished in 250 hours, and the drill can be practiced 4 times in 1000 hours. The 4-time repetition of the drill can result in better memory than only a single-time practice of the drill.

The digital quick player provides three effects described above, and thus it is a really ideal tool for learning languages.

TEXT   AUDIO DATA

| 山 | SAN |
|---|---|
|  |  |
|  |  |

CHINESE

| 산 | SAN |
|---|---|
|  |  |
|  |  |

KOREAN

IMAGE   CATEGORY CODE
①  ②  ③  ④  ⑤

| IMAGE | ① | ② | ③ | ④ | ⑤ |
|---|---|---|---|---|---|
| ▓ | 1 | 1 | 1 |  |  |
| ▓ | 2 | 1 | 2 |  |  |
|  | 3 | 2 | 1 |  |  |
|  | 4 | 2 | 2 |  |  |

| 山 | YAMA |
|---|---|
|  |  |
|  |  |

JAPANESE

- ③ MINOR CATEGORY (ATTRIBUTE)
- ② MIDDLE CATEGORY (ATTRIBUTE)
- ② MAIN CATEGORY (ATTRIBUTE)
- ① SERIAL NUMBER

| MOUNTAIN | MOUNTAIN |
|---|---|
|  |  |
|  |  |

ENGLISH

| ROPA | ROPA |
|---|---|
|  |  |
|  |  |

RUSSIAN

| LA MONTAGNE | LA MONTAN |
|---|---|
|  |  |
|  |  |

FRENCH

*FIG. 35*

METHOD OF PRODUCING VOICE DATA
METHOD OF PLAYING BACK VOICE DATA,
METHOD OF PLAYING BACK SPEEDED-UP
VOICE DATA, STORAGE MEDIUM,
METHOD OF ASSISTING MEMORIZATION,
METHOD OF ASSISTING LEARNING A
LANGUAGE, AND COMPUTER PROGRAM

BACKGROUND OF THE INVENTION

1. Field of the Invention

The present invention relates to a method of, by using a computer, producing speeded-up voice data or slowed-down data, a method of playing back such voice data, a method of assisting a user of a computer to memorize or learn a language, and a computer program for executing such a method.

2. Description of the Related Art

It is known in the art to play back voice data at a high speed (2, 3, or 4 times higher than the normal speed) using a dedicated tape recorder. A flash card is also known as a tool of learning a language. For example, a teacher of English shows an English word written on a thick paper card with a size of about 10 cm in height and 25 cm in width to pupils for a very short time, and pupils pronounces the English word shown. It is also known to employ a card game in teaching English to little children. In this teaching technique, pictures and corresponding English words are drawn on respective cards, and children look for a particular card.

However, in the conventional quick playback system, voice data recorded on a tape is processed, and thus this technique is not suitable for use with a multimedia system such as that using the Internet.

The inventor of the present invention has read a scientific newspaper article entitled "Eyes cheat Ears" (Nihon Keizai Shimbun, Sunday, Jun. 23, 2002, p. 28). In this article, various examples of cheating between an image and a sound are described. For example, if a sound is generated twice each time light is emitted once, human eyes misperceive that light is emitted twice. In another example, after seeing a rectangular image moving away repeatedly, a sound with a constant volume is misperceived as increasing in volume. In a moving picture in which two balls move toward each other and pass each other, if a collision sound is generated, human eyes misperceive that the two balls are repelled from each other. From this article, the inventor of the present invention has gotten an excellent idea that effects of quick playback can be enhanced by displaying an image when a voice is being played back at an increased speed.

The inventor also has got idea of realizing flash cards on a computer thereby realizing an improved method of assisting memorization. Furthermore, the inventor has got an idea of improving a manner of displaying an image in a computer-assisted memorization system, by applying cerebric physiological effects, such as those described for example in "Brain System" (edited by Makoto Iwata and published by Natsume-sha Publishing Co.).

The description on pages 74 to page 81 of "Brain System" published by Natsume-sha can be summarized as follows. A right-hand portion of a brain is associated with left-hand portions of a human body, while a light-hand portion of the brain is associated with right-hand portions of the human body. Information from a left eye is treated by the right-hand portion of the brain, while information from a right eye is treated by the left-hand portion of the brain. Processing associated with languages is performed by the left-hand portion of the brain, while processing associated with images is performed by the right-hand portion of the brain. Many examples of experiments of manners in which brains work are also described. Of those, a description of effects of showing an image to an examinee for a very short time such as 0.1 sec or shorter is instructive.

The inventor of the present invention has got an idea of realizing a method of assisting a user to memorize a great amount of information in a short time, on the basis of the quick playback technique and the cerebric physiological effects.

SUMMARY OF THE INVENTION

An object of the present invention is to provide a quick playback method including a digital process using a computer. Another object of the present invention is to provide a method of enhancing effects of quick playback by using an image. Another object of the present invention is to provide a computer-assisted method of assisting a user to memorize a large amount of information.

According to an aspect of the present invention, to achieve the above objects, there is provided a method of producing speeded-up voice data by digitally processing original voice data on a computer, the method comprising: a block sampling step of producing a plurality of blocks with an equal length by sampling the original voice data at a predetermined sampling frequency; a fading-in/out step of fading in or out end portions of the respective blocks produced in the block sampling step; and a block-edge superimposing step of superimposing end portions of respective adjacent blocks subjected to fading-in/out in the fading-in/out step.

In the fading-in/out step, the fading-in/out of end portions of blocks may be performed by multiplying the end portions of the blocks by a function.

Preferably, in the fading-in/out step, each end portion of blocks is faded in or out over a length equal to the length of each end portion to be superimposed in the block-edge superimposing step.

The length of each of end portions of respective adjacent blocks superimposed in the block-edge superimposing step may be set to be equal to $(n-1)/n$ times the block length thereby producing voice data speeded up by a factor n times the normal speed (wherein n is a rational number equal to or greater than 1).

According to another aspect of the present invention, there is provided a method of producing voice data for use in slow playback, the method comprising a block sampling step of producing a plurality of blocks with an equal length by sampling the original voice data at a predetermined sampling frequency; and a block insertion step of inserting a new block between adjacent blocks produced in the block sampling step.

The method may further comprise the steps of fading in or out each end portion of blocks to be inserted in the block insertion step; and superimposing faded-in/out end portions of respective blocks with adjacent blocks thereby producing slowed-down voice data.

The fading-in/out of end portions of blocks may be performed by multiplying the end portions of the blocks by a function.

Preferably, the length of each block inserted in the block insertion step is equal to the length of each faded-in/out end portion of adjacent blocks.

The length of each block inserted in the block insertion step may be set to be equal to m times the length of each block sampled in the block sampling step thereby producing voice data for use in slow playback at a speed equal to 1/(1+m) times the normal speed (wherein m is a rational number equal to or smaller than 1).

In playing back the produced speeded-up voice data, it is preferable to first playing back voice data speeded up by a smaller factor, and then playing back voice data speeded up by a greater factor, and it is also preferable to first playing back voice data speeded up by a greater factor, and then playing back voice data speeded up by a smaller factor.

Furthermore, when the speeded-up voice data is played back, it is also preferable to play back a natural sound at a normal speed such that the natural sound is superimposed on the speeded-up voice data.

When slowed-down voice data is played back, it is preferable to first play back voice data slowed down by a greater slowdown factor and then play back voice data slowed down by a smaller slowdown factor. Alternatively, it is also preferable to first play back voice data slowed down by a smaller slowdown factor and then play back voice data slowed down by a greater slowdown factor.

Furthermore, when the slowed-down voice data is played back, it is also preferable to play back a natural sound at a normal speed such that the natural sound is superimposed on the slowed-down voice data A user of a computer may install, onto his/her computer from a storage medium, a computer program for executing a method of producing speeded-up or slowed-down voice data thereby making it possible for the user to produce speeded-up or slowed-down voice data from voice data he/she owns.

For use by end users who do not use a computer, a storage medium on which speeded-up voice data has been stored using a proper program may be provided.

When speeded-up voice data is played back, it is further preferable to display an image or text linked to the speeded-up voice data.

According to another aspect of the present invention, there is provided a method of playing back speeded-up voice data, comprising the steps of: playing back the speeded-up voice data while playing back a natural sound at a normal speed in a superimposed fashion; and displaying a moving image corresponding to the speeded-up voice data in synchronization with the speeded-up voice data.

According to still another aspect of the present invention, there is provided a method of playing back speeded-up voice data, comprising the steps of equalizing the speeded-up voice data such that resultant equalized voice data has frequency components in a range which would be hearable by an unborn baby in a womb; and playing back the equalized speeded-up voice data.

According to still another aspect of the present invention, there is provided a method of playing back speeded-up voice data, comprising the steps of equalizing the speeded-up voice data so as to emphasize frequency components in a range used by a foreign language; and playing back the equalized speeded-up voice data.

According to still another aspect of the present invention, there is provided a method of playing back speeded-up voice data, comprising the steps of playing back the speeded-up voice data while displaying an image moving in a scene of a natural environment.

In this method of playing back speeded-up voice data, the speed at which the image moves in the scene of the natural environment may be increased depending on the speed of the speeded-up voice data.

According to still another aspect of the present invention, there is provided a computer-assisted method of assisting a user to memorize, comprising the steps of: displaying an image indicating a content to be memorized, on a left-hand side of a computer screen for a predetermined period of time; and displaying text data indicating language information related to the image displayed in the image display step, on a right-hand side of the computer screen for a predetermined period of time, wherein the above two steps are performed repeatedly to successively display a plurality of images and text data thereby assisting the user of the computer to memorize.

According to still another aspect of the present invention, there is provided a computer-assisted method of assisting a user to memorize, comprising the steps of: displaying an image indicating a content to be memorized, on a left-hand side of a computer screen for a predetermined period of time; displaying text data indicating language information related to the image displayed in the image display step, on a right-hand side of the computer screen for a predetermined period of time, and playing back a voice pronouncing the text data displayed in the text data displaying step, wherein the above three steps are performed repeatedly to successively display a plurality of images and text data and play back voices thereby assisting the user of the computer to memorize.

The method may further comprise a time parameter adjustment step of adjusting, by the user of the computer, a cycle time of repeatedly displaying images in the image display step, the length of an image display period during which each image is displayed in the image display step, the timing of starting displaying text data in the text display step, and the length of a text display period during which text data is displayed in the text data displaying step, wherein once the adjustment in the time adjustment step is performed by the user of the computer, displaying of the image in the image display step and displaying of the text data in the text data display step are performed in accordance with the conditions set in the time adjustment step.

Alternatively, the method may further comprise a time parameter adjustment step of adjusting, by the user of the computer, a cycle time of repeatedly displaying images in the image display step, the length of an image display period during which each image is displayed in the image display step, the timing of starting displaying text data in the text display step, the length of a text display period during which text data is displayed in the text data displaying step, and the timing of starting playing back the voice in the voice playback step, wherein once the adjustment in the time adjustment step is performed by the user of the computer, displaying of the image in the image display step, displaying of the text data in the text data display step, and playback of the voice in the voice playback step are performed in accordance with the conditions set in the time adjustment step.

The method may further comprise a voice playback speed adjustment step of adjusting, by the user of the computer, the speed of playing back the voice in the voice playback step, wherein once the adjustment in the voice playback speed adjustment step is performed by the user of the computer, playback of the voice in the voice playback step is performed in accordance with the condition set in the adjustment step.

The method may further comprise an area overlap ratio setting step of setting, by the user of the computer, an area overlap ratio indicating the degree of overlapping between an area in which images are displayed in the image display step and an area in which text data is displayed in the text display step, wherein once the setting in the area overlap ration setting step is performed by the user of the computer, displaying of the image in the image display step and displaying of the text data in the text data display step are performed in accordance with the condition set in the setting step.

The method may further comprise playing back a natural sound or music such that the natural sound or music is superimposed on the voice played back at the adjusted speed in the voice playback step.

In this method, the plurality of image data may be stored in the form of a database, and the method may further comprise the step of extracting image data categorized by synonym, antonym, grade, type, or the like, wherein the extracted image data may be displayed in the steps performed repeatedly.

When the method of assisting a user to memorize is being executed, a natural sound or music may be played back. The method of assisting a user to memorize may be executed on a computer.

In this method of assisting a user to memorize, the computer may be included in a personal digital assistance (PDA) device, a game machine, or a similar device. The method of assisting a user to memorize may be employed to assist a user to learn a language.

BRIEF DESCRIPTION OF THE DRAWINGS

FIGS. 1A to 1D are conceptual diagrams illustrating a manner of producing speeded-up voice data;

FIGS. 4A to 4C are diagrams conceptually showing a process of producing voice data speeded up by a factor of 3;

FIG. 14 is a diagram showing passbands of various languages;

FIG. 35 is a diagram conceptually showing image data, text data, and voice data, which are linked to each other and used in the method of assisting a user to memorize or learn a language according to the present invention;

DESCRIPTION OF THE PREFERRED EMBODIMENTS

Figure 63:
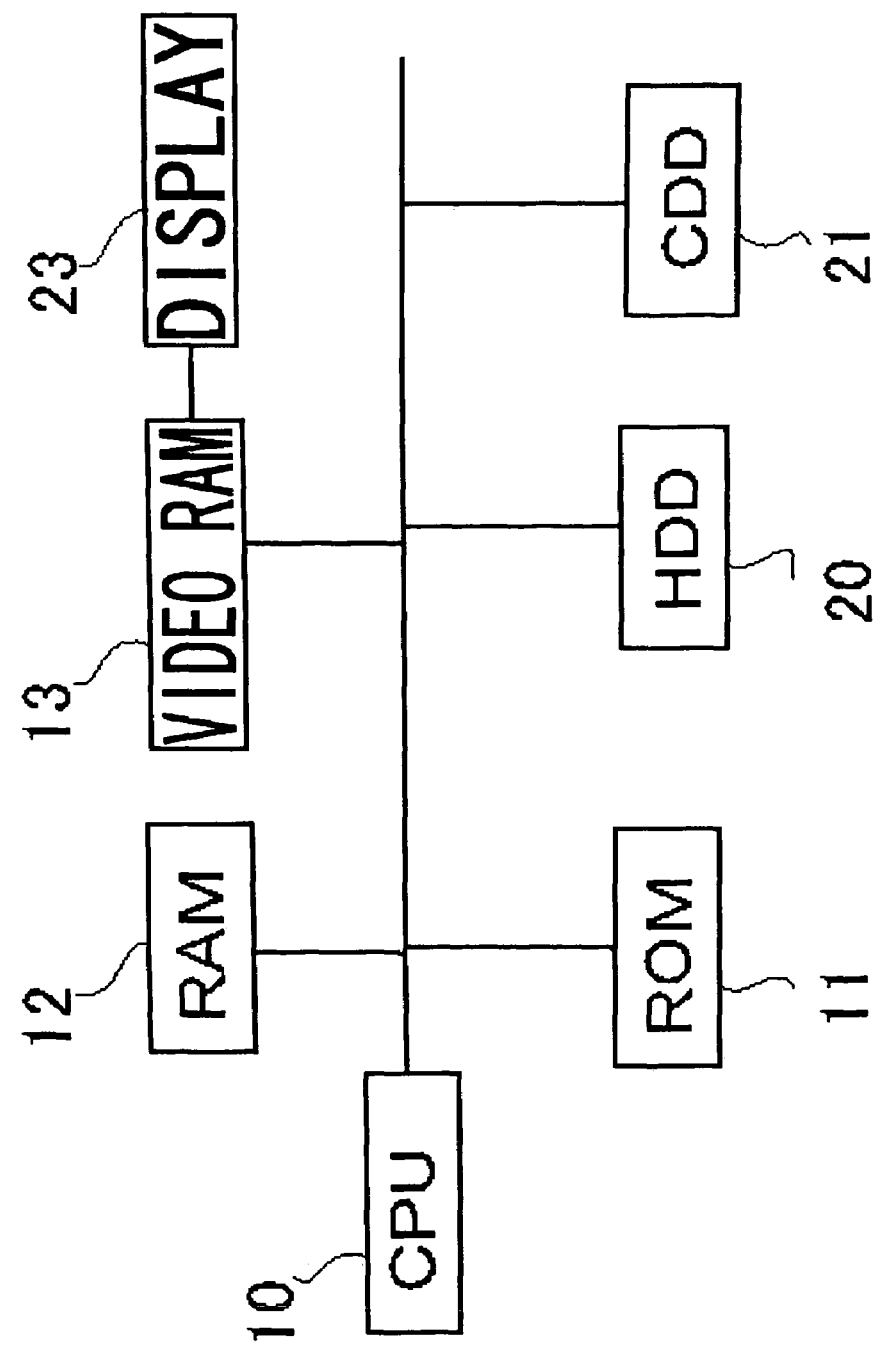
FIG. 63 is a block diagram showing an example of a hardware configuration of a computer used to realize the method of assisting memorization according to the present invention.

The present invention is described in further detail below with reference to preferred embodiments in conjunction with the accompanying drawing. FIG. 63 is a block diagram showing an example of a computer for executing a method of producing voice data, a method of playing back voice data, a method of playing back speeded-up voice data, or a method of assisting a user to memorize or learn a language, according to the present invention. As shown in FIG. 63, the computer includes a central processing unit (CPU) 10. The computer further includes a read only memory (ROM) 11, a random access memory (RAM) 12, a video RAM 13, a hard disk drive (HDD) 20, and a CD-ROM drive (CDD) 21, wherein those components are connected to the CPU 10 via a bus. The computer also includes a display 23 connected to the video RAM 13. As for basic software for this computer, for example, basic software for personal computer available from Microsoft Corp. in the USA may be employed. The CD-ROM drive 21 is used to install a program onto the computer and is also used to read background music data, to be used in the present invention, from a music CD.

FIGS. 1A to 1D are conceptual diagrams illustrating a manner of producing speeded-up voice data. FIG. 1A shows blocks produced by sampling original voice data at, for example, 11 kHz and combining a few hundred (for example, 400 to 1000) sampled data into each block. All blocks are equal in size. FIG. 1B shows a manner in which adjacent blocks are partially overlapped with each over by a particular amount. To produce voice data speeded up by a factor of 2, one-half of each block is overlapped with adjacent blocks. On the other hand, to produce voice data speeded up by a factor of 3, two thirds of each block is overlapped with adjacent blocks. In general, if $(n-1)/n$ of each block is overlapped with adjacent blocks, voice data speeded up by a factor of n is obtained. FIG. 1C shows a manner in which each block is faded in or out in its end portions to be overlapped. By performing fading in/out, each block is converted such that the amplitude becomes zero at both ends and the amplitude gradually increases toward the center of the block. The fading in/out may be performed by multiplying a linear function or another known function such as a trigonometric function or a logarithmic function.

FIG. 1D shows a manner in which the faded-in/out blocks shown in FIG. 1C are connected to each other in an overlapped fashion thereby producing speeded-up voice data. The overlapping causes the total length of data to decrease, and thus the resultant data can be played back at a corresponding high speed.

Figure 2:
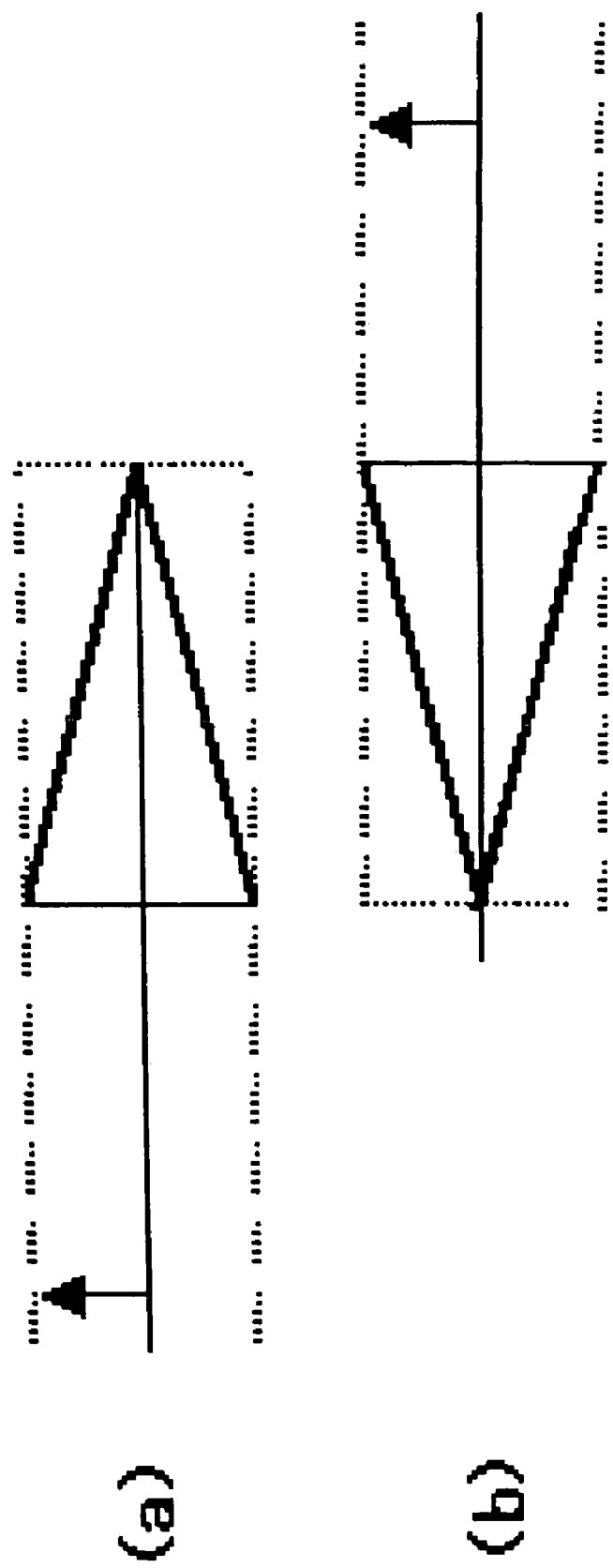
FIGS. 2A and 2B are conceptual diagrams showing a fading-in/out process.

FIGS. 2A and 2B show a manner in which the fading in/out is performed. That is, FIG. 2A shows a manner in which a trailing end portion of a block is faded out, and FIG. 2B shows a manner in which a leading end portion of a block is faded in. In FIGS. 2A and 2B, the fading in/out is performed by multiplying an original amplitude denoted by arrows in the figures by a particular function. In the example shown in FIGS. 2A and 2B, a linear function, which increases from zero at an edge of each block to 1 at an opposite end of the overlapping interval, is employed as the particular function. In a case in which the fading in/out is performed using a trigonometric function, $(1+\cos x)/2$ may be employed for fading out at the end of each block, and $(1-\cos x)/2$ may be employed for fading in at the start of each block (wherein, for simplicity, both end portions, to be overlapped, of each block are assumed to have a length equal to $\pi$). Herein, $(1-\cos x)/2$ and $(1+\cos x)/2$ are functions which monotonically increase from 0 to 1 or decrease from 1 to 0 in an interval of x from 0 to $\pi$.

Figure 3:
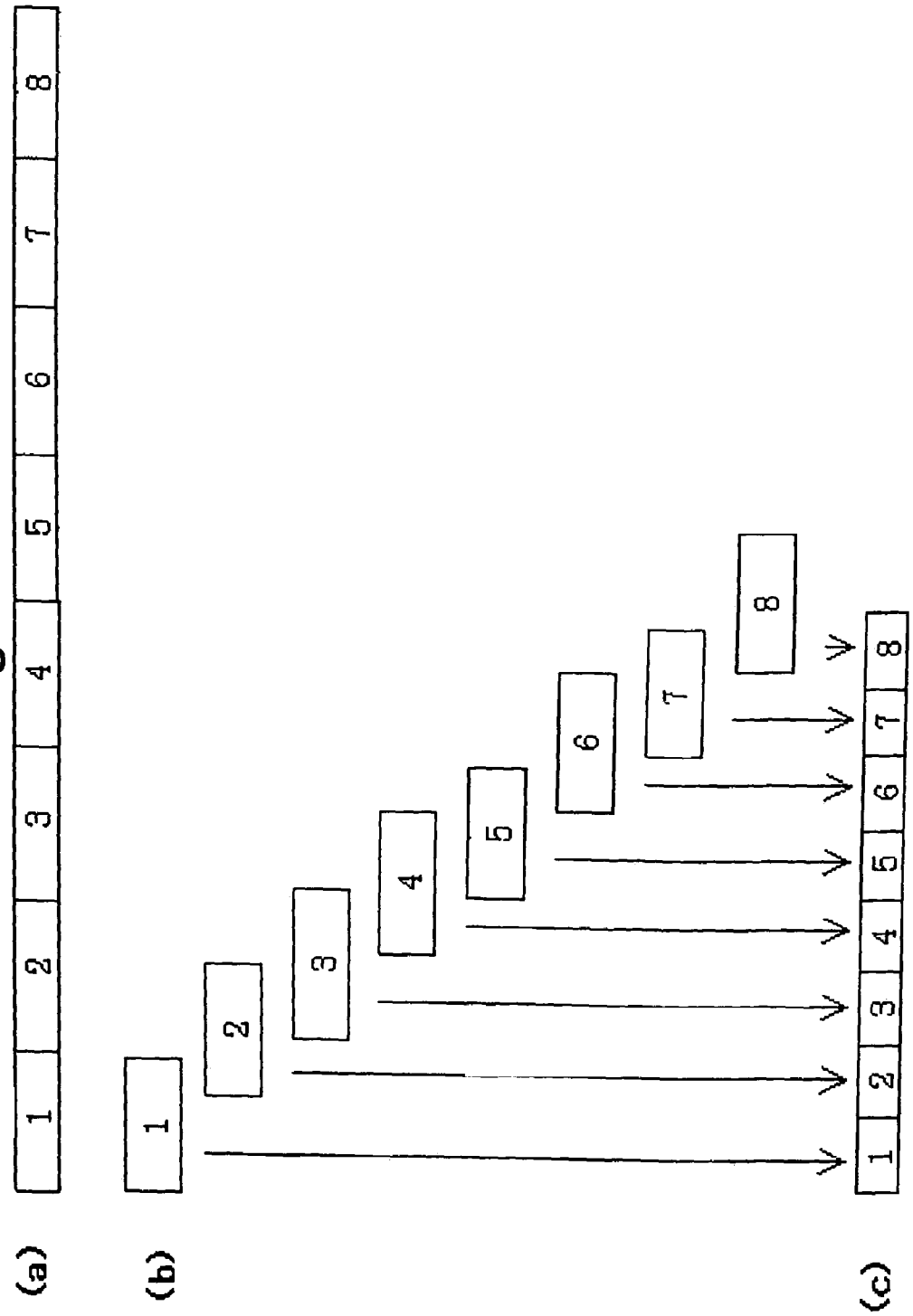
FIGS. 3A to 3C are diagrams conceptually showing a process of producing voice data speeded up by a factor of 2.

FIGS. 3A to 3C are diagrams conceptually showing a manner in which voice data speeded up by a factor of 2 is produced. To produce voice data speeded up by a factor of 2, as described earlier, one-half of each block is overlapped with adjacent blocks. FIG. 3A shows a manner in which original data is sampled and grouped into blocks with an equal length. FIG. 3B shows a manner in which one-half of each block is overlapped with adjacent blocks. FIG. 3C shows resultant speeded-up voice data produced in the above-described manner.

FIGS. 4A to 4C are diagrams conceptually showing a manner in which voice data speeded up by a factor of 3 is produced. To produce 3× speeded-up voice data, two thirds of each block is overlapped with adjacent blocks. FIG. 4A shows a manner in which original data is sampled and grouped into blocks with an equal length. FIG. 4B shows a manner in which two thirds of each block is overlapped with adjacent blocks. FIG. 4C shows resultant speeded-up voice data produced in the above-described manner. The manner of producing voice data speeded up by a factor of 2 or 3 has been described above. Similarly, voice data speeded up by a greater factor such as 4 or 5 can also be produced. Such voice data speeded up by a factor of 4 or 5 can have quality high enough for practical use. Furthermore, it is also possible to produce voice data speeded-up by an arbitrary factor between the above-described speed-up factors, as long as the factor is equal to a rational number. For example, the speed-up factor of voice data may be set to 2.7, 3.8, or any more precisely specified value. Also in the case in which such a value is specified as the speed-up factor of voice data, the block overlap ratio may be given by $(n-1)/n$.

Figure 5:
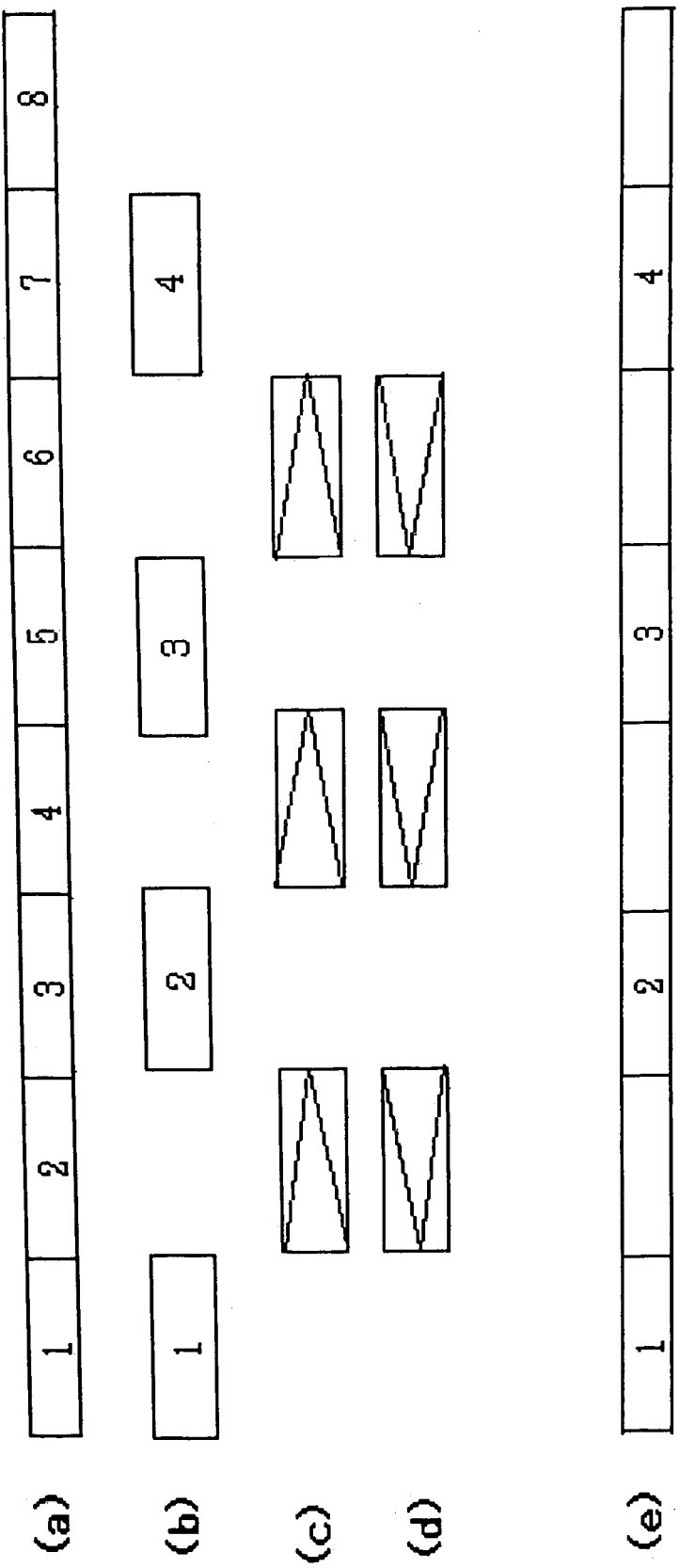
FIGS. 5A to 5E are diagrams conceptually showing a process of producing voice data speeded up by a factor of 0.5 (that is, slowed down by a factor of 2)

FIGS. 5A to 5E are diagrams conceptually showing a manner in which voice data speeded up by a factor of 0.5 (that is, slowed down by a factor of 2) is produced. To produce slowed-down voice data, original data is first sampled and grouped into blocks as shown in FIG. 5A. Thereafter, spaces with a particular length are inserted between respective adjacent blocks as shown in FIG. 5B. Furthermore, as shown in FIG. 5C, a part with a particular length of each immediately preceding block is copied and fade-out processing is performed on the copied part, and the resultant part is put in a corresponding space. Similarly, as shown in FIG. 5D, a part with a particular length of each immediately following block is copied and fade-in processing is performed on the copied part, and the resultant part is put in a corresponding space. If blocks shown in FIGS. 5B, 5C and 5D are superimposed on each other, slowed-down voice data is produced as shown in FIG. 5E. Herein, in FIG. 5B, if the length of each space created between adjacent original blocks is set to be m times the length of each original block (where m is a rational number equal to or smaller than 1), the speed factor of the resultant voice data becomes equal to $1/(1+m)$. For example, if m is set to 1, the speed factor becomes equal to 0.5. If m is set to 0.5, the speed factor becomes 0.67. In a case in which m is set to 0.25, the speed factor becomes 0.8.

Figure 6:
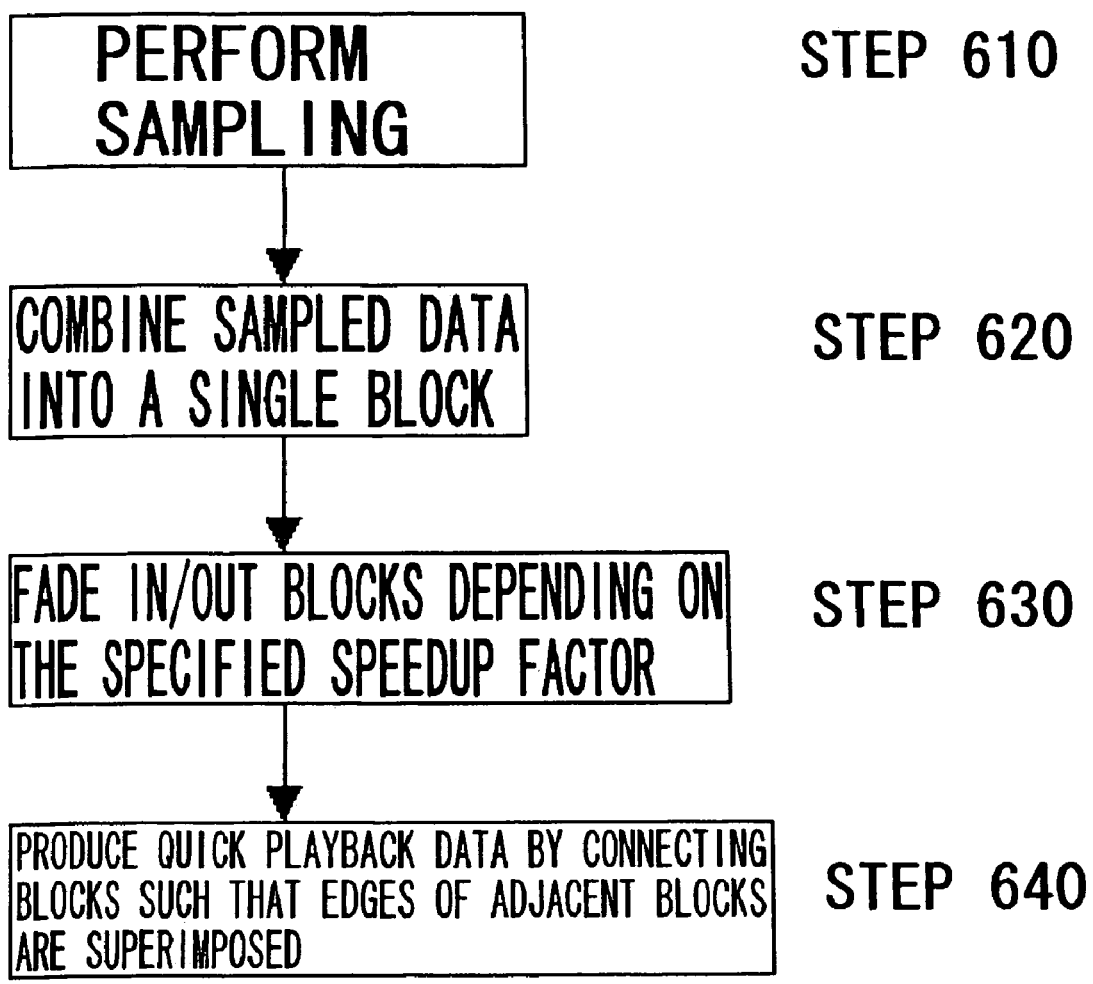
FIG. 6 is a flow chart showing a process of speeded-up voice data.

FIG. 6 is a flow chart showing a process of producing speeded-up voice data. In step 610, original voice data is sampled. In step 620, sampled data are grouped into blocks. In step 630, end portions of each block are faded in or out, depending on a selected speed-up factor. In step 640, blocks are connected to each other such that end portions of adjacent blocks are overlapped with each other thereby producing speeded-up voice data.

Figure 7:
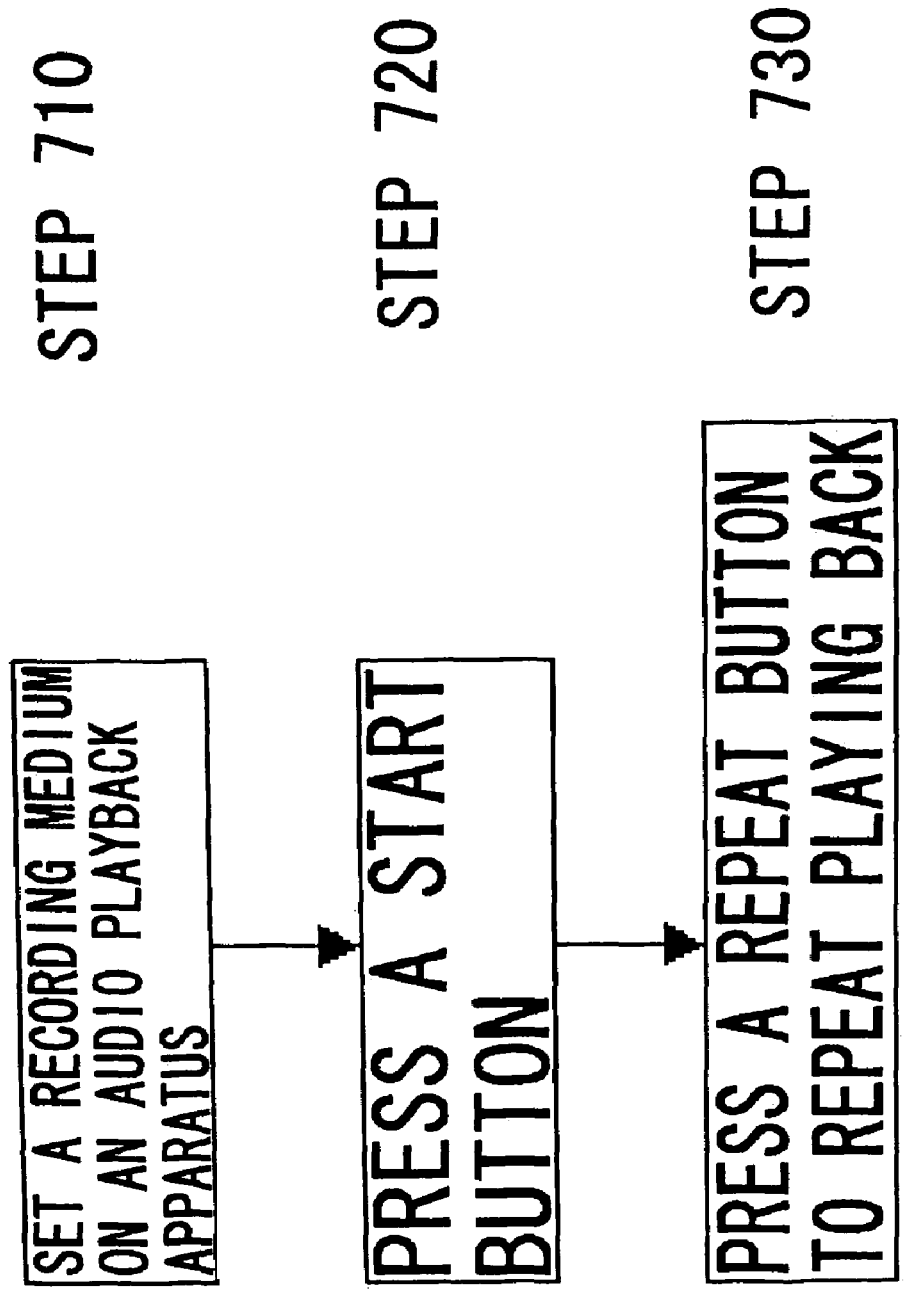
FIG. 7 is a flow chart showing a process of playing back speeded-up voice data stored on a storage medium.

FIG. 7 is a flow chart showing a process of playing back speeded-up voice data stored on a storage medium. In a case in which speeded-up voice data already stored on storage medium according to the present invention is played back by an end user, the storage medium is first set on an audio player (such as a music CD player) (step 710). A start button is then pressed (step 720). If it is desired to play back the speeded-up voice data repeatedly, a repeat button is pressed (step 730).

Figure 8:
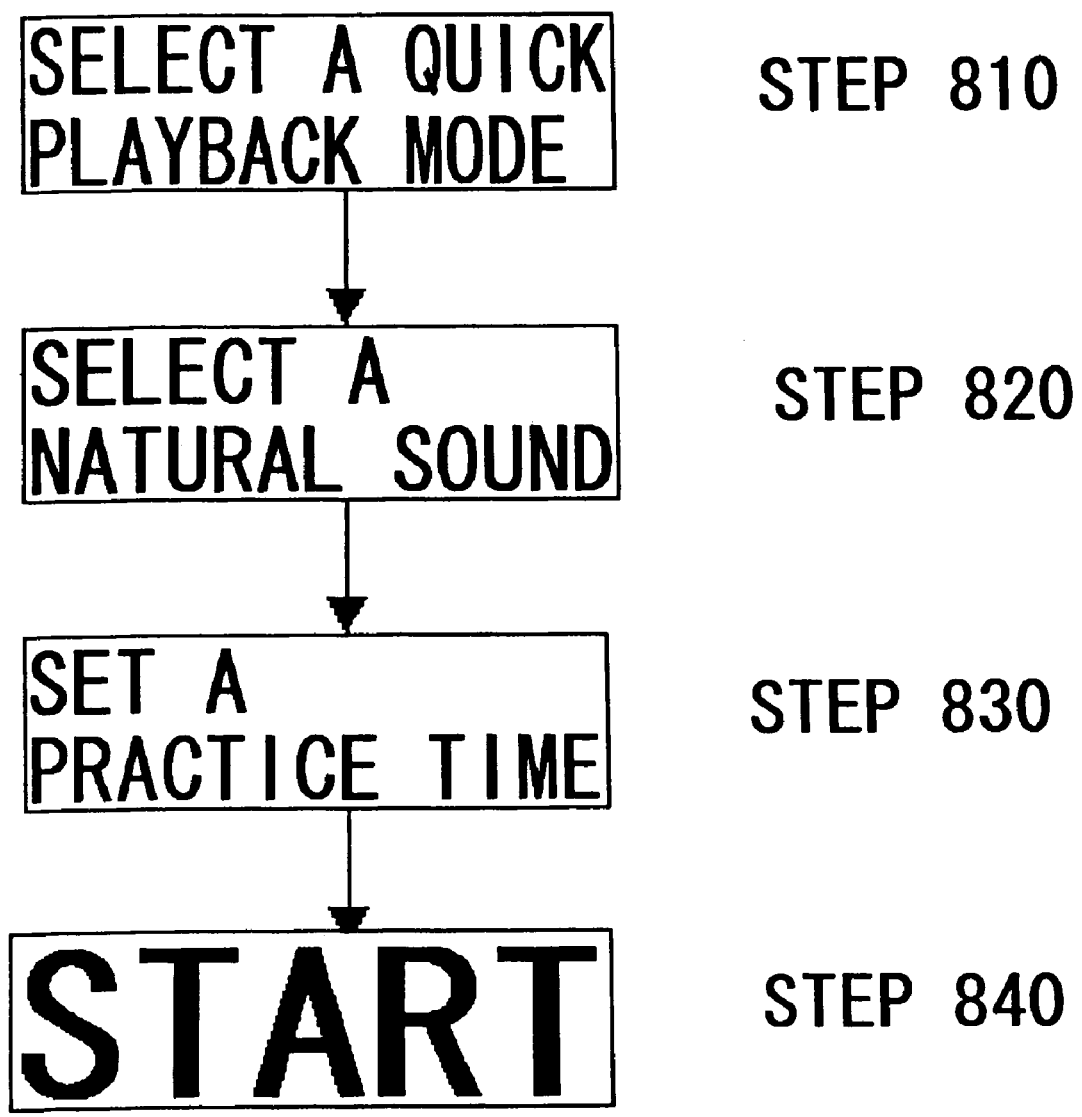
FIG. 8 is a flow chart showing a process of setting conditions under which to play back speeded-up voice data to perform practice by executing a computer program.

FIG. 8 is a flow chart showing a process of setting conditions under which to play back speeded-up voice data to perform practice executing a computer program. In this process, the setting is performed by an end user depending on various factors such as a grade or a degree of progress in practice. The process includes selecting a quick playback mode (step 810), selecting a natural sound (step 820), setting a practice time (step 830), and starting (step 840). The respective steps are described in detail below with reference to FIG. 9.

Figure 9:
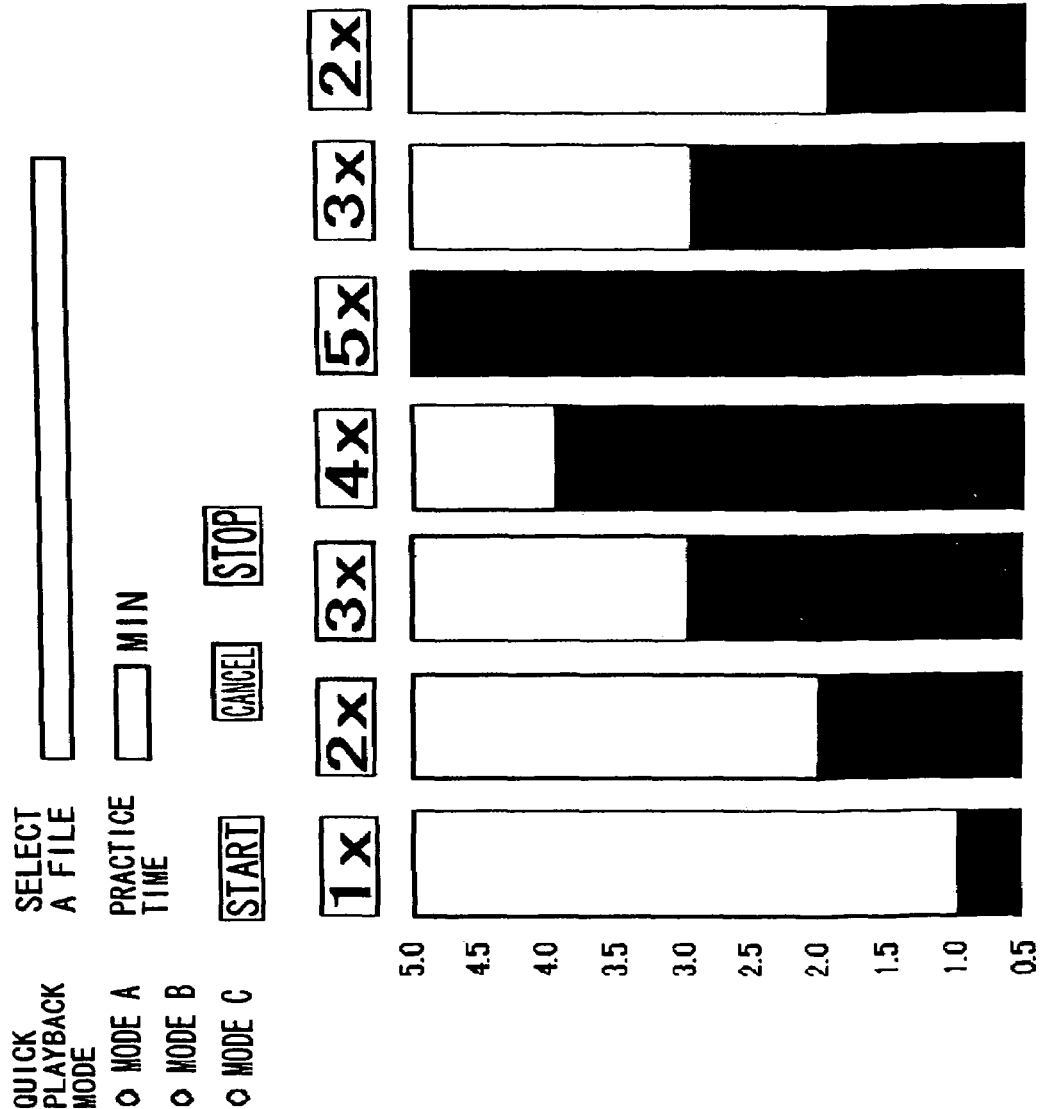
FIG. 9 is a hard copy of a screen for setting conditions under which to play back speeded-up voice data to perform practice by executing a computer program.

FIG. 9 is a hard copy of a computer screen used to set conditions under which to play back speeded-up voice data to perform practice by executing a computer program. Three sets of conditions frequently used by the user are registered as quick playback modes A, B, and C, respectively. For example, playback mode A may be defined such that playback is started from a 3× speed and the speed is successively decreased to 2.5×, 2×, and 1.5×, and playback mode B may be defined such that playback is started from a 1× speed and the speed is successively increased 1.5×, 2×, 2.5×, and 3× and then decreased to a 2× speed. A desired playback mode can be specified by selecting a corresponding radio button on the screen. After voice data is selected by inputting a file name of an voice data file (or selecting by means of browsing) and other conditions associated with a practice time, a speed-up factor, etc., if a start button is clicked, the program executes the process of producing speeded-up voice data and playing back it in accordance with the specified conditions.

The natural sounds selectable by a user may include a wind sound, a wave sound, a bird's singing, and a sound in a wood. It is preferable to play back a natural sound at a normal speed regardless of whether a voice is speeded up or slowed down. The inventor of the present invention has experimentally found that superimposing of a natural sound at the normal speed on a voice played back at an increased speed makes it easier for a user to listen to the speeded-up voice. From this point of view, it is desirable that, after speeded-up voice data is produced, a natural sound at a normal speed is superimposed on the speeded-up voice data. Natural sounds include frequency components which are not included in human voices. Thus, it is desirable that an audio system including an amplifier and a speaker used to reproduce sounds be capable of reproducing frequency components over a wide range up to 25 Hz or higher.

Voice data speeded-up by various factors such as 1, 2, 3, and 4 may be produced in accordance with the present invention and resultant voice data may be stored on a storage medium such as a CD-ROM in such a manner that speeded-up voice data are stored in the same order as the order in which voice data are played back, and the resultant storage medium may be supplied to an end user. Although many beginners can easily listen to voice data speeded up by a factor up to about 2.7, voice data speeded up by a factor higher than 2.7 is too fast for most beginners. Thus, to make it easier for users to listen to speeded-up voices, it is desirable to start playback from a normal speed and increase the speed step by step to 2×, 3×, and 4× and then reduce the speed to 3×, 2×, and finally to 1× at the end of the playback. Thus, it is desirable that the speed of voice data stored on a CD-ROM be varied in the above-described manner.

When a voice is played back, it is preferable to play back a natural sound (such as a wind sound, a wave sound, a sound of a stream, or a bird's singing) at a normal speed such that the natural sound is superimposed on the voice, because the superimposed natural sound causes the speeded-up voice to be input into a subconscious layer of a human brain thereby enhancing memorization. Another advantage of superimposing a natural sound is that the human brain of a user is stimulated and the user becomes more active in practicing. Conversely, in a case in which no superimposed natural sound is played back, the speeded-up voice causes the user to become nervous. A natural sound superimposed on a speeded-up voice allows a user to easily accept the voice without having to make an effort to consciously listen to the voice and thus without having a feeling that the voice is played back at an increased speed.

Instead of using audio data for quick playback stored on a CD-ROM, if speeded-up voice data is produced by using a program installed on a computer of an end user, the speed-up factor can be set to not only an integer but also any desired value in steps of, for example, 0.5 or 0.1. How quickly users become accustomed to listening to speeded-up voices depends on users. Parameters such as the practice time and the speed-up pattern can be adjusted by users depending on the degree of accustomness.

The current multimedia technology allows sounds to be played back in synchronization with associated text information and/or image information. If speeded-up voice data is played back in synchronization with associated with text information and/or image information, multiplier effects of the combination of quick listening and quick reading can be obtained.

Figure 10:
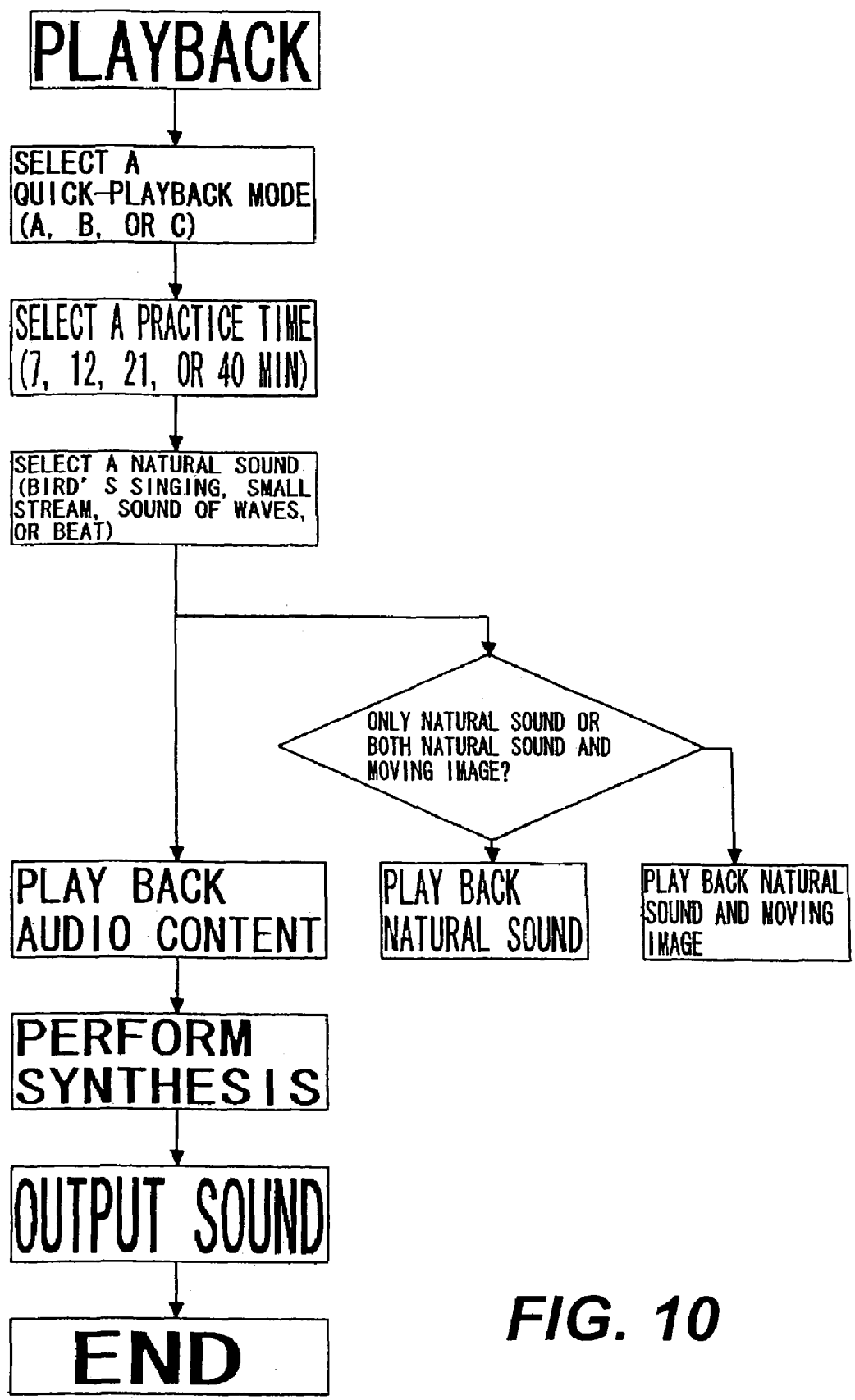
FIG. 10 is a flow chart showing a process of displaying a moving image of, for example, a bird.

FIG. 10 is a flow chart showing a process of displaying a moving image of, for example, a bird. As for the moving image used herein, it is desirable to employ a moving image in a scene of a natural environment. Examples of desirable moving images include a singing bird, a sea, and a small stream. A specific desirable example is a moving image of a natural scene taken through a window of a car running in a natural environment. In this case, it is more desirable that the running speed of the car is increased in synchronization with increasing speed of voice data.

Figure 11:
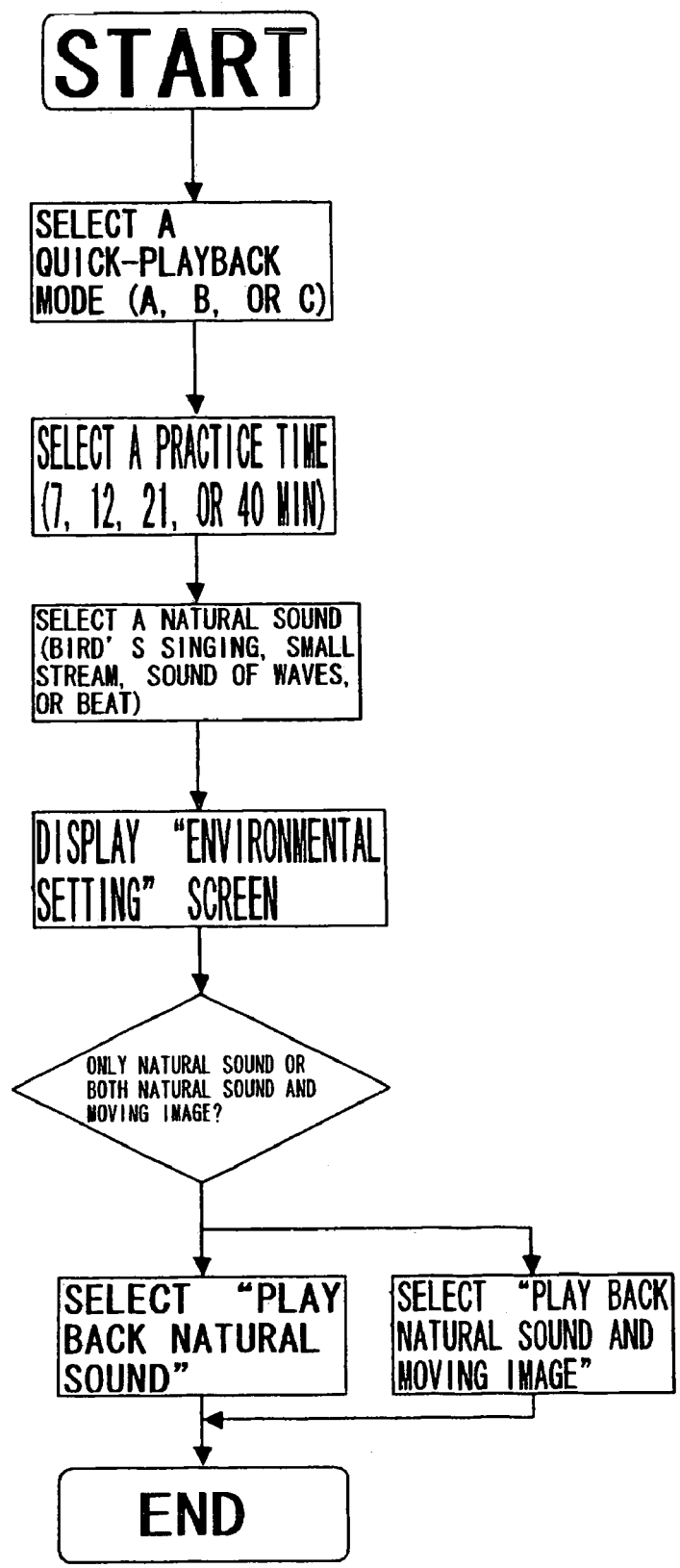
FIG. 11 is a flow chart showing a process of setting a mode.

FIG. 11 is a flow chart of a process of setting a mode. Table 1 shows specific examples of files of natural sounds and moving images. Table 2 shows an example of a folder structure in which files of natural sounds and moving images are stored.

TABLE 1

Example of files

|  | file of natural sound | file of moving image |
|---|---|---|
| bird | bird.wav | bird.mpeg |
| river | river.wav | river.mpge |
| sea | sea.wav | sea.mpeg |
| heart | heart.wav | heart.mpeg |

TABLE 2

Example of folder structure

| Folder: | Glabo |
|---|---|
| Subfolder for storing natural sounds: | Backsound |
| Subfolder for storing moving images: | Movie |

In the conventional technique, when speeded-up voice data is played back, an alpha wave is produced by superimposing only a natural sound. The alpha wave can also be produced by visual information superimposed on speeded-up voice data. Thus, if a natural moving image with 1/f fluctuations is displayed on a computer screen in addition to a natural sound, visual and audio information allows the alpha wave to be produced more effectively. Furthermore, displaying a moving image on the computer screen allows a user to focus his/her eyes on the image and thus to increase his/her concentration on learning.

Figure 12:
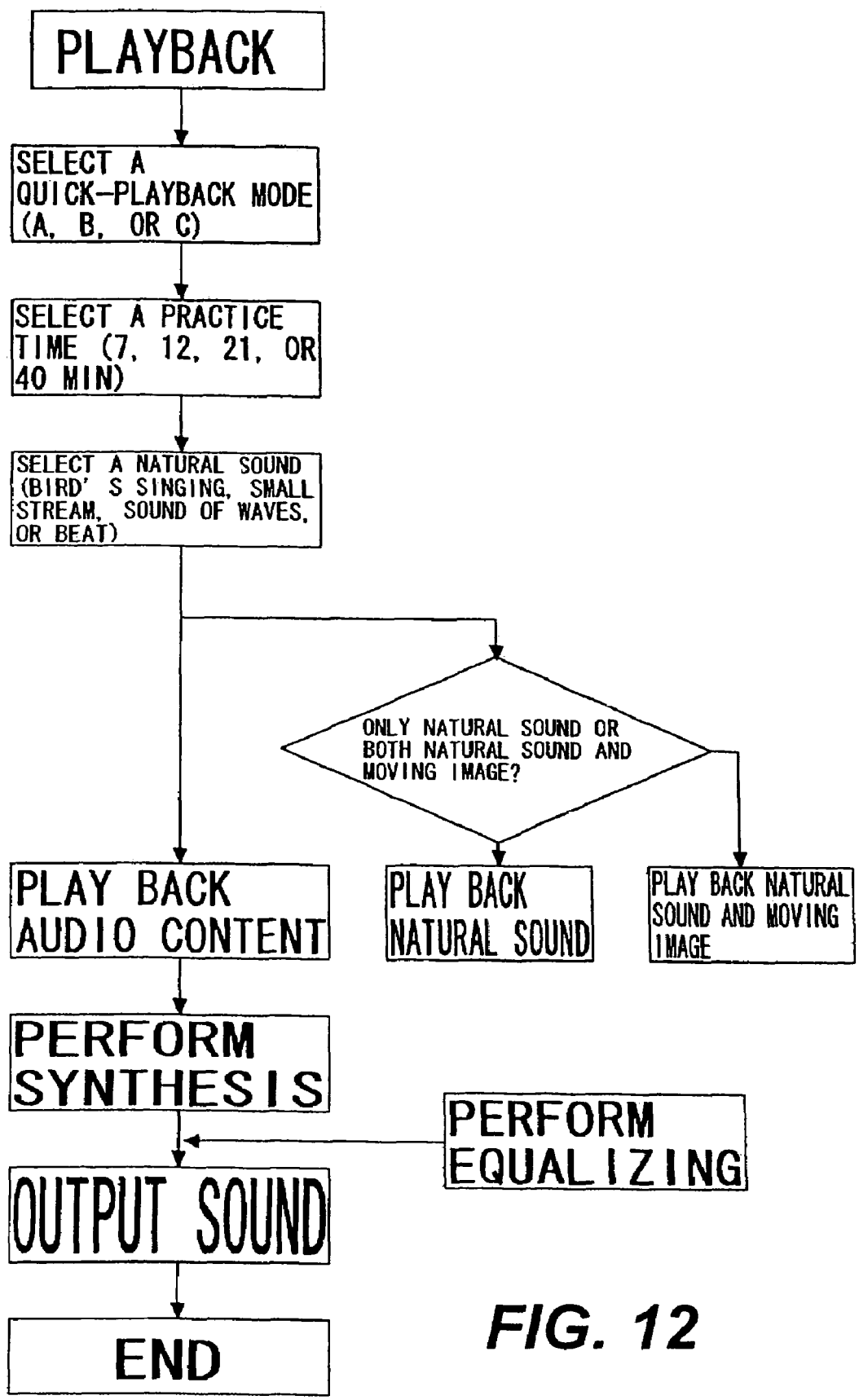
FIG. 12 is a flow chart showing a process including an equalization step.

FIG. 12 is a flow chart showing an equalization process.

Figure 13:
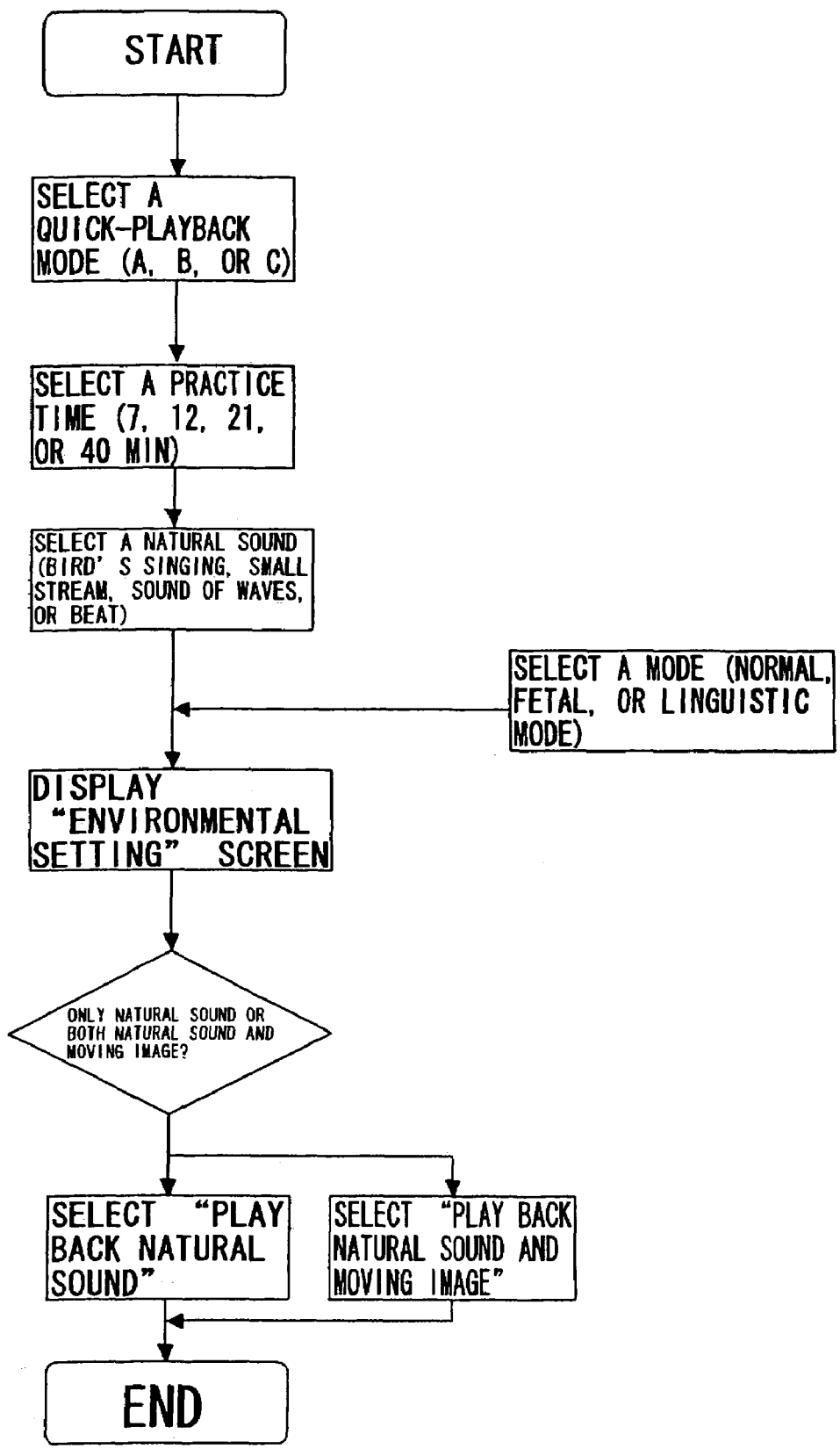
FIG. 13 is a flow chart showing a process of setting an equalization mode.

FIG. 13 is a flow chart of a process of setting equalization modes. In this example, a user is allowed to select one of three modes: normal mode, unborn-baby sound mode, and language learning mode. In the unborn-baby sound mode, frequency components of voice data are converted into a range which would be hearable by an unborn baby in a mother's womb. In the language learning mode, equalization is performed so as to emphasize frequency components in a range within which frequency components of a foreign language fall. Table 3 shows an example of data converted in the unborn baby sound mode so as to include only frequency components higher than 8 kHz. Table 4 shows an example of data converted in the language learning mode such that frequency components higher than 2 kHz are emphasized.

TABLE 3

Example of data (having only frequency components higher than 8 kHz for use in the unborn baby sound mode)

| Hz | Level |
|---|---|
| F1 = 100 | L1 = 0.0 |
| F2 = 400 | L2 = 0.0 |
| F3 = 1200 | L3 = 0.0 |
| F4 = 2000 | L4 = 0.0 |
| F5 = 8000 | L5 = 3.0 |
| F6 = 16000 | L6 = 3.0 |

TABLE 4

Example of data (whose frequency components higher than 2 kHz are emphasized, for use in the language learning mode)

| Hz | Level |
|---|---|
| F1 = 100 | L1 = 1.0 |
| F2 = 400 | L2 = 1.0 |
| F3 = 1200 | L3 = 1.0 |
| F4 = 2000 | L4 = 1.5 |
| F5 = 8000 | L5 = 2.0 |
| F6 = 16000 | L6 = 3.0 |

FIG. 14 shows passbands of various languages. As can be seen from FIG. 14, the frequency band used in the Japanese language are significantly different from those of foreign languages such as UK English or American English. It has recently turned out that the difference in frequency band between the Japanese language and foreign languages makes it difficult for Japanese people to learn foreign languages. In playing back voice data at an increased speed, if equalization is performed so as to emphasize frequency components in ranges used in foreign languages, the above-described difficulty in learning foreign languages can be removed. This mode in which voice data equalized in such a manner is played back is herein referred to as a language learning mode.

In the unborn-baby sound mode, equalization is performed such that resultant equalized voice data includes only frequency components higher than 8 kHz. This mode simulates a state in which an unborn baby in a mother's womb hear a sound/voice. According to Dr. Tomatis, a French audiologist, the unborn-baby sound mode makes it possible to revive ears.

Figure 15:
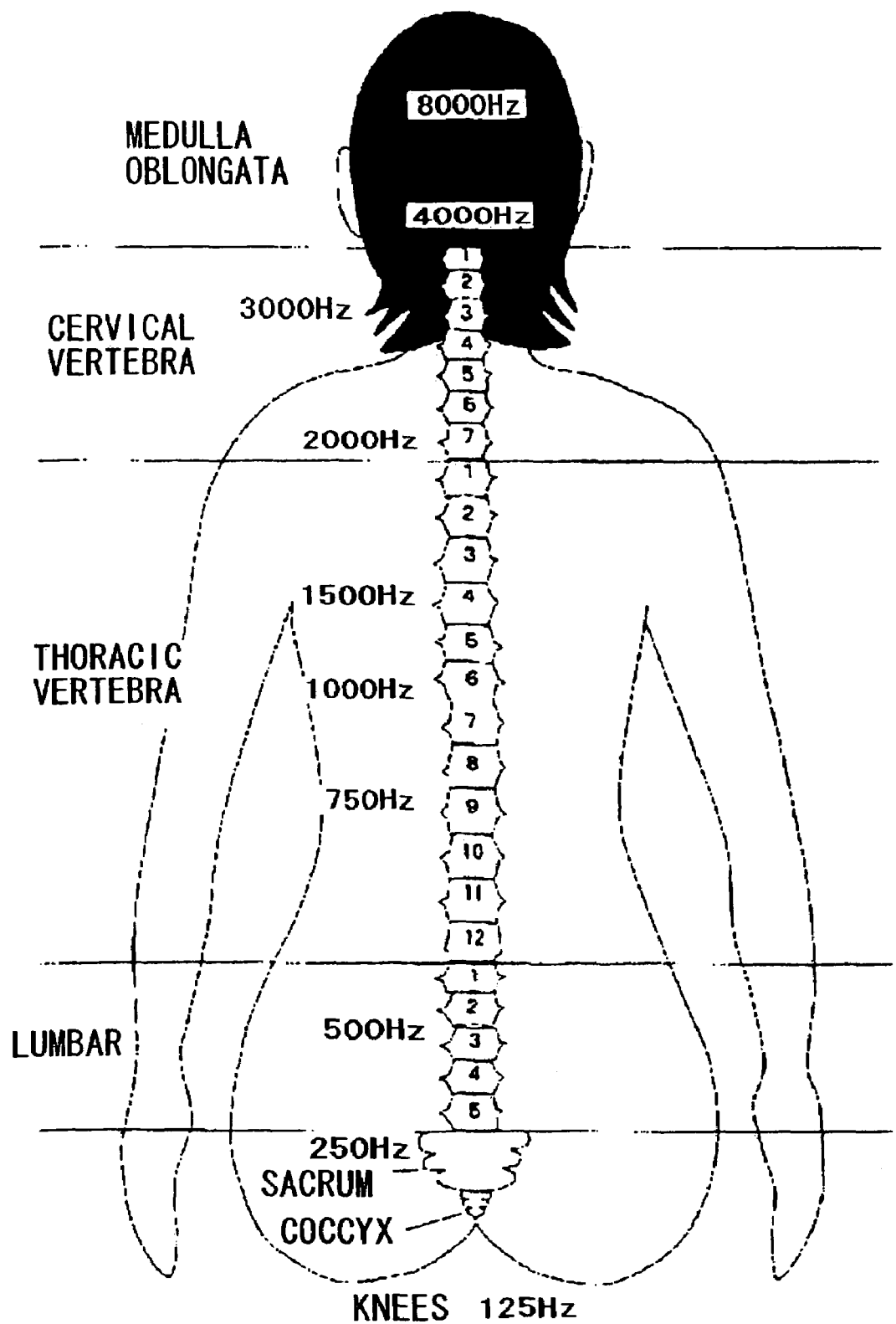
FIG. 15 is a diagram showing the relationship between parts of a human body and frequencies of sounds.

FIG. 15 shows the relationship between parts of a human body and frequencies of sounds. The relationship between various parts of a human body and frequencies of sound have been investigated. There is an attempt to make a medical treatment (known as a Mozart treatment) on the basis of knowledge on the relationship between human parts and sound frequencies. According to the investigation, human brains are coupled with a sound in a 8 kHz frequency band, and thus it can be understood that sounds in the unborn baby sound mode apply sound energy to human brains.

A natural moving image and/or a natural sound may be downloaded via the Internet, and the downloaded natural moving image and/or natural sound (such as a bird's singing, a wave sound, a sound of a small stream) may be superimposed on voice data played back at an increased speed.

Of various natural sounds, a sound of beating of a heart (of a mother) is particularly useful to treat depression.

Referring to hard copies of screens shown in FIGS. 16 to 29, the computer program for realizing the method of assisting a user to memorize or learn a language according to the present invention is described below. In the present invention, the program is referred to as a flip card program.

Figure 16:
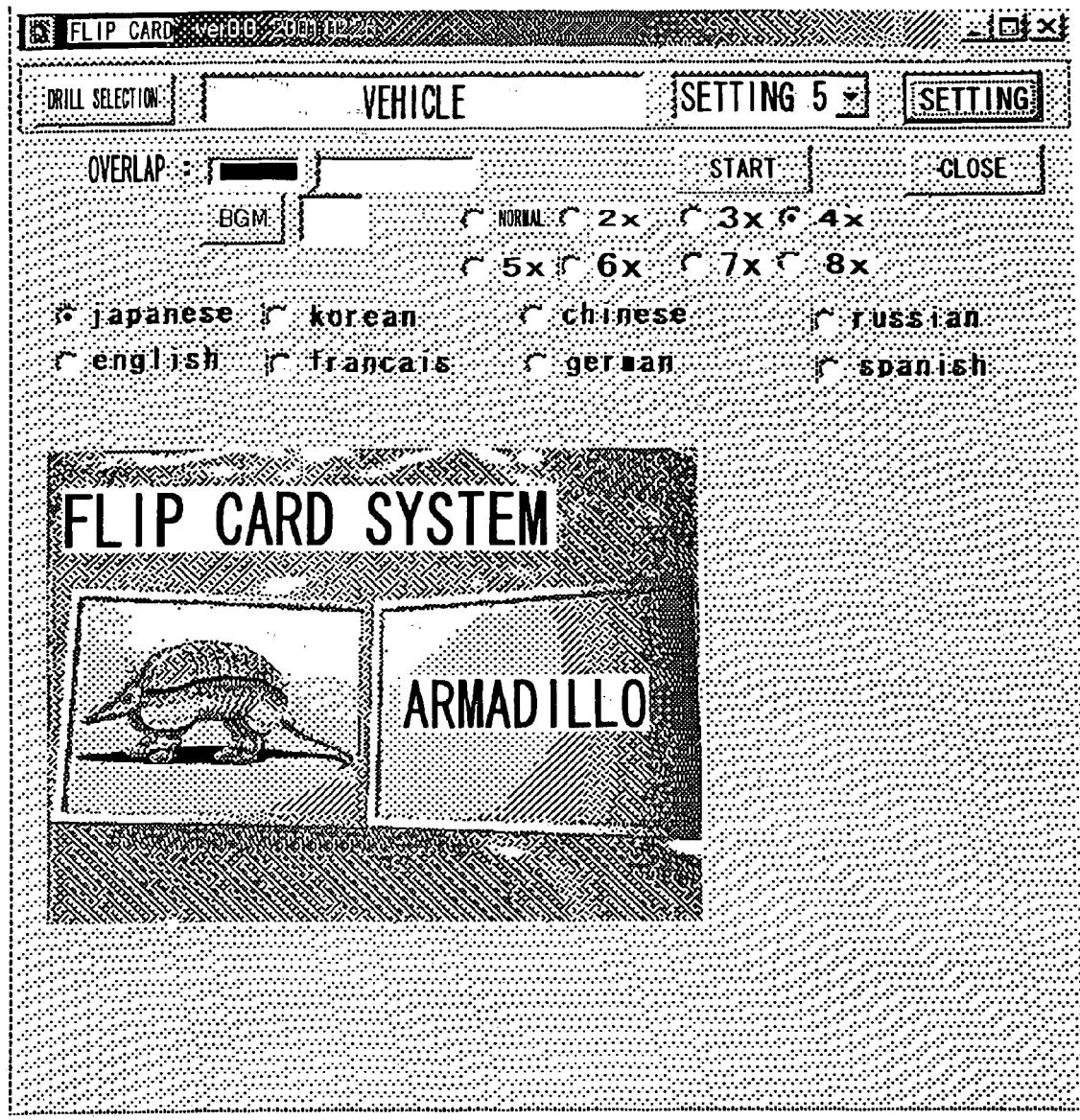
FIG. 16 is a diagram showing an initial screen displayed at the beginning of a program.

FIG. 16 shows an initial screen which is displayed when the program is started. A drill selection button is disposed in the upper left corner of the screen. If no drill is selected yet, it is necessary to click the drill selection button to select a drill. In the example shown in FIG. 16, a drill entitled "vehicles" selected in previous learning is inherited. Thus, herein, it is assumed that the drill entitled "vehicles" used in the previous memorization practice or language learning is employed without selecting another new drill. A "setting" button at the upper right is used to set display parameters such as a cycle time (card turning rate), an image display period, the timing of displaying text data, and a text display period (the timing of deleing text data). If the setting button is clicked, a screen for setting the display parameters appears. Various sets of specified conditions can be registered. In the present example, nine sets of conditions from "condition 1" to "condition 9" have been already registered (they can be customized), and "condition 5" is currently selected because "condition 5" was used in previous execution of the program and the settings are retained. In a case in which the same conditions as those used the previous execution are employed, it is not necessary to click the "setting" button before starting the program. An "overlap" slider is used to specify an overlap ratio between a left-hand display area and a right-hand display area on the screen (between an image displayed on the left-hand side of the screen and text information displayed on the right-hand side of the screen). The slider may be slid by dragging it with a mouse. If a pointer is placed on the slider by using the mouse, a numeral indicating a current overlap ratio is displayed in a pop-up fashion. In the example shown in FIG. 16, the overlap ratio is set to 30%. When the slider is set to a leftmost position, the overlap ratio is set to 0%, while the overlap ratio is set to 100% when the slider is set to a rightmost position. When the overlap ratio is set to 0%, an image is displayed in a left-hand display area with a width one-half the total width of the screen. In the case in which the overlap ratio is set to 100%, the image display area extends over the entire width of the screen and an image is displayed at the center of the display area. Buttons of "normal", "2×", "3×", "4×", "5×", "6×", "7×", and "8×" are used to specify the speed-up factor of the playback speed of a flip card voice. A "close" button is used to end the flip card system.

A "BGM" button is disposed below the "overlap" slider. In the example shown in FIG. 16, no background music (BGM) is selected. A desired natural sound such as a sound of a small stream, a wave sound, or a bird's singing or desired music such as baroque music or Mozart's music can be selected. Background music is effective to provide a good environment in which an alpha wave is easily generated in a user's brain. If learning of a language is performed in a relaxed state in which an alpha wave is generated, learning is performed effectively. In an area right to the "BGM" button, there are radio buttons labeled "normal", "2×", "3×", "4×", "5×", "6×", "7×", and "8×". There are also radio buttons labeled "Japanese", "Korean", "Chinese", "Russian", "English", "French", "German", "Spanish", "Portuguese", and "Greek", for selecting a language. It is possible not only to display text information linked to an image but also to play back a voice reading the text information. The voice reading text information is not in a single language such as Japanese but in a plurality of languages including other languages and voice data in those languages are stored in connection with a corresponding image. In a case in which a voice with a normal speed is played back, the length of a period in which the voice is played back limits the card turning rate (periodic intervals at which images are displayed one after another). Another advantage, experimentally demonstrated, of playing back a voice at a speed increased by a factor of 3 or 4 is that the increased speed stimulates a human brain thereby causing the brain to become more active. To make it possible to turn cards at a higher speed (display images at shorter intervals) and to visually and audibly stimulate a human brain, the present program plays back voice data at an increased speed. If voice data are previously produced for various speed-up factors and resultant data are stored, it is necessary to store a large amount of data. To prevent the above problem, only voice data with a normal speed is stored, and speeded-up voice data is produced when it is necessary (as disclosed in Japanese Unexamined Patent Application Publication No. 2001-282298, entitled "Method of producing voice data, method of playing back voice data, and storage medium"). Speeded-up voice data can be produced without causing a problem in execution of the flip card. For example, a routine of producing speeded-up voice data may be pre-executed. More specifically, if "4×" is selected as the speed-up factor and "Japanese" is selected as the language in the initial screen shown in FIG. 16, a set of speeded-up voice data is immediately produced for a necessary set of voice data. When producing of the quick set of speeded-up voice data is completed, execution of the flip card is started.

The initial screen shown in FIG. 16 has a "start" button and a "close" button. If the "start" button is clicked, execution of the flip card program is started (when it is necessary to produce a set of speeded-up voice data for a set of voice data, the execution of the flip card program is started after completion of producing the set of speeded-up voice data). The "close" button is used to terminate the flip card program.

Figure 17:
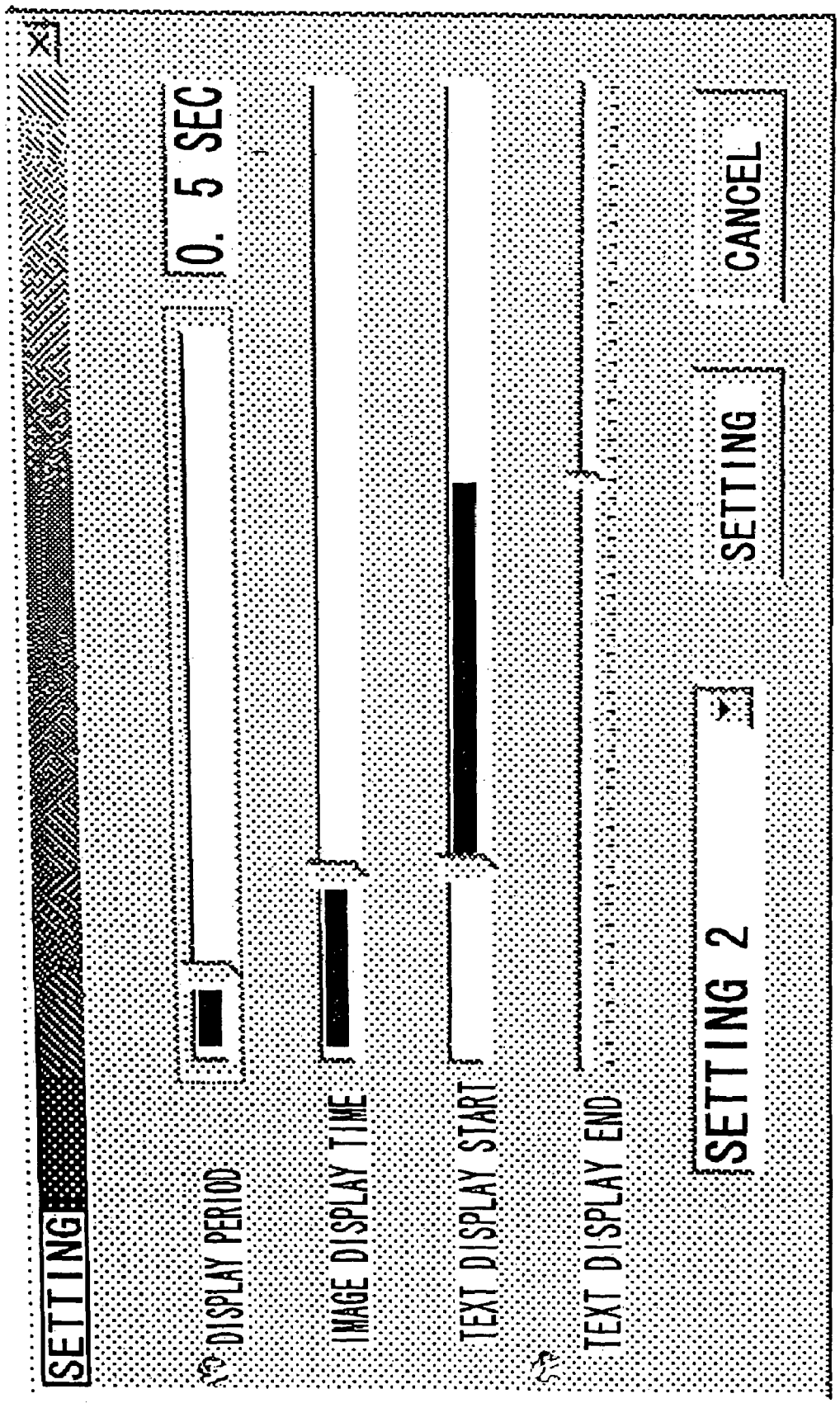
FIG. 17 is a hard copy of a setting screen which is displayed in response to clicking a setting button.

FIG. 17 is a hard copy of a setting screen which is displayed when the setting button is clicked. On this setting screen, sliders for setting four parameters associated with "display cycle time", "image display period", "text display time", and the "text delete time" are provided. To set parameters using the slider, an operator of a computer grasps one of sliders with a mouser and drags it to a desired position (the operator of the computer may be a user of the computer who memorizes or learns a language using the flip flop program running on the computer or the operator may be a teacher of a school or a parent). The "display cycle time" is a repetition period of displaying images. In the present example, the display period is set to be equal to 0.5 sec. If the display period is decreased, the card turning rate increases. The display period may be set to be as small as, for example, 0.3 sec. In a case in which the display cycle time is set to 0.5 sec, the lengths of the horizontally extending sliders for setting the "image display period", the "text display time", and the "text delete time" are all set so as to correspond to 0.5 sec. The slider for setting the "image display period" is used to specify how long to display an image after starting displaying the image at the beginning of the display period. In other words, the position of this slider indicates the timing of deleting the image. The slider for setting the "text display time" is used to specify the timing of starting displaying language text information on the right-side of the screen. Preferably, displaying of language text information is started after a very short pause after the completion of displaying the image. The slider for setting the "text delete time" is used to specify the timing of deleting the text information. In other words, by specifying the text delete time using this slider, the length of a period during which the text information is displayed is determined. In a bottom area of the screen shown in FIG. 17, there is a field for selecting a setting number. If an inverted triangular button on the right end of this field is clicked, a list of setting numbers (such as setting 1, setting 3, setting 4, and so on) is displayed. If one of a setting number is selected from the list, display parameters defined in the selected setting number are displayed. If the "setting" button is clicked, the parameters specified in this screen are saved in connection with the selected setting number, and the setting screen is closed. If the "cancel" button is clicked, the setting screen is closed without saving the display parameters.

Figure 18:
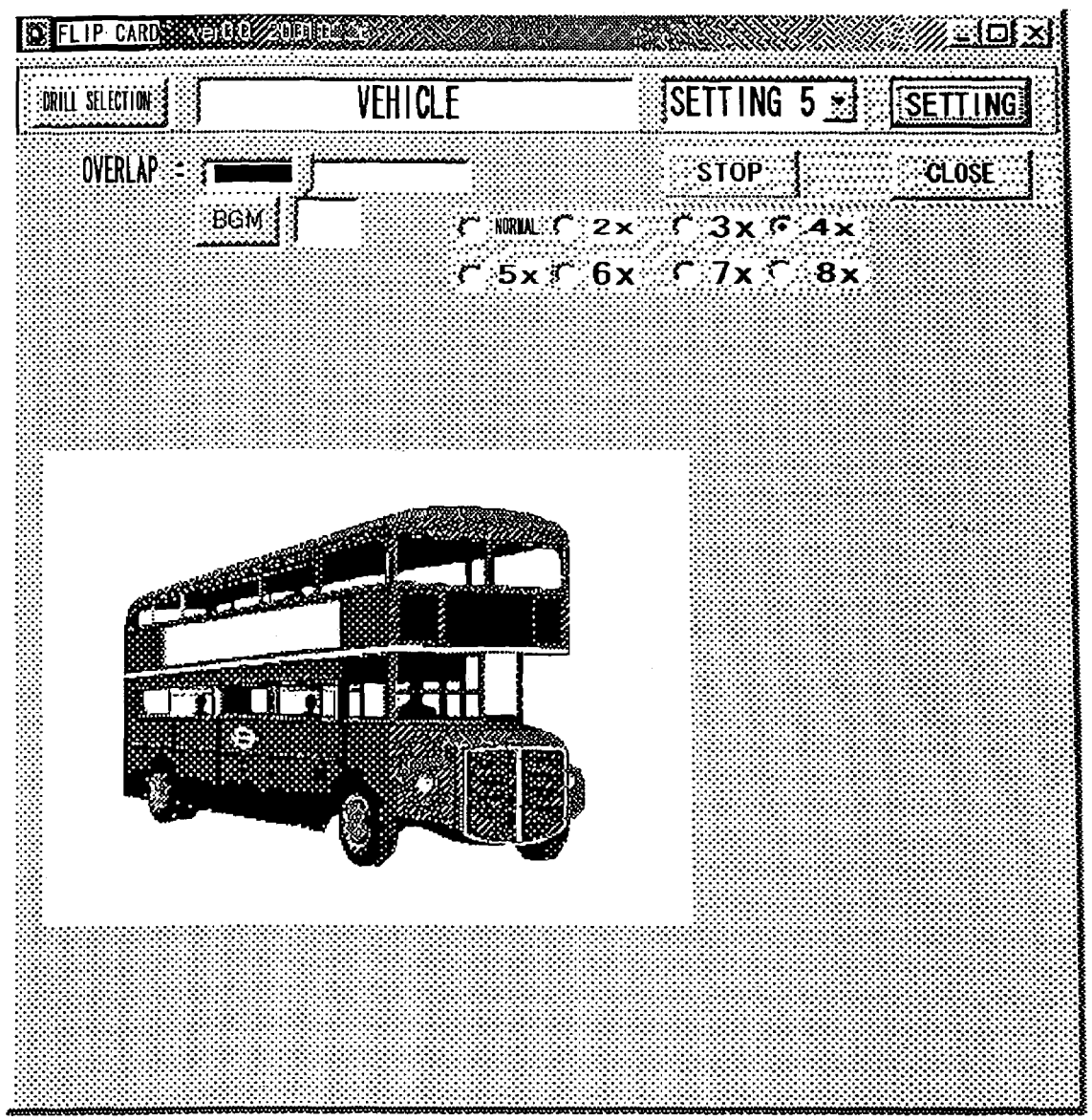
FIG. 18 is a hard copy of a screen on which an image of a "double-decker bus" is displayed on the left-hand side, wherein the left-right image overlapping ratio is set to 30%.

FIG. 18 is a hard copy of a screen on which an image of a "double-decker bus" is displayed on the left-hand side. In this specific example, the left-right image overlapping ratio is set to 30%.

Figure 19:
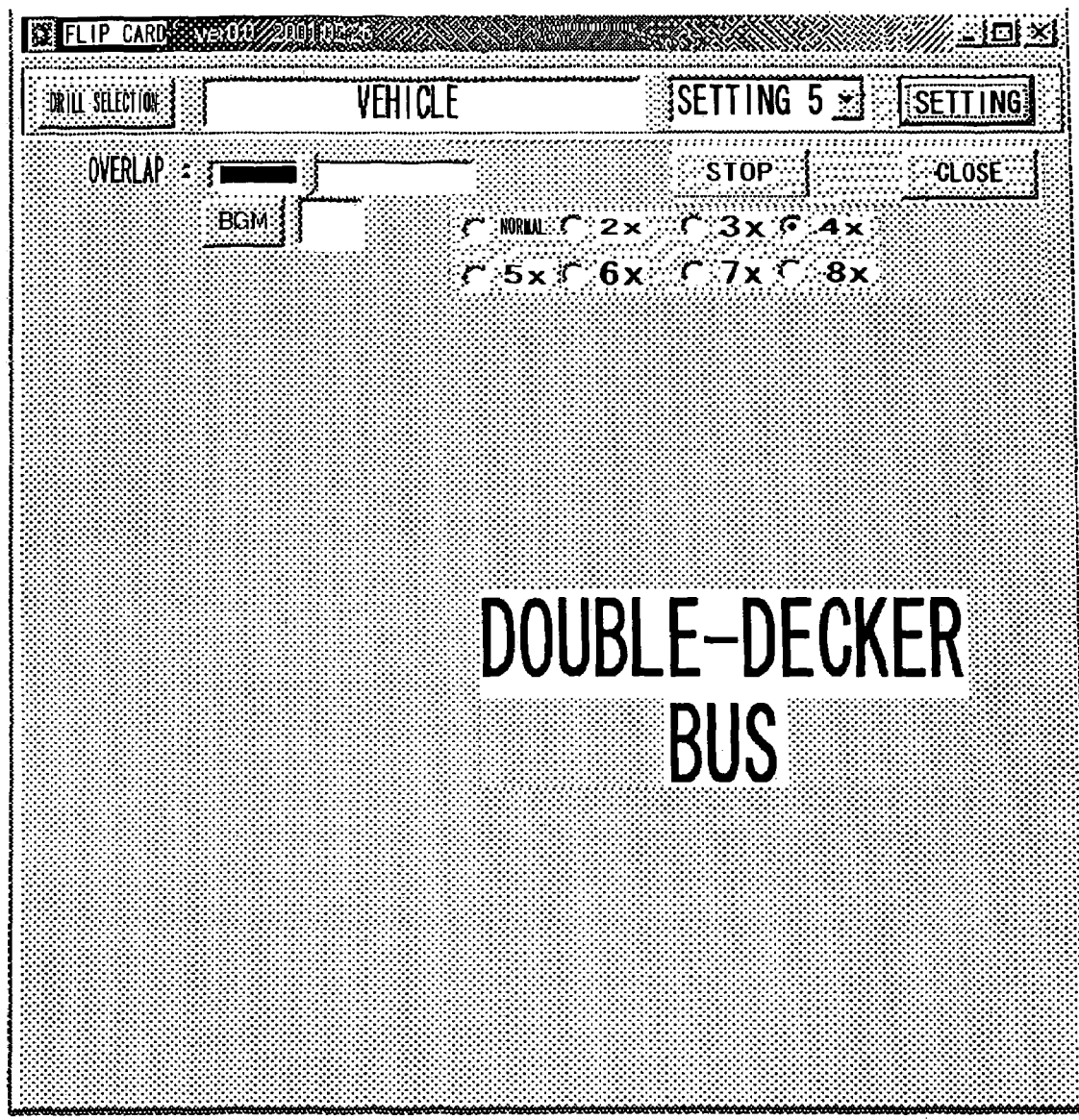
FIG. 19 is a hard copy of a screen on which text data of "double-decker bus" is displayed on the right-hand side, wherein the left-right image overlapping ratio is set to 30%, and Japanese is specified as the language.

FIG. 19 is a hard copy of a screen on which text data of "double-decker bus" is displayed on the right-hand side. In this example, the left-right image overlapping ratio is set to 30%, and Japanese is specified as the language.

Figure 20:
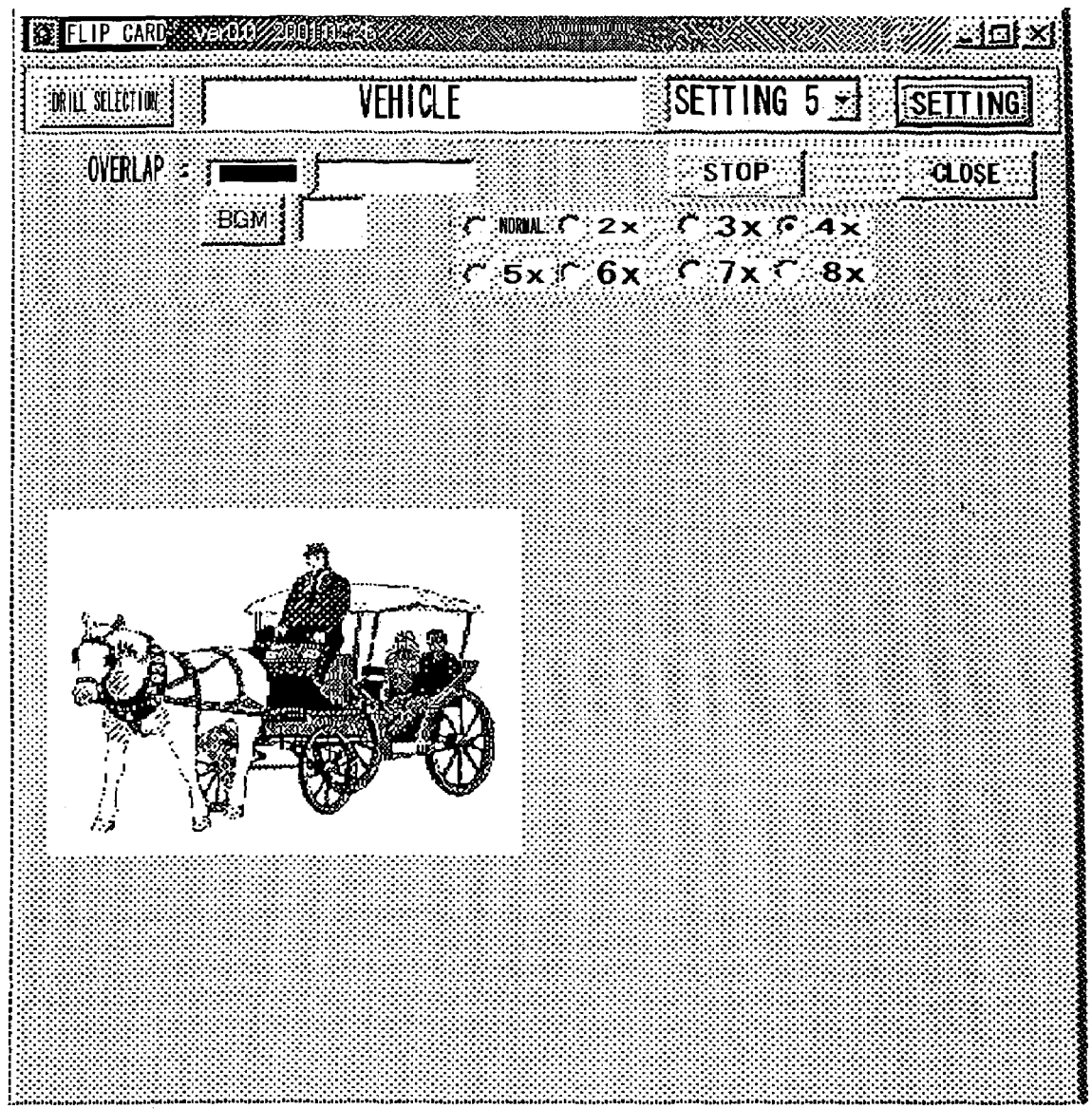
FIG. 20 is a hard copy of a screen on which an image of a "horse-drawn carriage" is displayed on the left-hand side, wherein the left-right image overlapping ratio is set to 0%.

FIG. 20 is a hard copy of a screen on which an image of a "horse-drawn carriage" is displayed on the left-hand side. In this example, the left-right image overlapping ratio is set to 0%.

Figure 21:
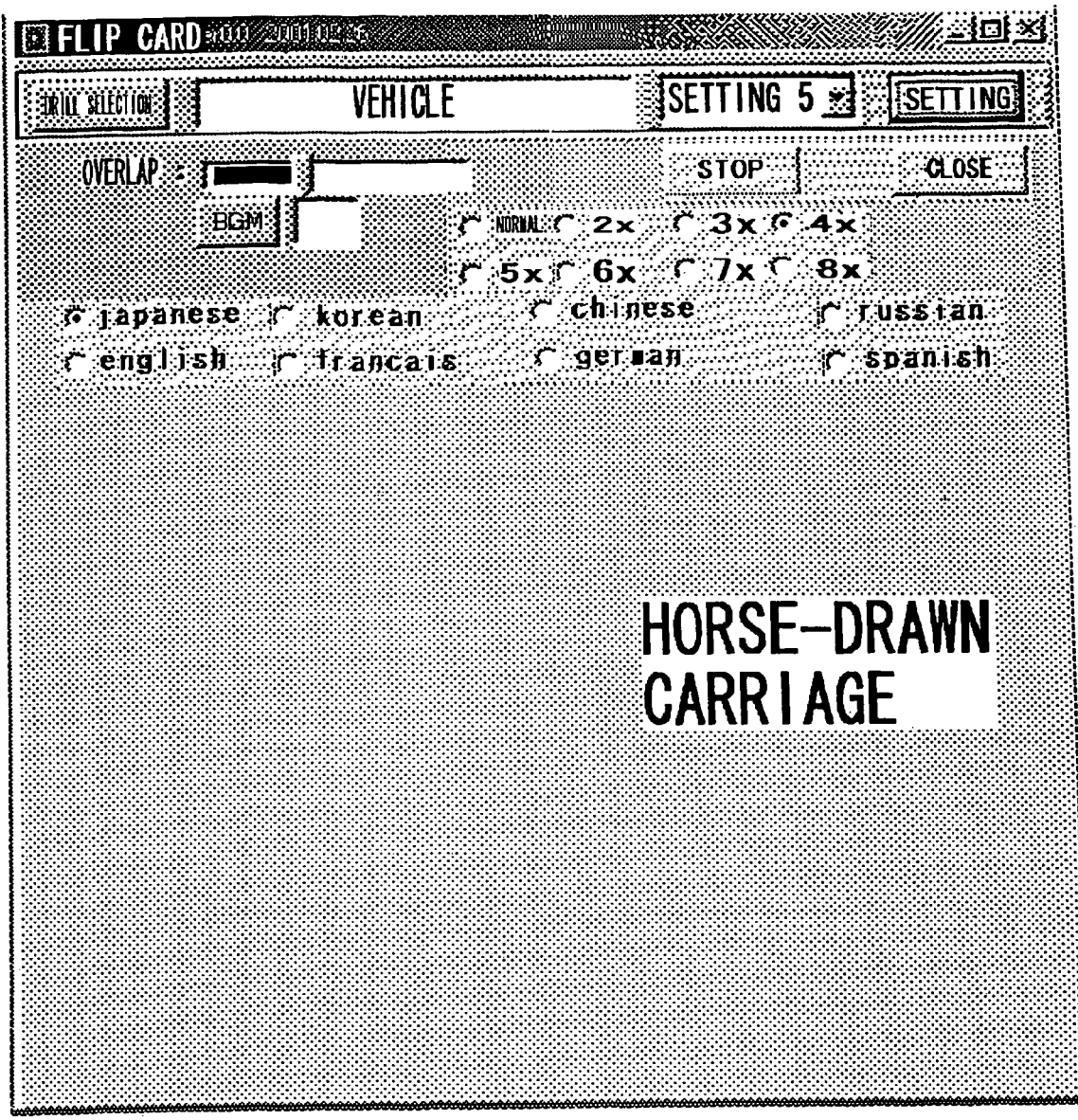
FIG. 21 is a hard copy of a screen on which text data of "horse-drawn carriage" is displayed on the right-hand side, wherein the left-right image overlapping ratio is set to 0%, and Japanese is specified as the language.

FIG. 21 is a hard copy of a screen on which text data of "horse-drawn carriage" is displayed on the right-hand side, wherein the left-right image overlapping ratio is set to 0%, and Japanese is specified as the language.

Figure 22:
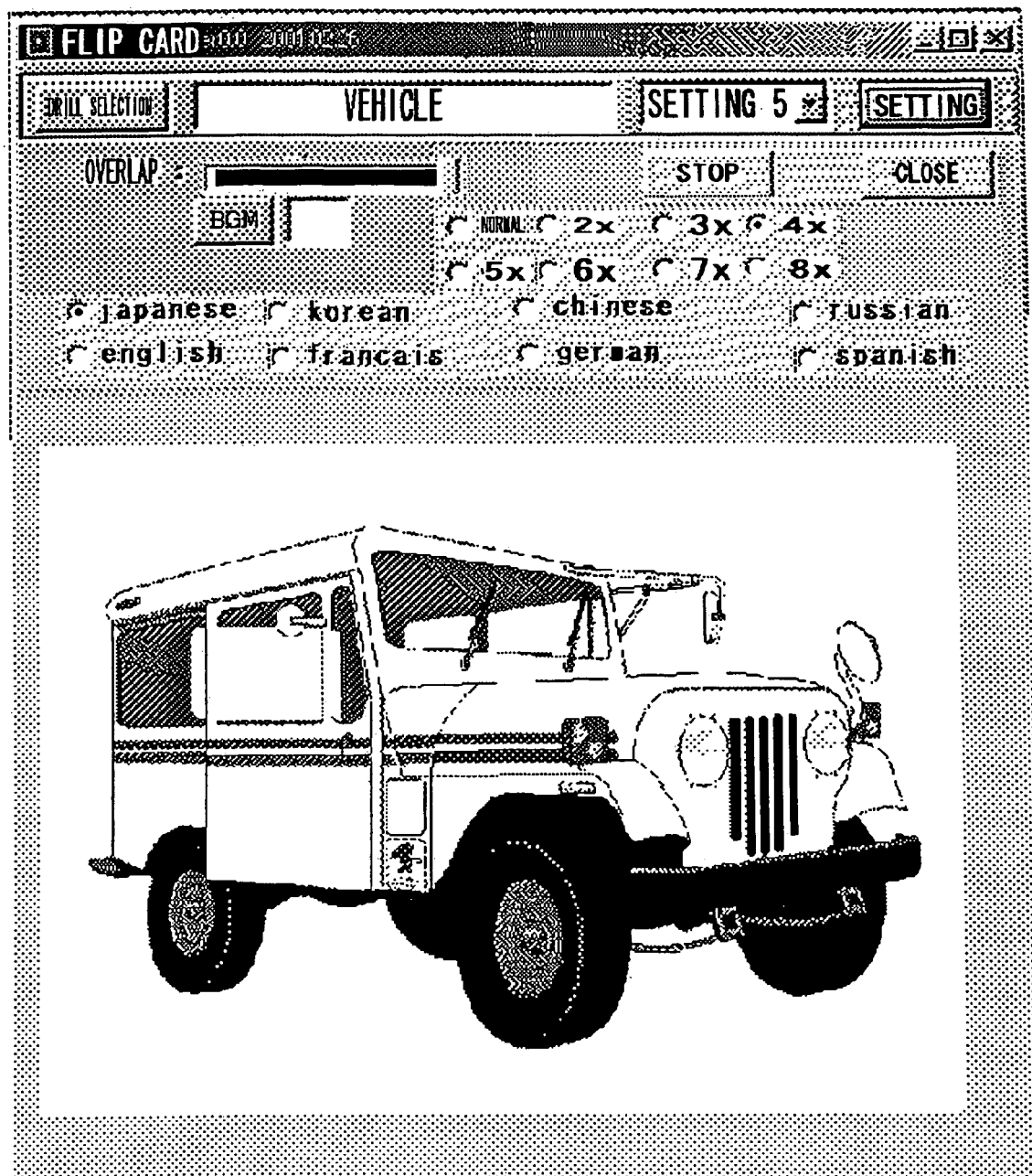
FIG. 22 is a hard copy of a screen on which an image of a "jeep" is displayed on the left-hand side, wherein the left-right image overlapping ratio is set to 100%.

FIG. 22 is a hard copy of a screen on which an image of a "jeep" is displayed on the left-hand side, wherein the left-right image overlapping ratio is set to 100%.

Figure 23:
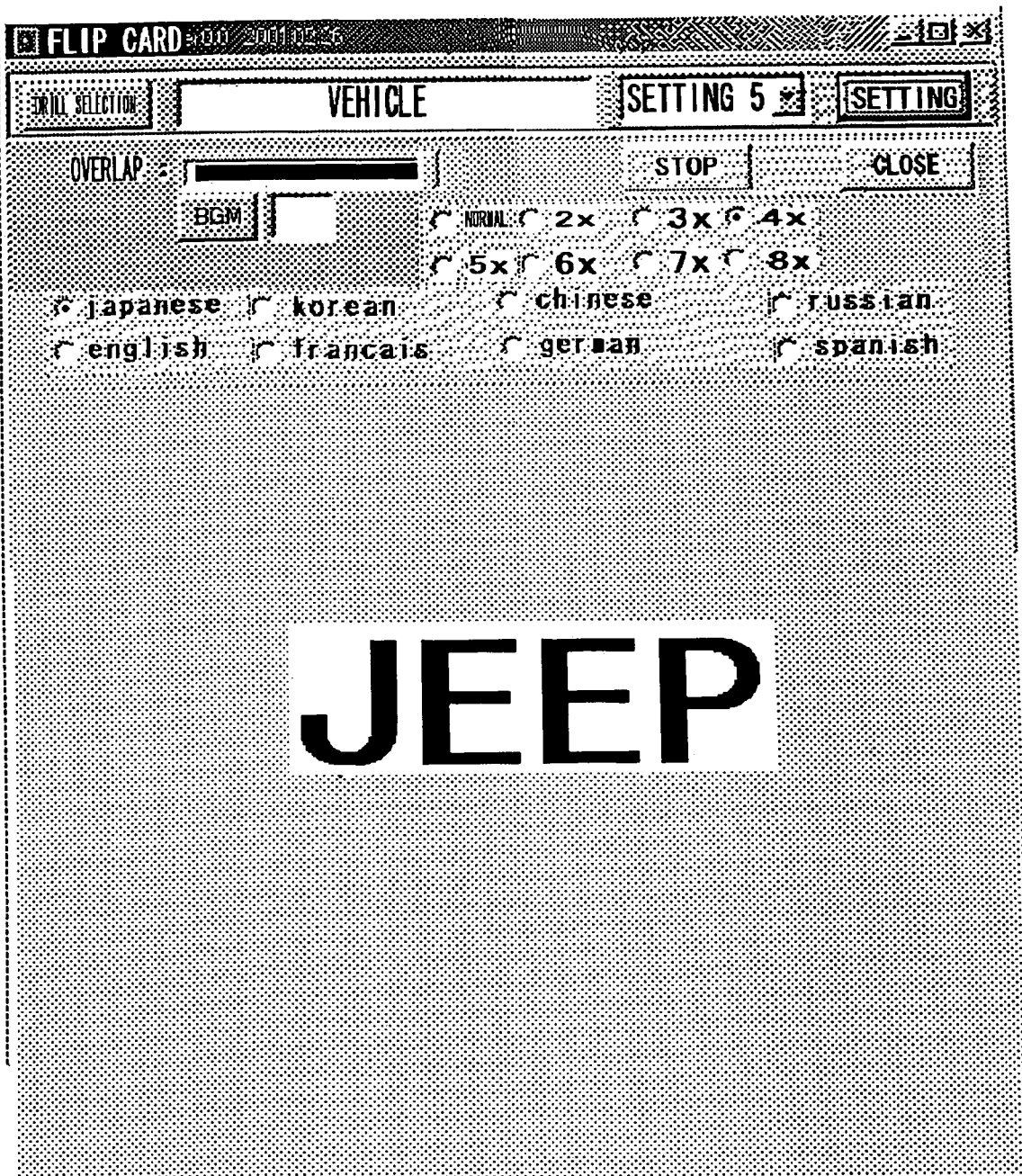
FIG. 23 is a hard copy of a screen on which text data of "jeep" is displayed on the right-hand side, wherein the left-right image overlapping ratio is set to 100%, and Japanese is specified as the language.
Figure 24:
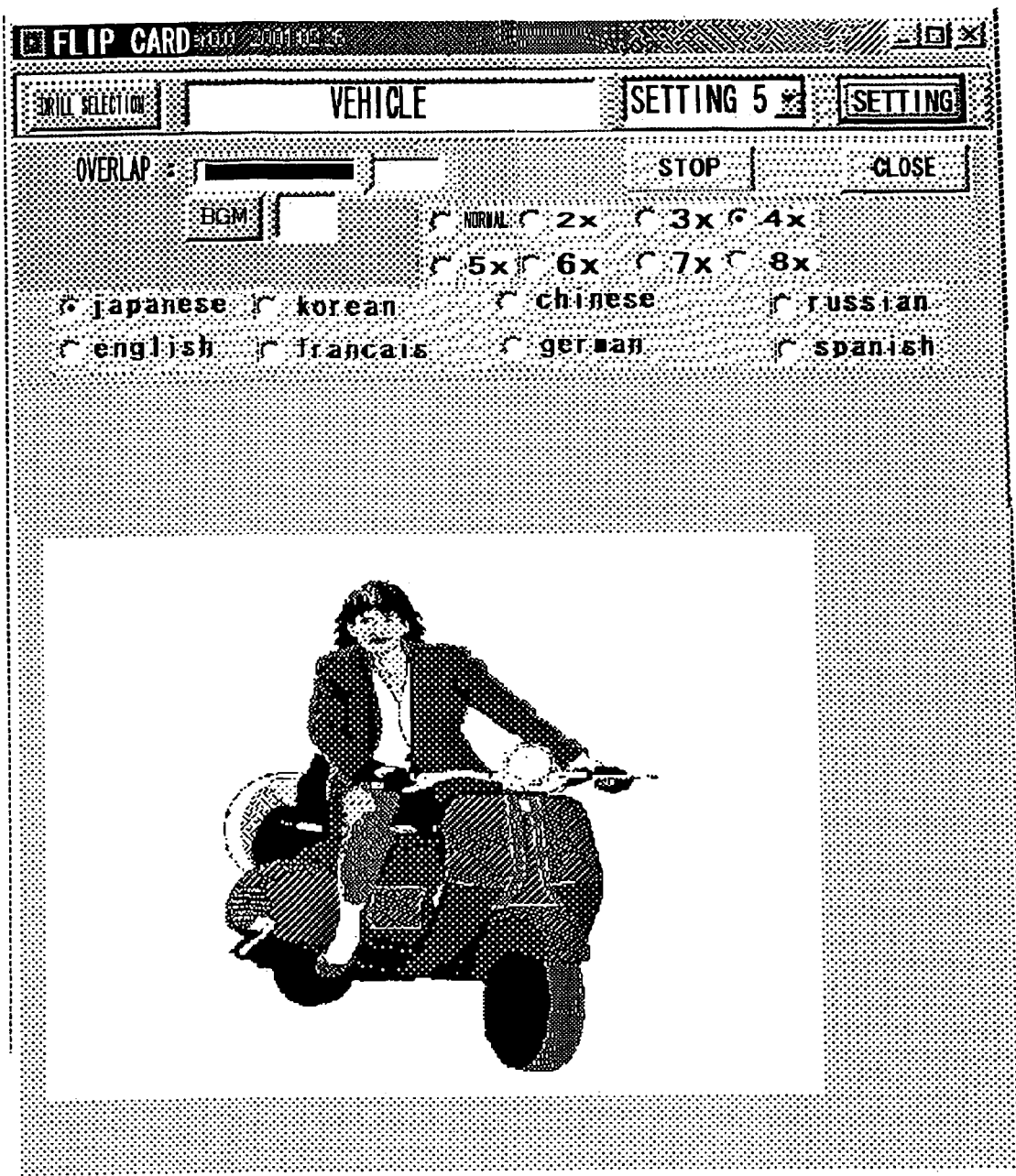
FIG. 24 is a hard copy of a screen on which an image of a "scooter" is displayed on the left-hand side, wherein the left-right image overlapping ratio is set to 71%.

FIG. 23 is a hard copy of a screen on which text data of "jeep" is displayed on the right-hand side, wherein the left-right image overlapping ratio is set to 100%, and Japanese is specified as the language;

FIG. 24 is a hard copy of a screen on which an image of a "scooter" is displayed on the left-hand side, wherein the left-right image overlapping ratio is set to 71%.

Figure 25:
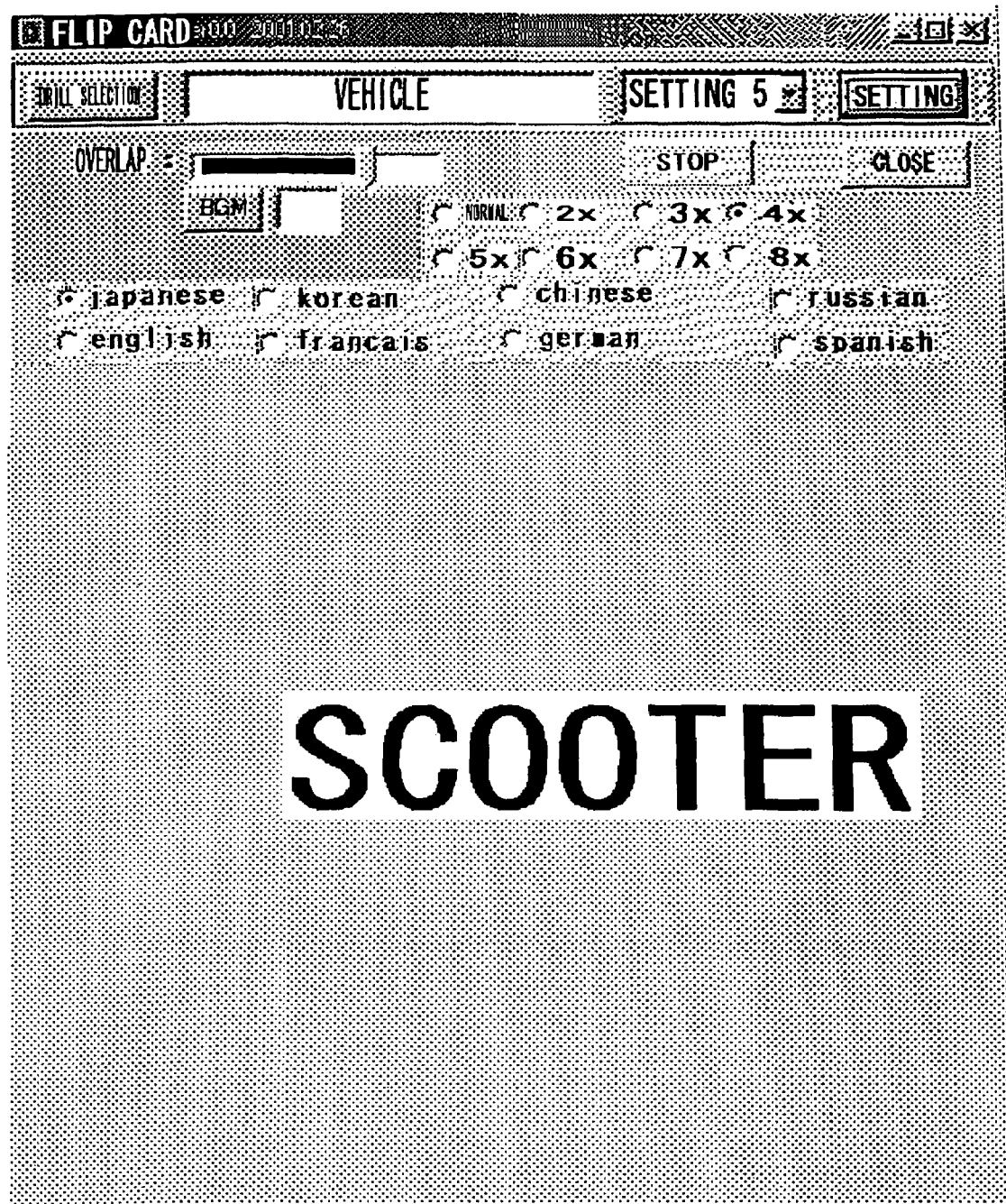
FIG. 25 is a hard copy of a screen on which text data of "scooter" is displayed on the right-hand side, wherein the left-right image overlapping ratio is set to 71%, and Japanese is specified as the language.

FIG. 25 is a hard copy of a screen on which text data of "scooter" is displayed on the right-hand side, wherein the left-right image overlapping ratio is set to 71%, and Japanese is specified as the language.

Figure 26:
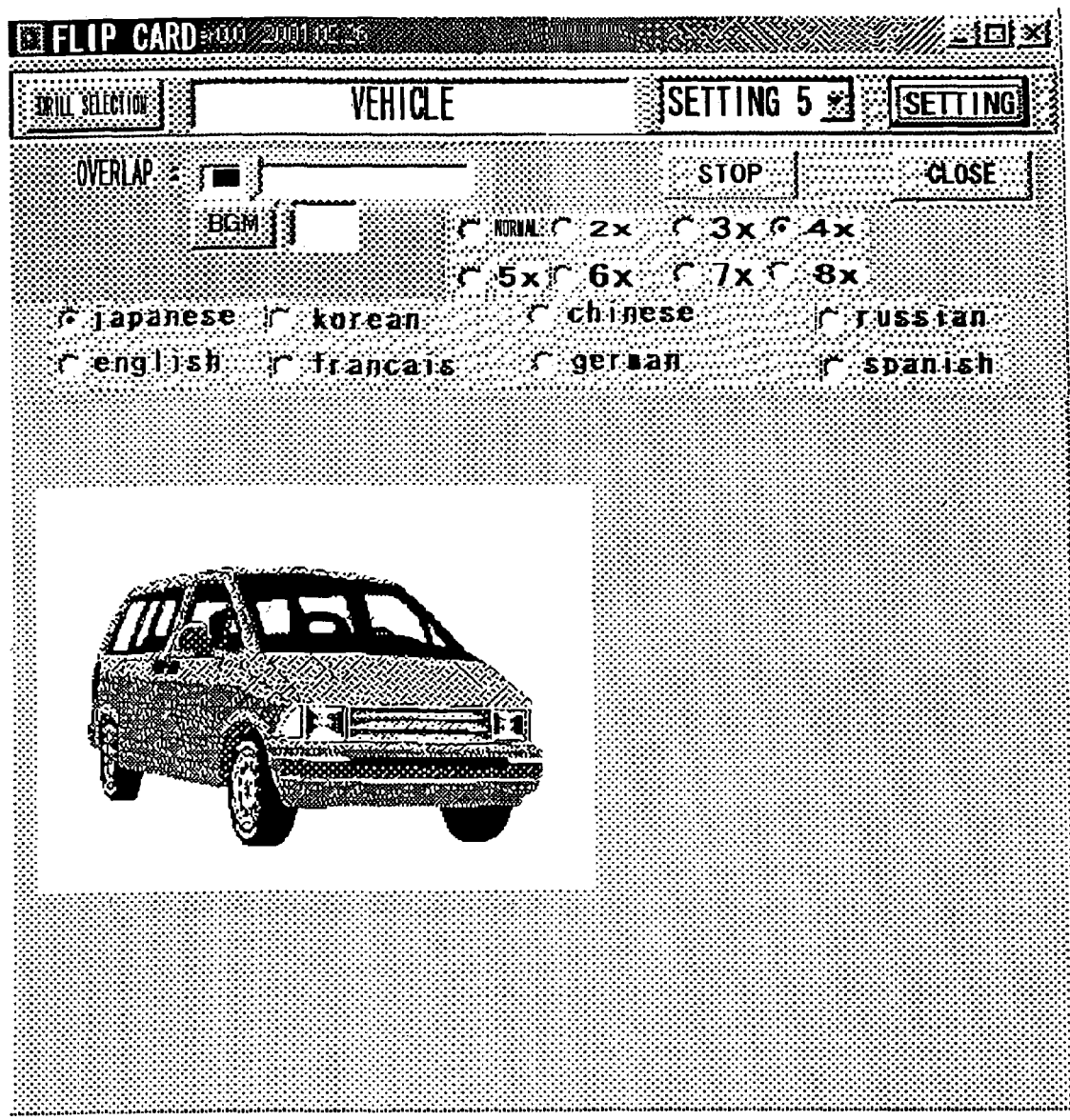
FIG. 26 is a hard copy of a screen on which an image of a "van" is displayed on the left-hand side, wherein the left-right image overlapping ratio is set to 16%.

FIG. 26 is a hard copy of a screen on which an image of a "van" is displayed on the left-hand side, wherein the left-right image overlapping ratio is set to 16%.

Figure 27:
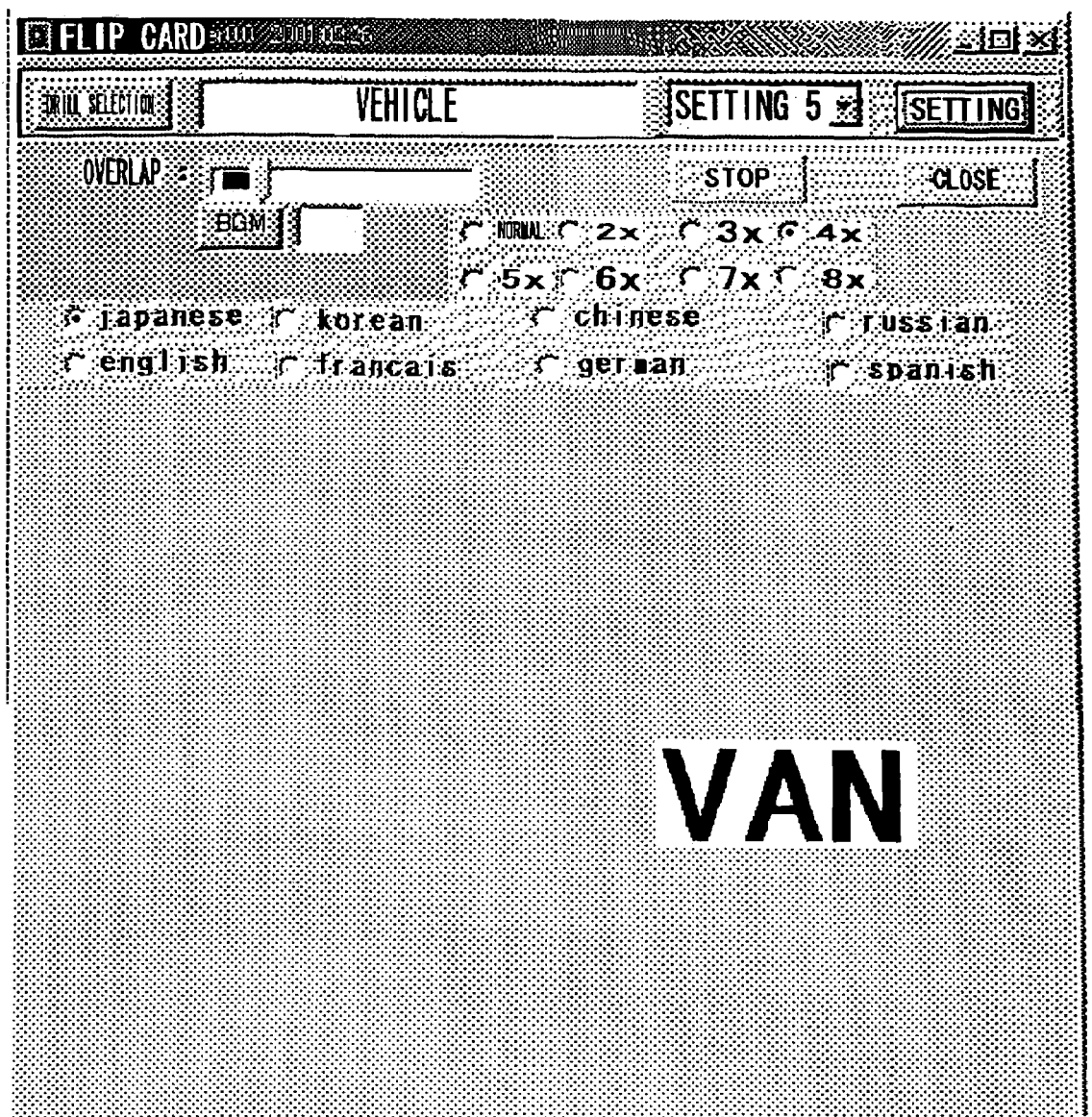
FIG. 27 is a hard copy of a screen on which text data of "van" is displayed on the right-hand side, wherein the left-right image overlapping ratio is set to 16%, and Japanese is specified as the language.

FIG. 27 is a hard copy of a screen on which text data of "van" is displayed on the right-hand side, wherein the left-right image overlapping ratio is set to 16%, and Japanese is specified as the language.

Figure 28:
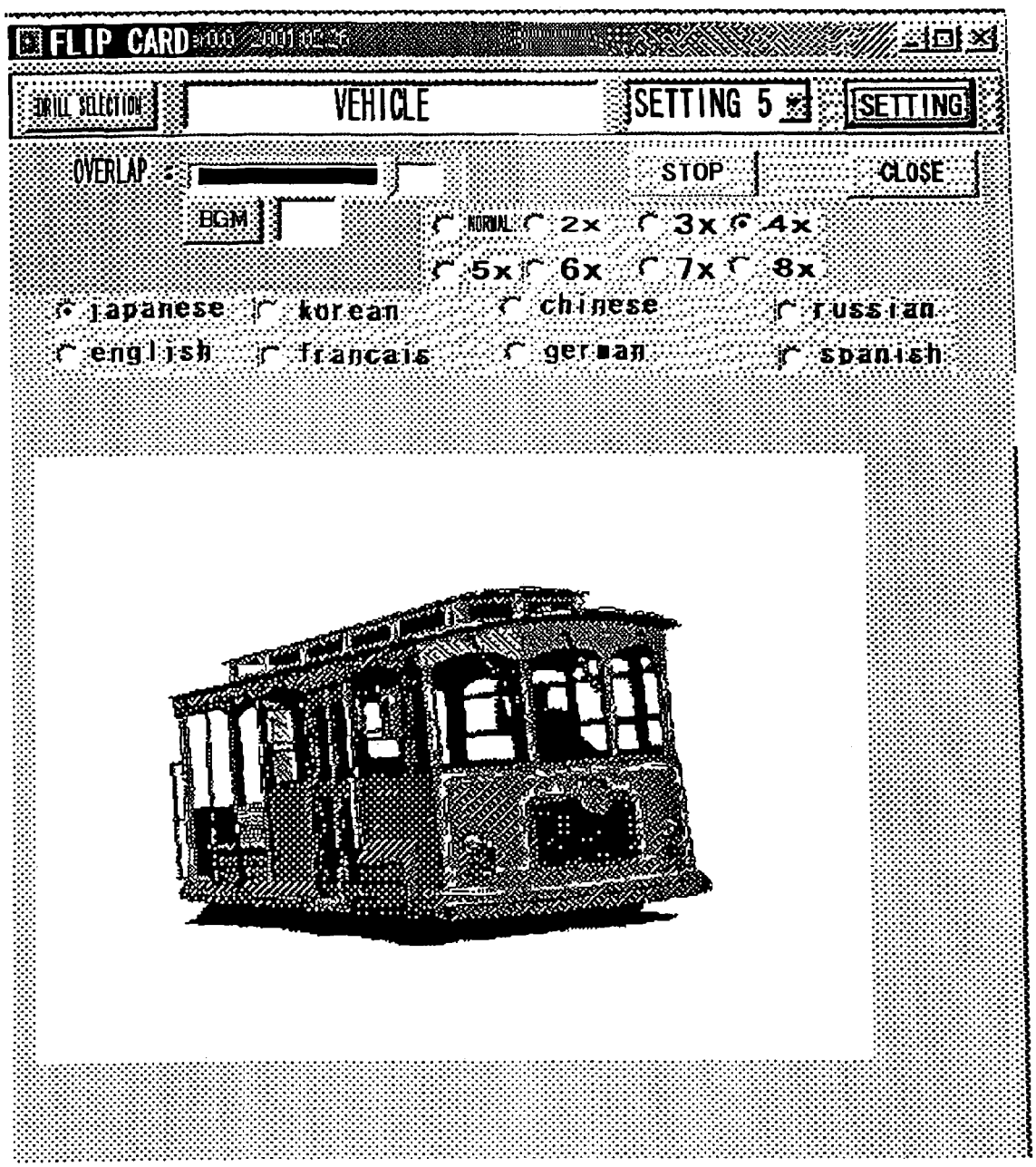
FIG. 28 is a hard copy of a screen on which an image of a "cable car" is displayed on the left-hand side, wherein the left-right image overlapping ratio is set to 82%.

FIG. 28 is a hard copy of a screen on which an image of a "cable car" is displayed on the left-hand side, wherein the left-right image overlapping ratio is set to 82%.

Figure 29:
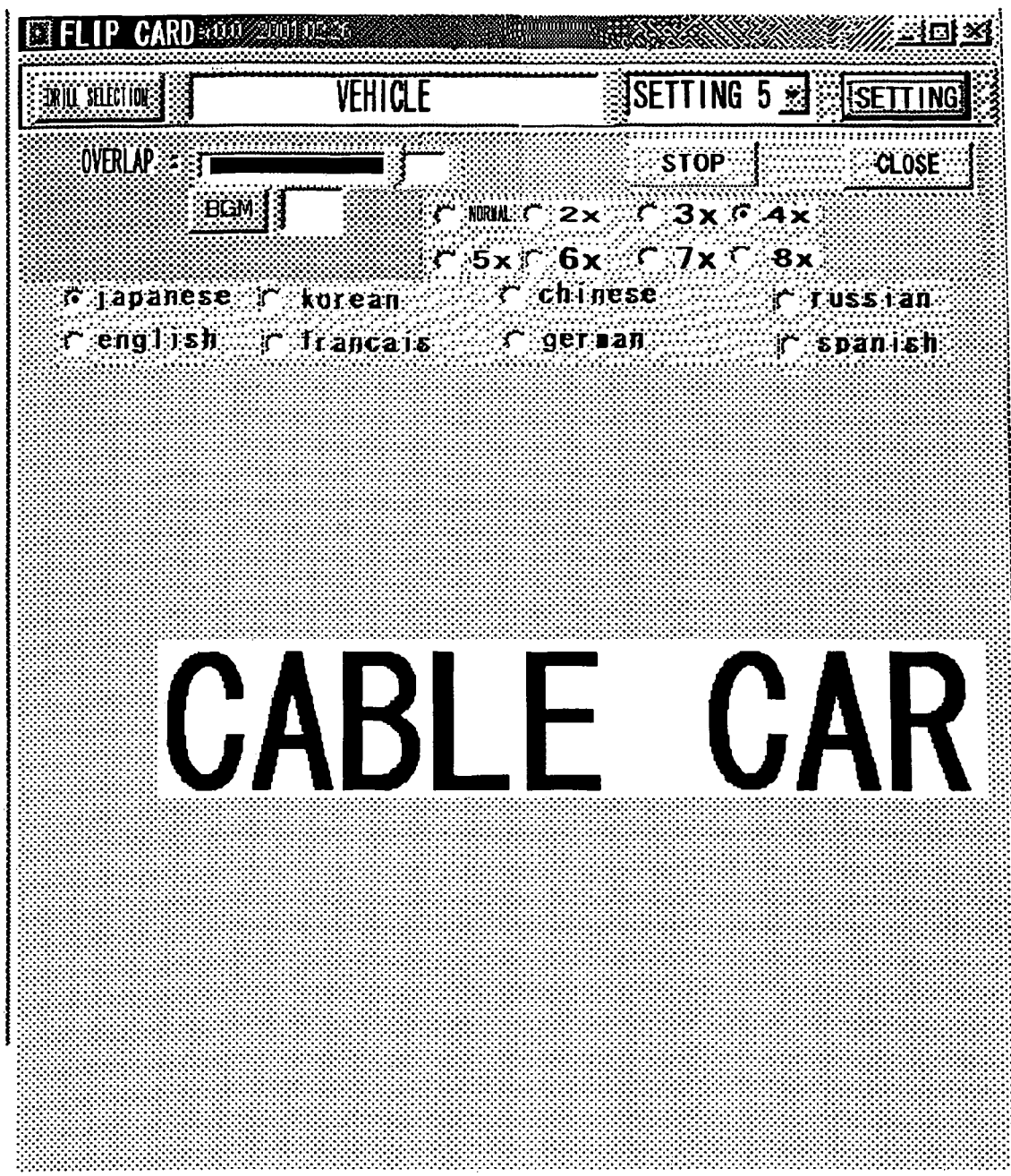
FIG. 29 is a hard copy of a screen on which text data of "cable car" is displayed on the right-hand side, wherein the left-right image overlapping ratio is set to 82%, and Japanese is specified as the language.

FIG. 29 is a hard copy of a screen on which text data of "cable car" is displayed on the right-hand side, wherein the left-right image overlapping ratio is set to 82%, and Japanese is specified as the language.

Figure 30:
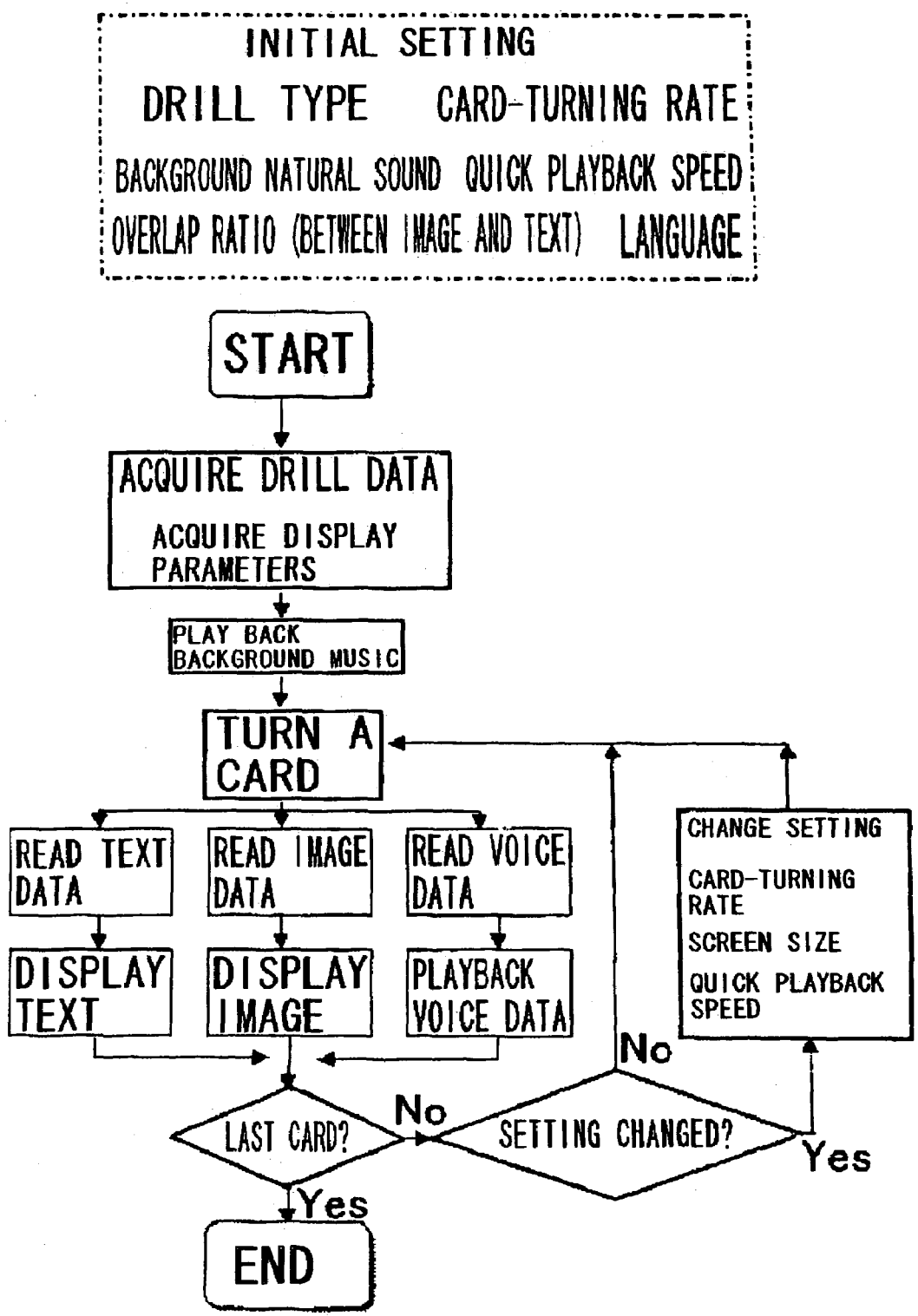
FIG. 30 is a flow chart of a program according to the present invention.

FIG. 30 is a flow chart showing an operation of the "flip card" program according to the present invention. After initial settings such as selection of a drill, selection of a card turning rate, selection of background natural sound (music), selection of a speed-up factor of the playback speed, selection of a language, and selection of an overlap ratio (between images and text information) are completed, the program is started. In execution for a second or later time, if it is allowed to use the same settings as those employed in previous execution, the program may be started without performing the initial setting process. If the "start" buttons is clicked, the program is started. After the program is started, drill data and display parameters are acquired. Thereafter, if it is specified that background music (or a natural sound) should be played back, playing back of background music is started. A card is then turned. Image data and text and voice data linked to the image data are read, and displaying of the image data and text data and playing back of the voice data are performed in accordance with the display parameters. It is determined whether there is more image data. If there is no more image data, the program is ended. However, if the image data is not last one, it is determined whether setting is changed. If setting is not changed, the card is turned to display a next card. On the other hand, in the case in which setting is changed, after new parameters are acquired, the card is turned, displaying and playing back are performed in accordance with the new parameters.

Figure 31:
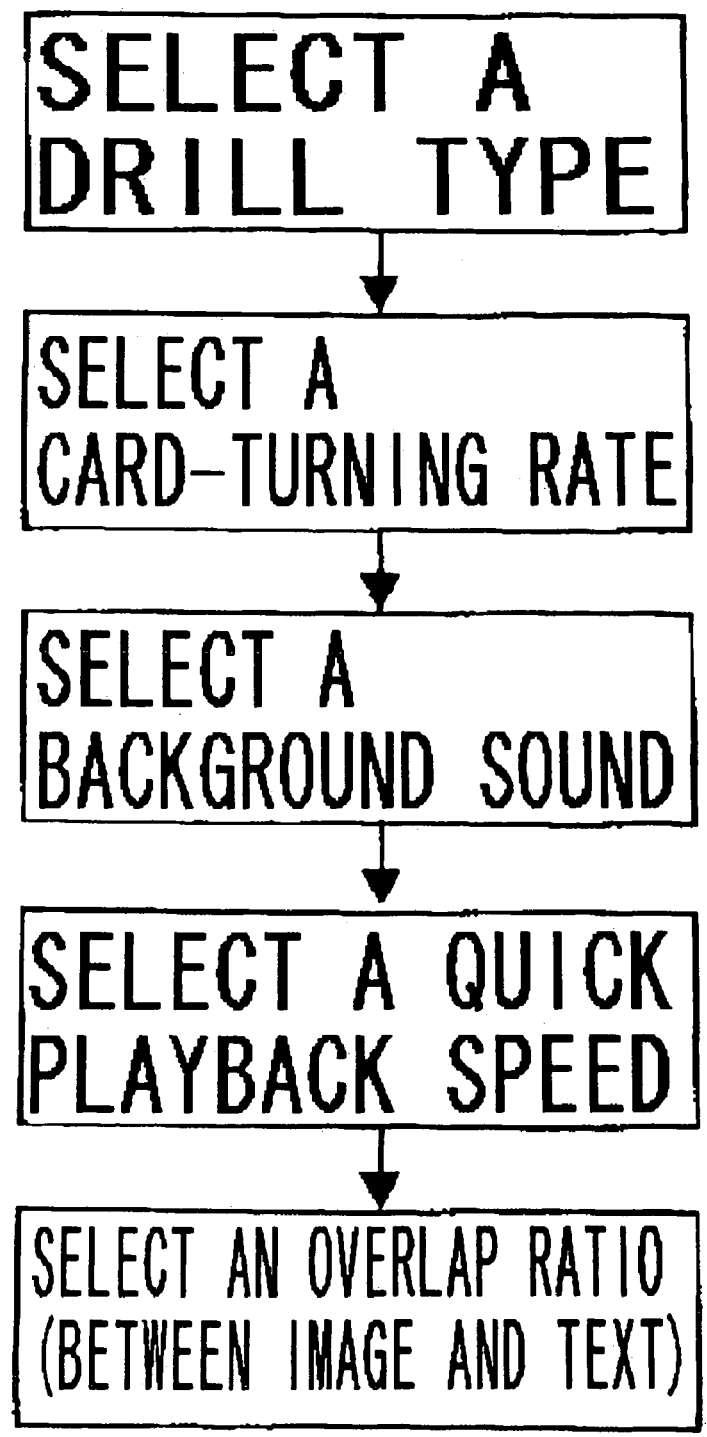
FIG. 31 is a flow chart showing a process performed by a user to set various conditions.

FIG. 31 is a flow chart showing a process performed by a user to set various conditions. In this setting process, the user selects a drill, a card turning rate (display cycle time), a background natural sound (background music), a speed-up factor of the playback speed, and an overlapping ratio. The setting may be performed by dragging sliders with a mouse or by making selections from lists.

Figure 32:
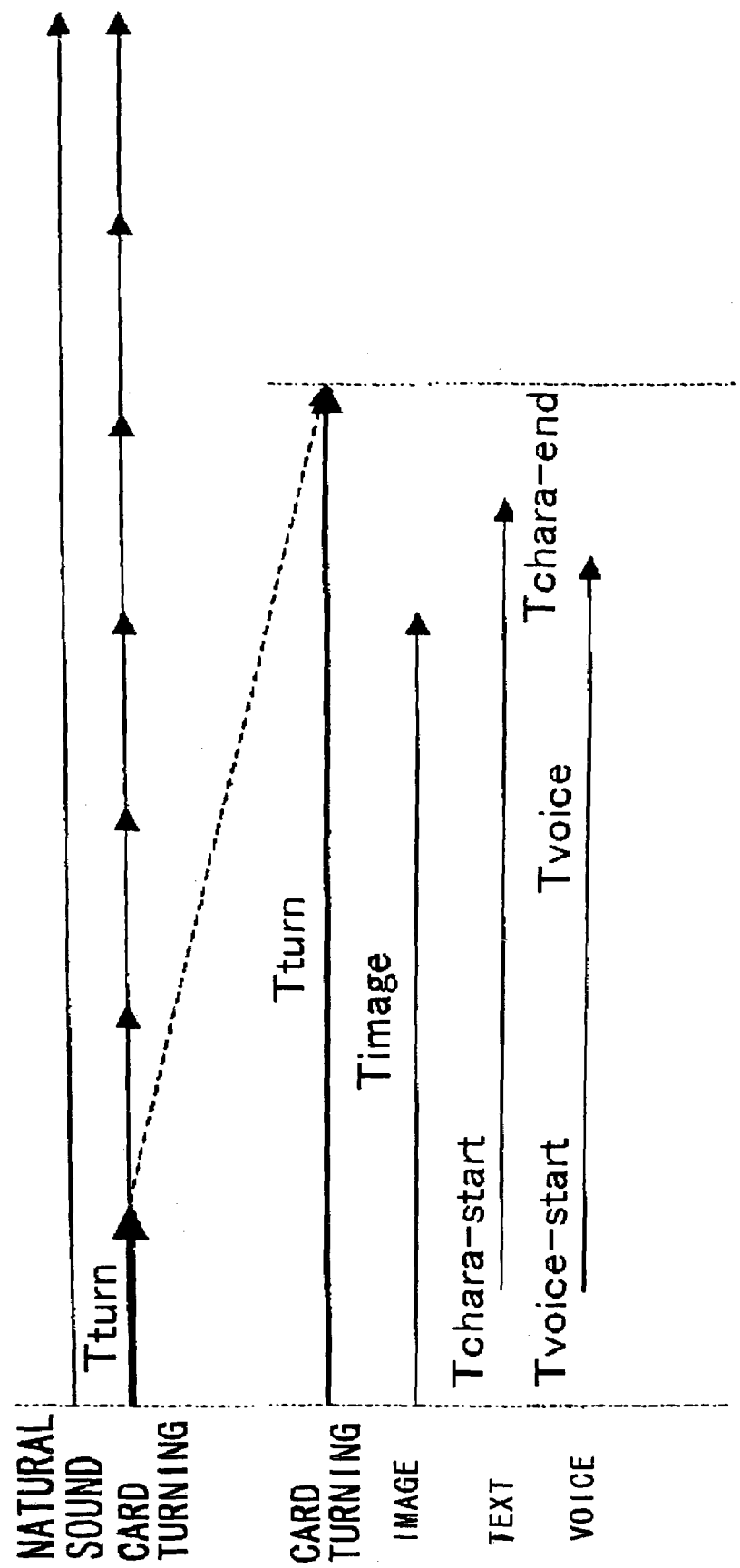
FIG. 32 is a time chart associated with an operation in which voice data speeded up by a factor of 2 has a length shorter than a specified card turning interval.

FIG. 32 is a time chart associated with an operation performed when 2× voice data has a length shorter than a specified card turning rate. The playing back of the natural sound (background music) is continuously performed regardless of the card turning rate (image display period). The card turning rate (repetition period of displaying images) may be set by the operator of the computer to a desired value such as 0.3 sec, 0.5 sec, or 0.8 sec. In FIG. 32, the card turning rate is designated as Tturn. Basically, cards are turned and images are displayed one after another every Tturn. In a case in which displaying of an mage, displaying of text information, and playing back of a voice are completed by the end of each display period Tturn, the operation is performed as specified by the setting conditions, as shown in FIG. 32. However, although displaying of an image and displaying of text information can be completed by the end of each display period Tturn regardless of the specified conditions, there is a possibility that playback of a voice cannot be completed by the end of the display period Ttutn. For example, if the specified value of Tturn is too small, or if a speed-up factor of the playback speed is small and thus it takes a long time to play back a voice, playback of the voice cannot be completed by the end of Tturn. In such a case, exception handling is performed as shown in FIG. 33.

Figure 33:
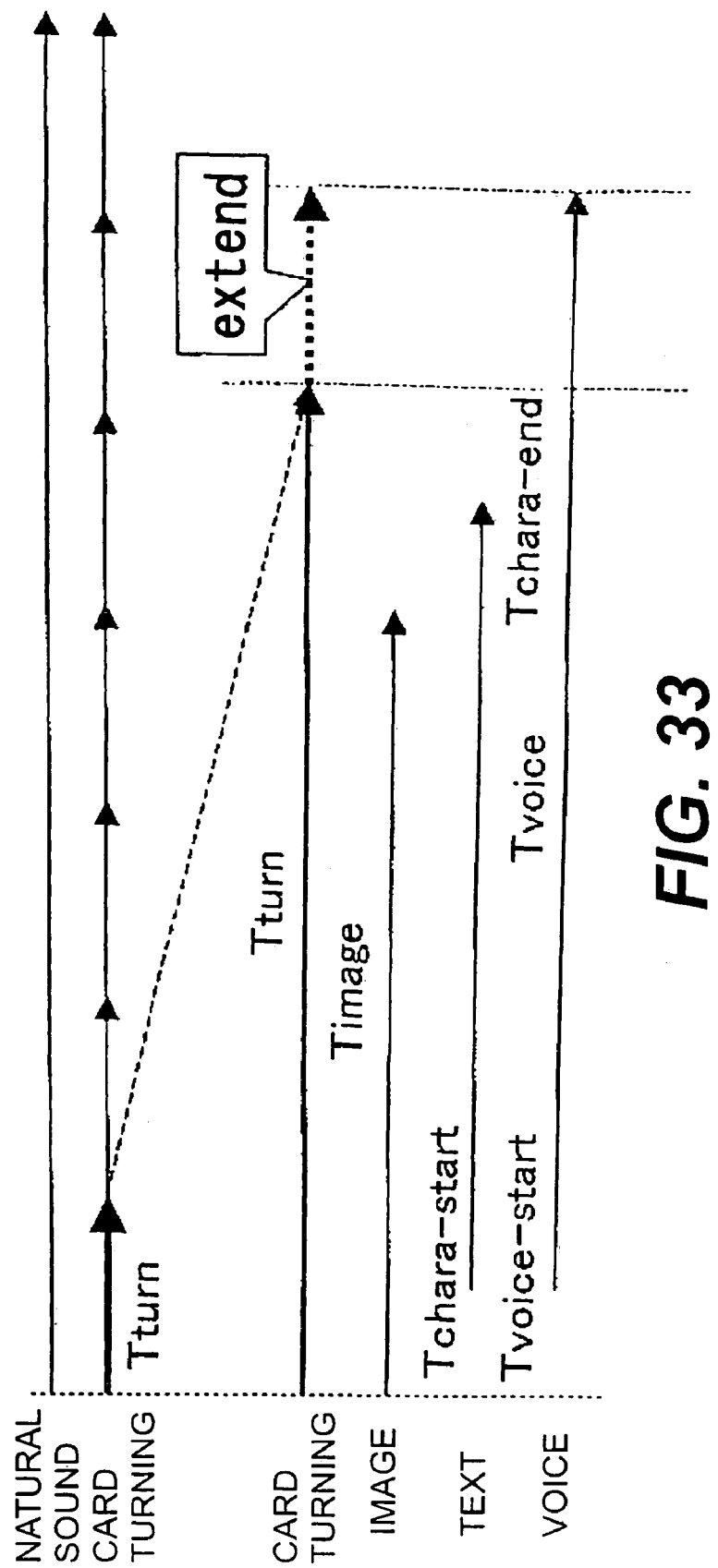
FIG. 33 is a time chart associated with an operation in which voice data speeded up by a factor of 2 has a length longer than a specified card turning interval, and the card turning interval is automatically increased by the program.

FIG. 33 is a time chart associated with an operation performed when 2× voice data has a length longer than a specified card turning interval. In this case, the card turning interval is automatically increased by the program. More specifically, turning to a next card (displaying a next image) is performed after playback of a voice is completed.

Figure 34:
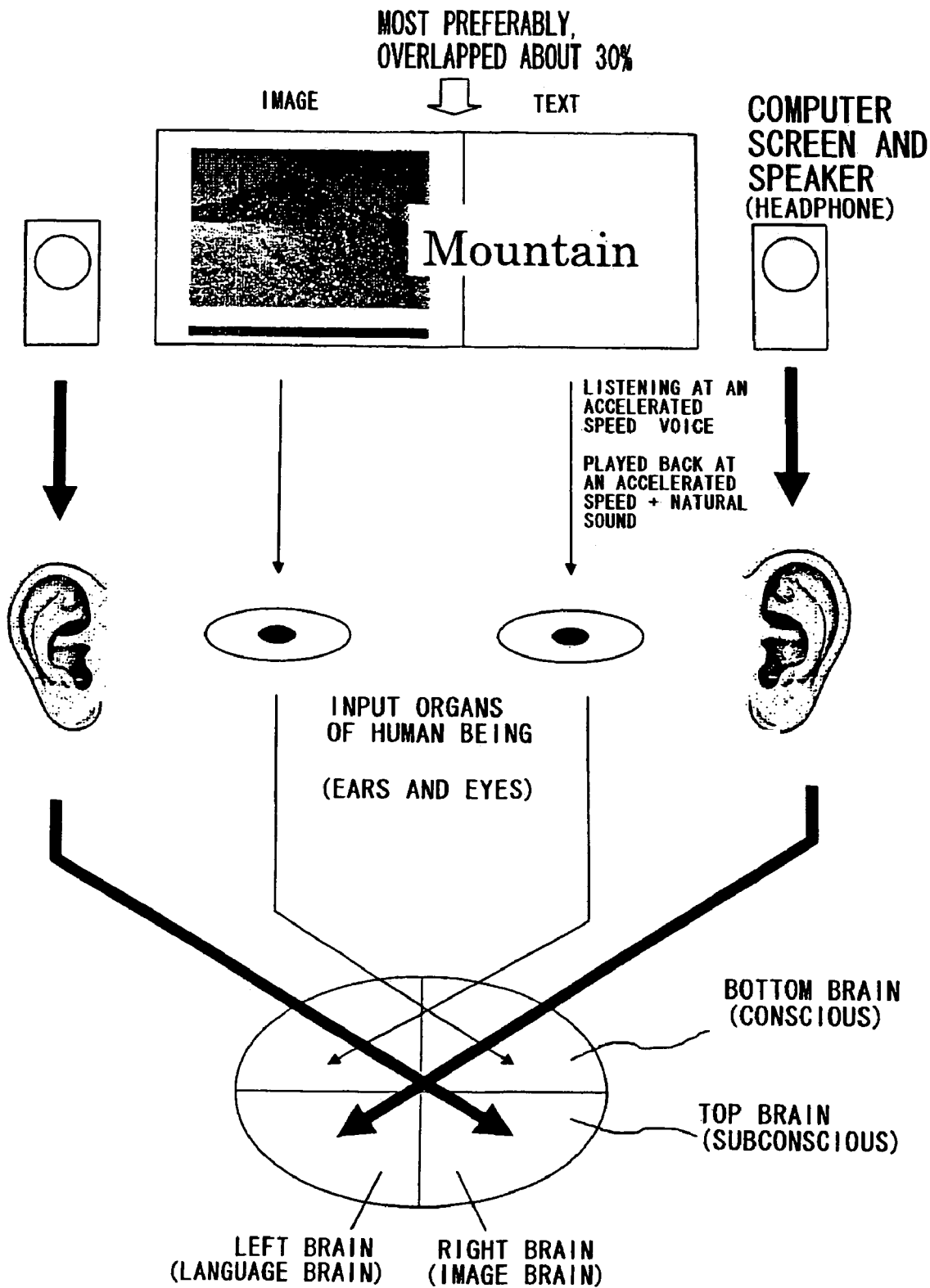
FIG. 34 is a conceptual diagram showing a method of assisting a user to memorize or learn a language according to the present invention.

FIG. 34 is a conceptual diagram showing a method of assisting a user to memorize or learn a language according to the present invention. As described earlier, the left-hand part of the brain is responsible for processing of languages, and the right-hand part of the brain is responsible for processing of images. Furthermore, the right-hand part of the brain is associated with left-hand parts of a human body, while the left-hand part of the brain is associated with right-hand parts of the human body. The inventor of the present invention believes that the brain has a particular part (bottom part) responsible for conscious operations and a part (upper part) responsible for subconscious operations. In Japanese Unexamined Patent Application Publication No. 2001-282298 cited earlier, the inventor of the present invention has disclosed a technique of removing a barrier between consciousness and subconsciousness by playing back a quick voice while superimposing a natural sound thereon. By using the flip card in conjunction with playback of a quick voice while superimposing a natural sound, it is possible to train the brain to operate in such a manner that the left-hand part and the right-hand part of the brain effectively cooperate with each other.

FIG. 35 is a diagram conceptually showing image data, text data, and voice data, which are linked to each other and used in the method of assisting a user to memorize or learn a language according to the present invention. Each image data such as an image of a mountain or an image of a flower has a plurality of category codes which allow image data to be easily retrieved. The category codes include a serial number, a main category (attribute), a middle category (attribute), and a minor category (attribute). Each image is linked to text information in a plurality of languages such as Chinese, Korean, Japanese, English, Russian, and French. According to the category codes, it is possible to extract similar words and/or associated words such as antonyms, or synonyms. The category codes can also be used to extract words according to a particular property such as a grade or a level. For example, first-type categories may include 160 categories such as natural worlds, materials, children, couples, lives, families, marriage, occupations, mass communications, businesses, politics, and science. Each first-type category may include second-type categories (sub categories). For example, the first-type category of natural worlds may include 16 second-level categories such as mountains, seas, rivers, and flowers, and the first-type category of materials may include 16 second-level categories such as chemical materials, stone, wood, and plastics. Third-type categories may be defined from a grammatical point of view. For example, the third-type categories may include adjective, adverbs, illustrative sentences, and short sentences. Each piece of language text information may include not only a word but also a sentence such as a short sentence or an illustrative sentence. Fourth-type categories may be defined according to grades in school. For example, fourth-type categories may include preschool grade, elementary school grade, junior high school grade, senior high school grade, university grade, and graduate grade. Fifth-type categories may be defined globally for all languages according to degrees of difficulty. For example, the fifth-type categories may include 12 categories such as level 1, level 2, level 3, level 4, level 5, level 6, . . . , level 12.

Figure 36:
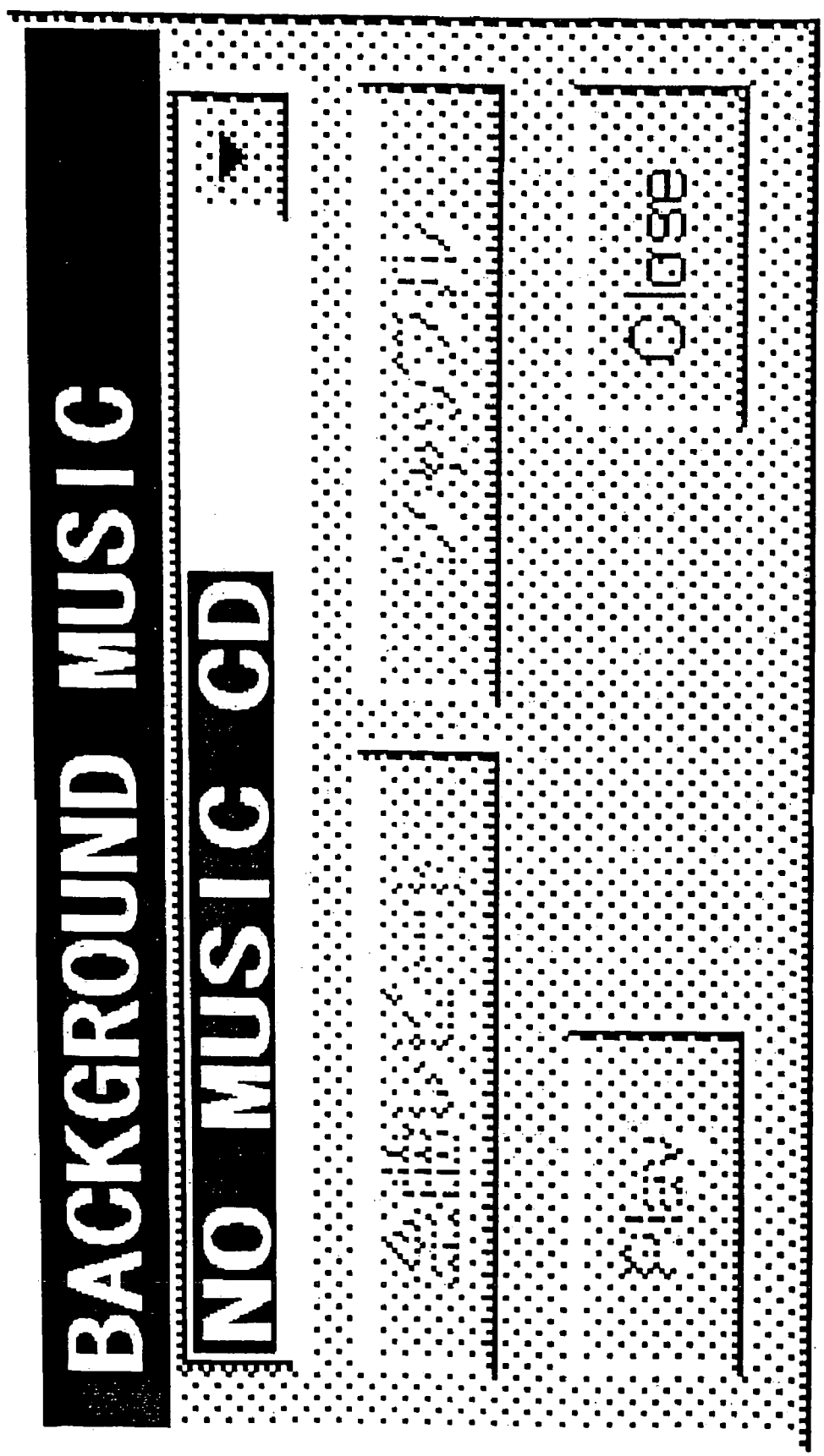
FIG. 36 is a diagram showing a screen for selecting a CD storing music (or a natural sound) to be played back in execution of the method of assisting a user to memorize or learn a language according to the present invention, wherein in this specific example, a message "NO MUSIC CD" is displayed to indicate that a selectable music CD is not found or a content of a CD is not of music although the CD is found.

FIG. 36 is a diagram showing a screen for selecting a CD storing music (or a natural sound) to be played back in execution of the method of assisting a user to memorize or learn a language according to the present invention. In this specific example shown in FIG. 36, a message "NO MUSIC CD" is displayed to indicate that a selectable music CD is not found or a content of a CD is not of music although the CD is found. In this situation, buttons "repeat all", "repeat single piece", and "shuffle" are all disabled.

Figure 37:
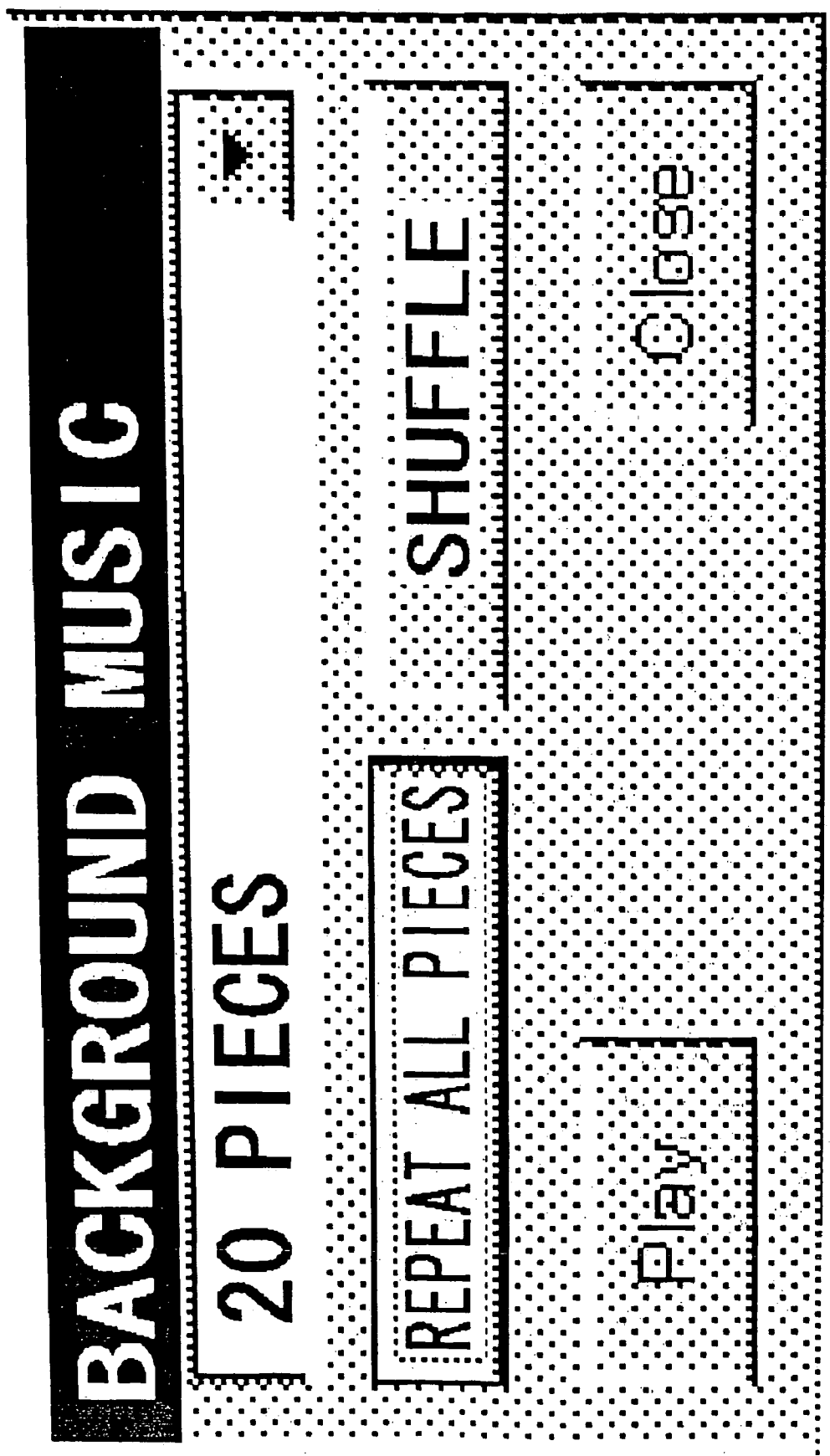
FIG. 37 is a diagram showing a screen for selecting a CD storing music (or a natural sound) to be played back in execution of the method of assisting a user to memorize or learn a language according to the present invention, wherein in this specific example, a music CD is found and the number of pieces stored on the music CD is displayed (20 pieces are stored on the music CD, in the example shown)

FIG. 37 is a diagram showing a screen for selecting a CD storing music (or a natural sound) to be played back in execution of the method of assisting a user to memorize or learn a language according to the present invention. In this specific example shown in FIG. 37, a music CD is found and the number of pieces stored on the music CD is displayed (20 pieces are stored on the music CD, in the example shown). In this state, if the "play" button is clicked, all pieces of music stored on the CD are played back successively.

Figure 38:
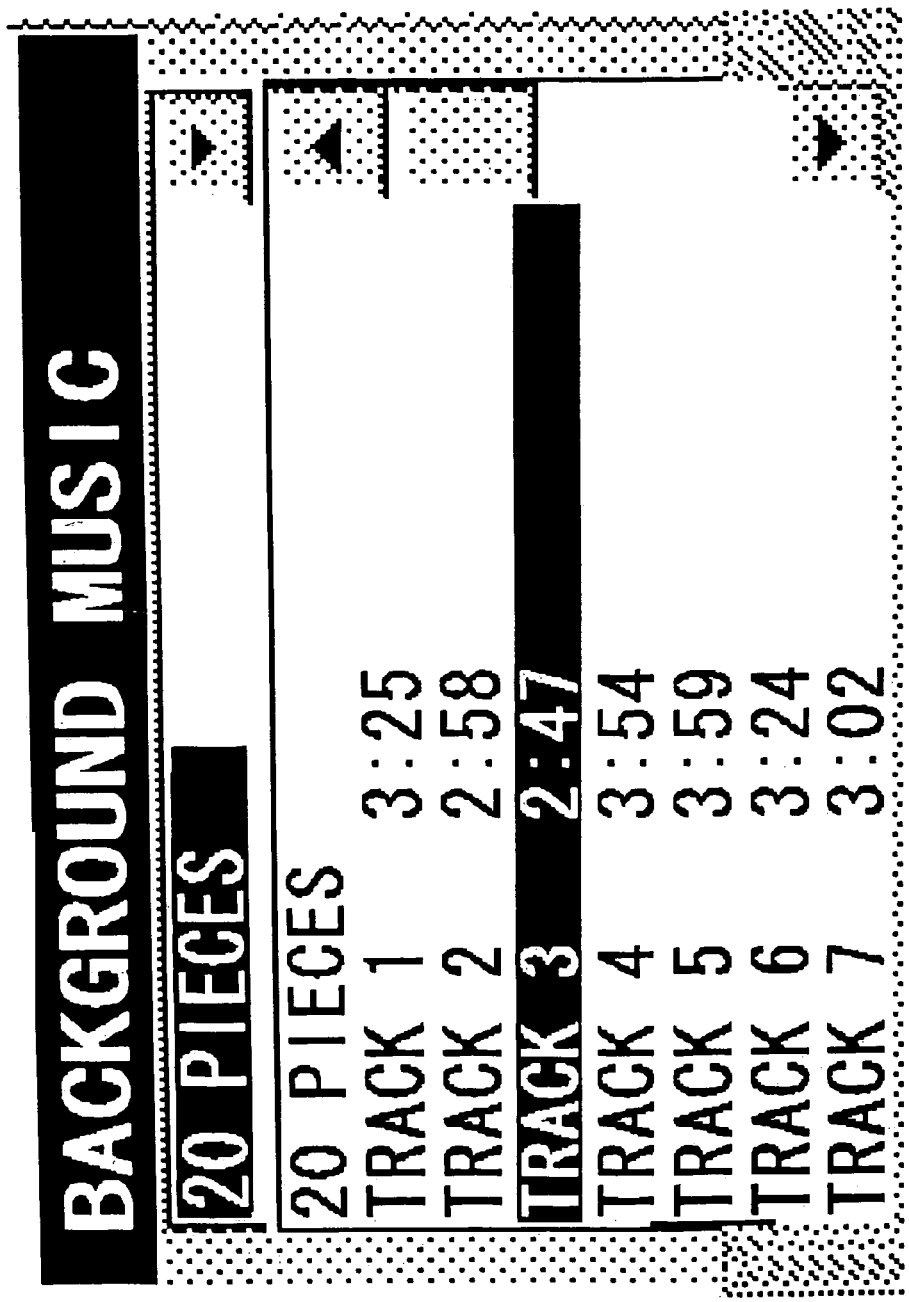
FIG. 38 is a diagram showing a screen for selecting a CD storing music (or a natural sound) to be played back in execution of the method of assisting a user to memorize or learn a language according to the present invention, wherein in this specific example, an inverted triangular button on the right-hand end of a field in which a message "20 pieces of music is stored on a music CD" is indicated is clicked to open a pull-down list of selectable 20 pieces of music.

FIG. 38 is a diagram showing a screen for selecting a CD storing music (or a natural sound) to be played back in execution of the method of assisting a user to memorize or learn a language according to the present invention, wherein in this specific example, an inverted triangular button on the right-hand end of a field in which a message "20 pieces of music is stored on a music CD" is indicated is clicked to open a pull-down list of selectable 20 pieces of music. The user can specify a desired piece of music by selecting a corresponding track from the list.

Figure 39:
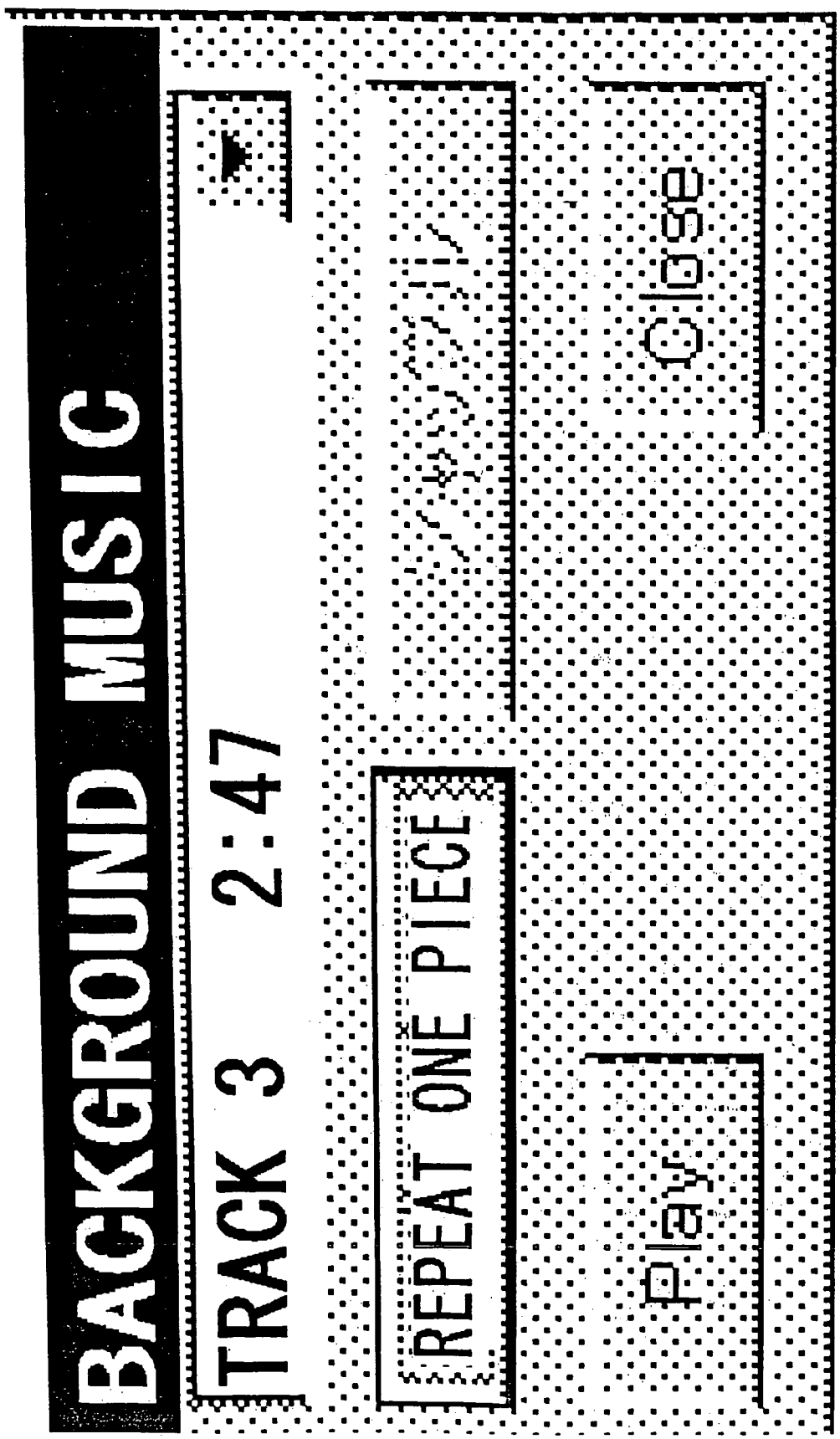
FIG. 39 is a diagram showing a screen for selecting a CD storing music (or a natural sound) to be played back in execution of the method of assisting a user to memorize or learn a language according to the present invention, wherein in this specific example, music with a length of 2 min 47 sec stored on track 3 is selected, and a "repeat single piece" button becomes clickable.

FIG. 39 is a diagram showing a screen for selecting a CD storing music (or a natural sound) to be played back in execution of the method of assisting a user to memorize or learn a language according to the present invention, wherein in this specific example, music with a length of 2 min 47 sec stored on track 3 is selected, and a "repeat single piece" button becomes clickable. After specifying a track, if the "repeat single piece" button is clicked and further the "play" button is clicked, the selected piece of music is played back.

Figure 40:
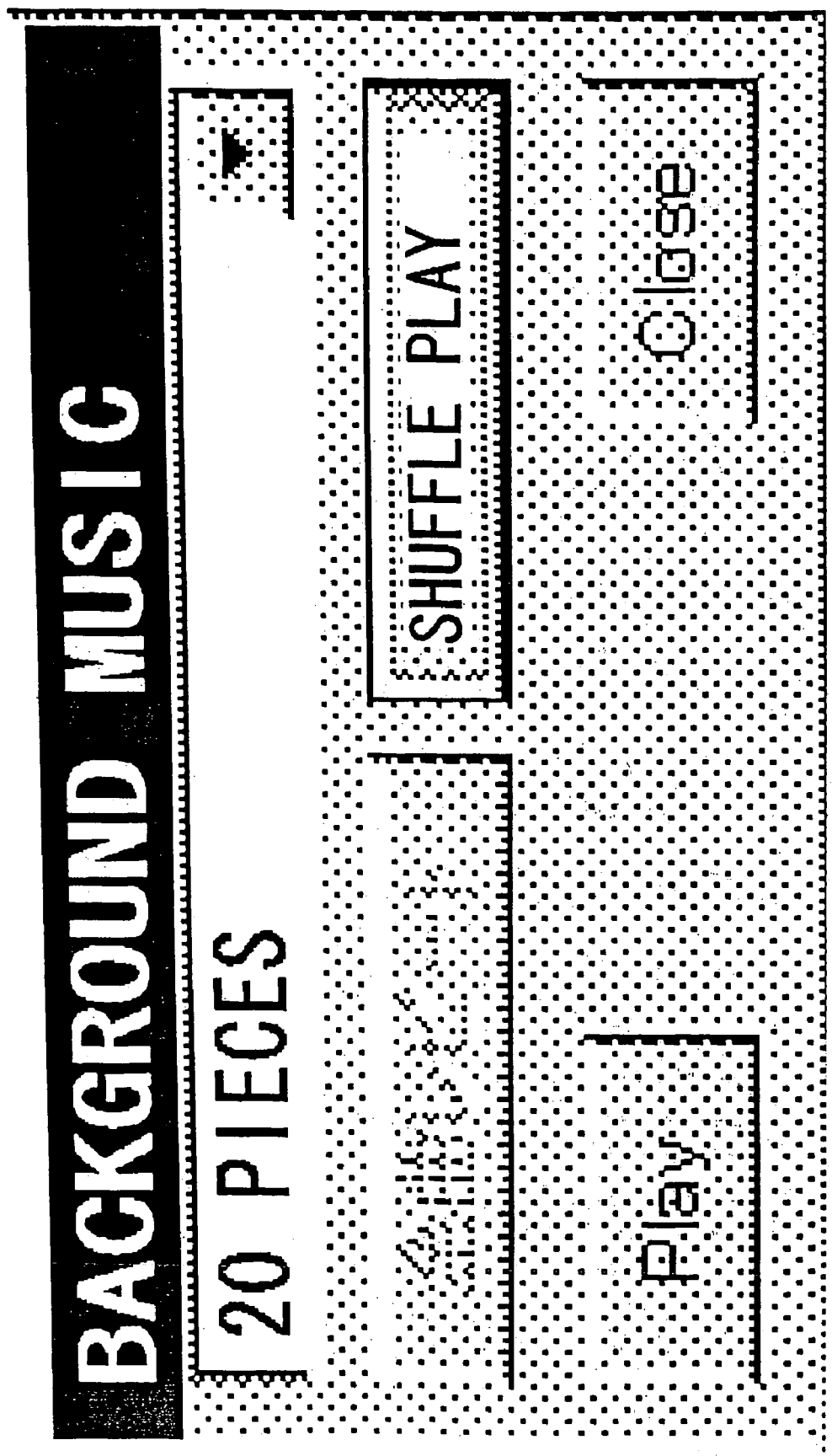
FIG. 40 is a diagram showing a screen for selecting a CD storing music (or a natural sound) to be played back in execution of the method of assisting a user to memorize or learn a language according to the present invention, wherein in this specific example, all 20 pieces of music are selected and a "shuffle" button is clicked to specify that the selected 20 pieces of music should be played back at random.

FIG. 40 is a diagram showing a screen for selecting a CD storing music (or a natural sound) to be played back in execution of the method of assisting a user to memorize or learn a language according to the present invention, wherein in this specific example, all 20 pieces of music are selected and a "shuffle" button is clicked to specify that the selected 20 pieces of music should be played back at random. That is, if the "play" button is clicked after the "shuffle" button is clicked, all pieces of music are played back in a shuffle mode (at random).

Figure 41:
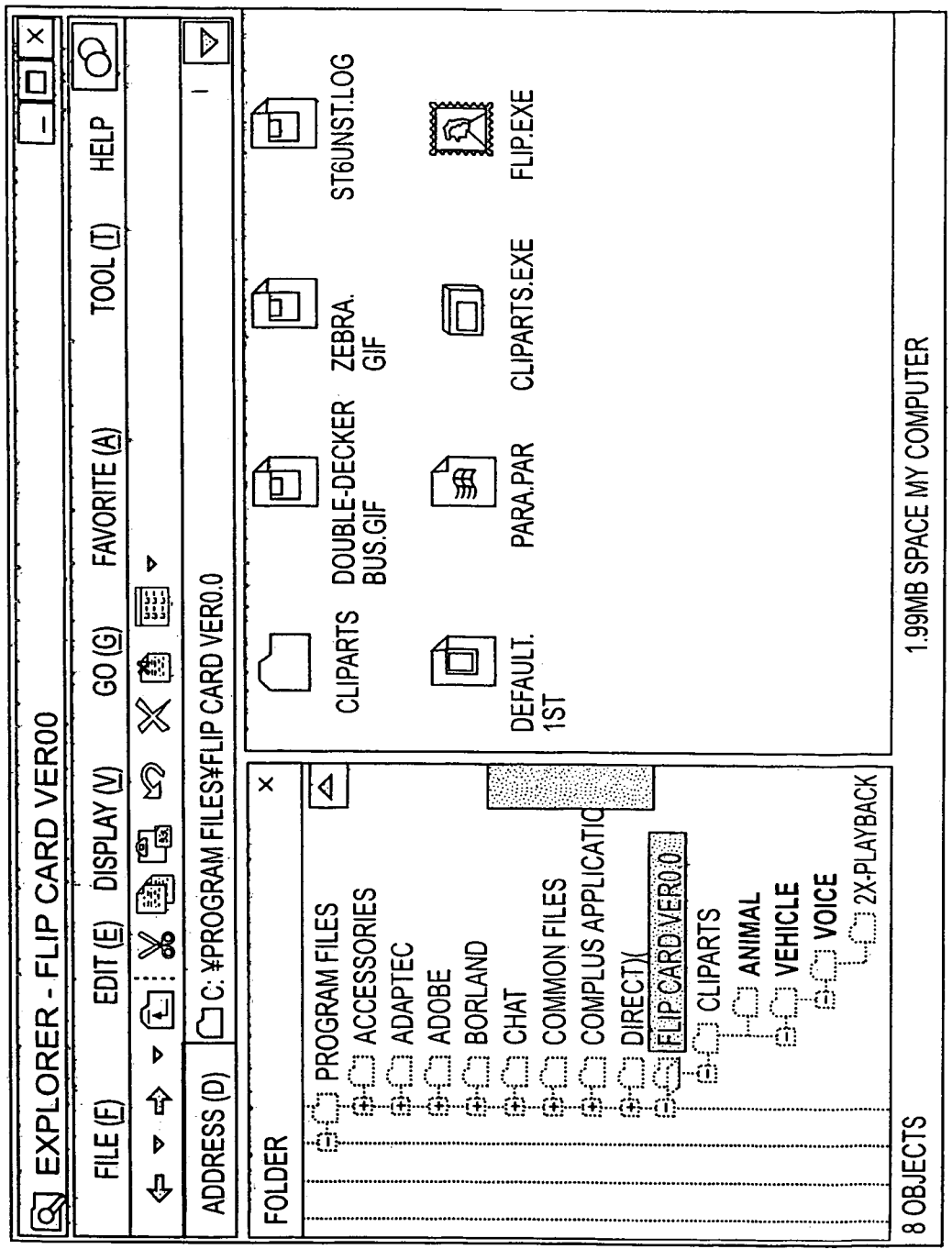
FIG. 41 is a diagram showing files used in the program of the method of assisting a user to memorize or learn a language, wherein in this specific example, image data and voice data are stored in a folder "ClipArts" which has sub-folders "animals" and "vehicles" each of which has a sub-folder "voice" for storing voice data. Each folder "voice" has a sub-folder "2×" for storing voice data speeded up by a factor of 2.

FIG. 41 is a diagram showing files used in the program of the method of assisting a user to memorize or learn a language. When installation of the flip card system according to the present invention and image data is completed, a folder named "ClipArts" for storing image data and voice data is created. The folder "ClipArts" has sub-folders "animals" and "vehicles" each of which has a sub-folder "voice" for storing voice data, and the sub-folder "voice" has a sub-folder "2× voice" for storing 2× voice data.

Figure 42:
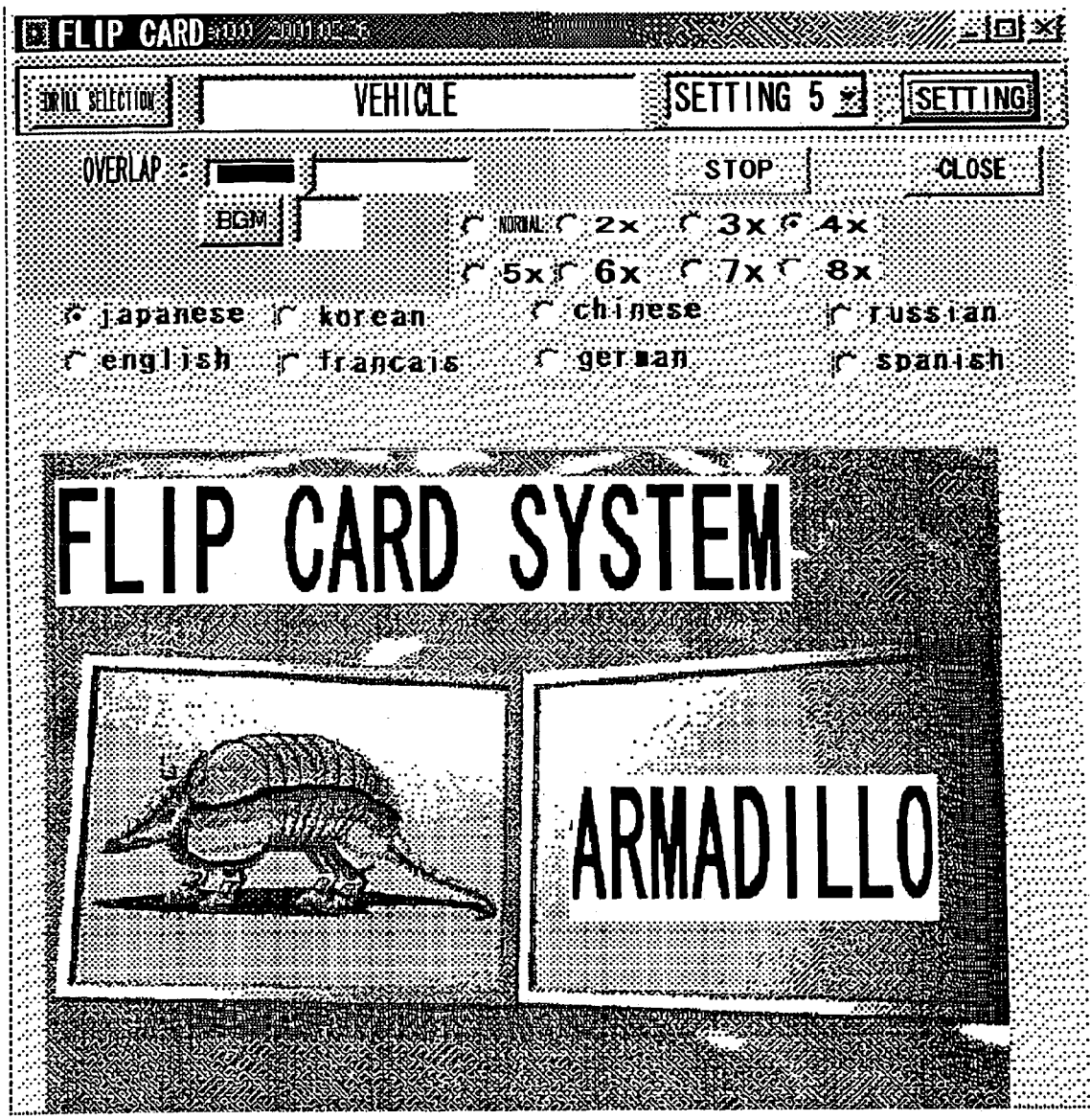
FIG. 42 is a diagram showing a screen displayed when the program of the method of assisting a user to memorize or learn a language is started, wherein in this specific example, the image-text overlapping ratio is set to 100%.

FIG. 42 is a diagram showing a screen which is displayed when the program of the method of assisting a user to memorize or learn a language is started. This is an example different from that shown in FIG. 16. In this example shown in FIG. 42, the image-text overlapping ratio is set to 100%. In this screen, a "drill selection" button is used to select a drill, and the title of a selected drill is displayed in a "drill title" field. A "setting selection" box is used to specify parameters such as a display cycle time. A "setting" button is used to open a screen for setting display parameters. An "overlap" slider is used to specify the overlap ratio (in %) between an image and text. A "start" button is used to start displaying the flip card program. A "BGM" button is used to select CD music to be played back as background music. A "BMG number" indicates a track number of background music currently selected.

Figure 43:
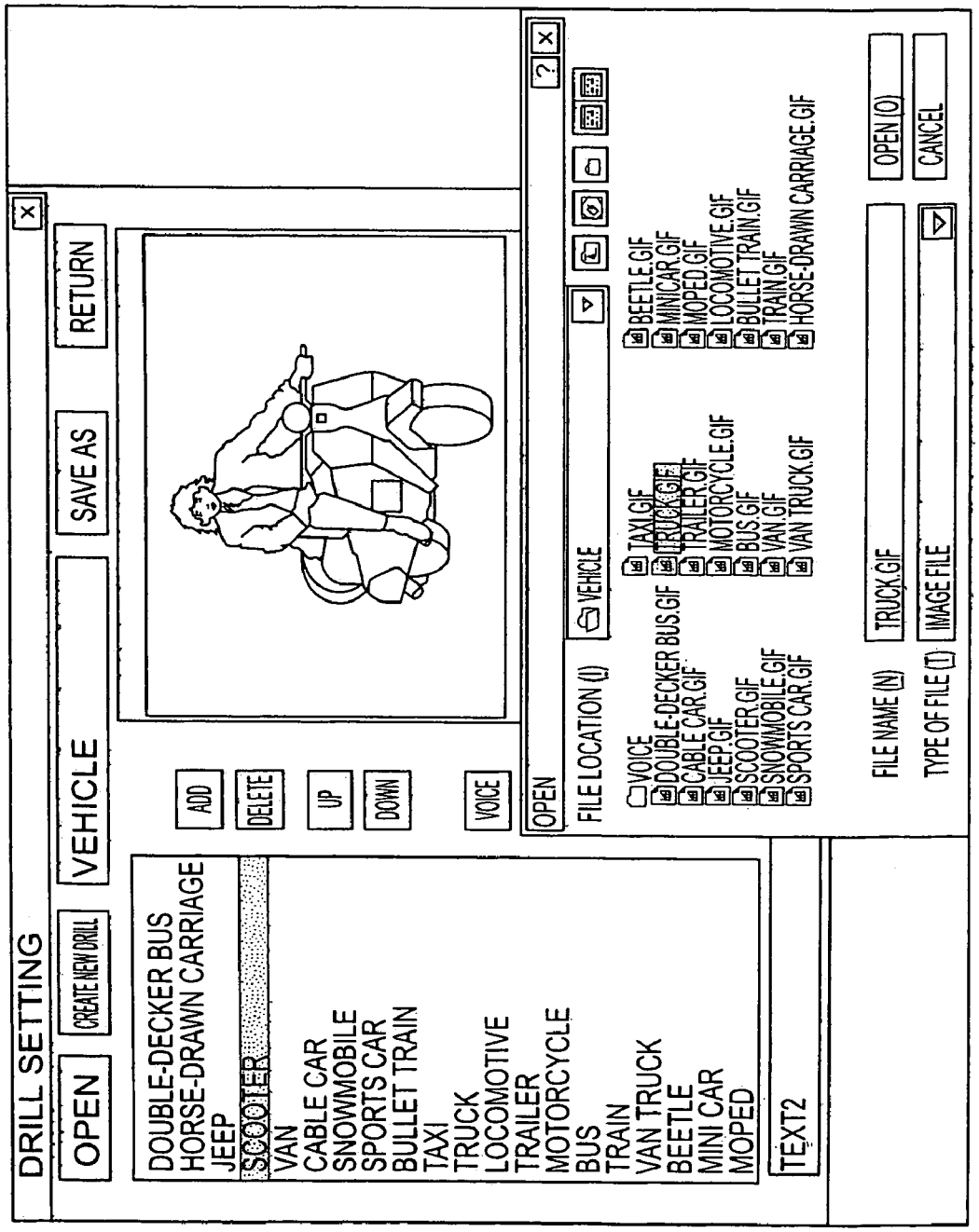
FIG. 43 is a hard copy of a screen for performing settings associated with a drill.

Setting associated with a drill are described below with reference to FIGS. 43 to 45. FIG. 43 is a hard copy of a screen for performing settings associated with a drill. To add a new image, an "add" button is first clicked. In response, an "open" screen appears, which allows a user to add a new image to the list of images, at a position immediately below a highlighted position. In this specific example, "truck" is added below "scooter". Image may be stored in image files in a proper format such as gif, jpg, or bmp.

Figure 44:
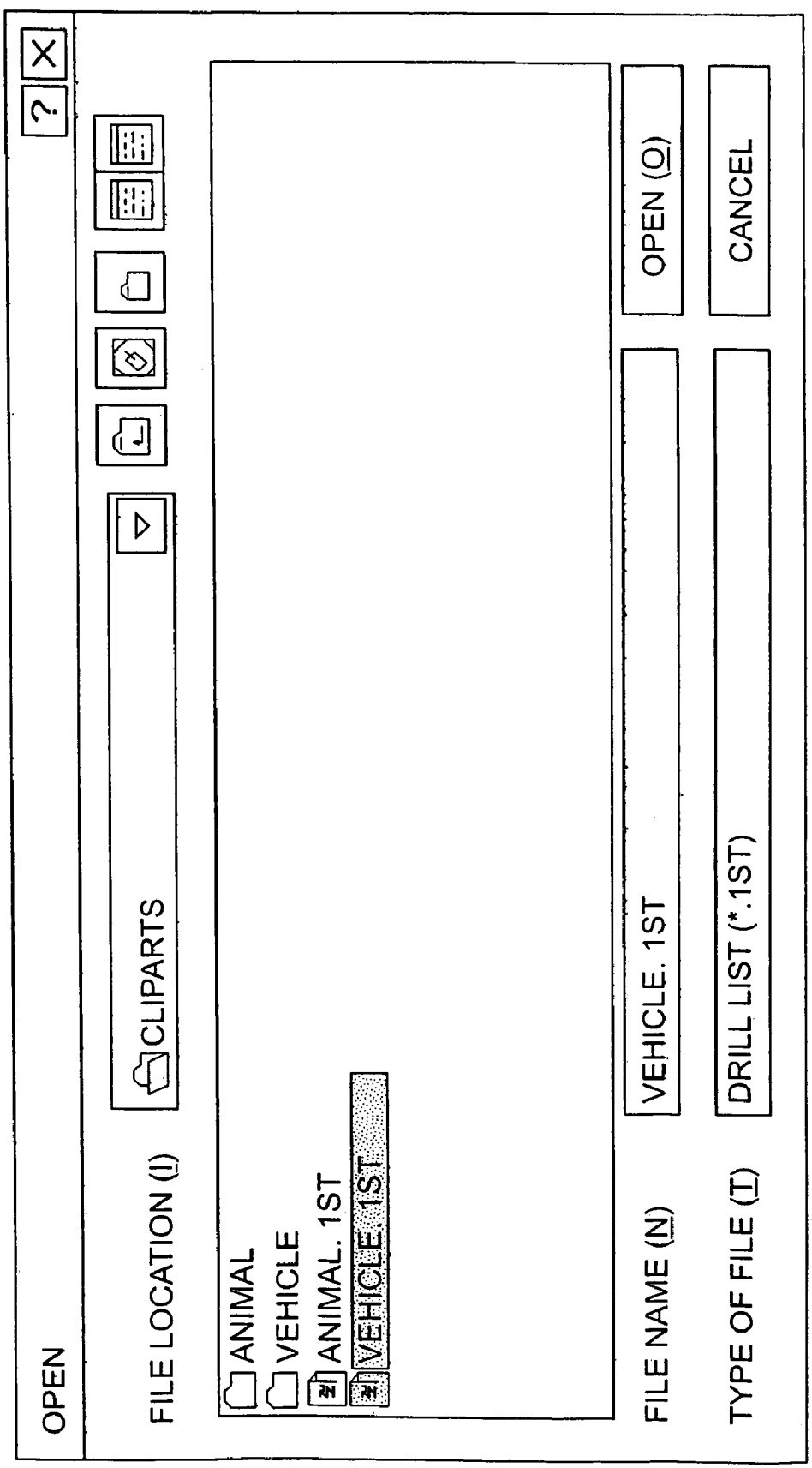
FIG. 44 is a hard copy of a window in which a list of drills is displayed.

FIG. 44 is a hard copy of a window in which a list of drills is displayed. In this window, a user can select a drill list file to be opened. Herein, each drill list file has a file name in the form of "\*\*\*.1st". The file name is directly employed as a drill title.

Figure 45:
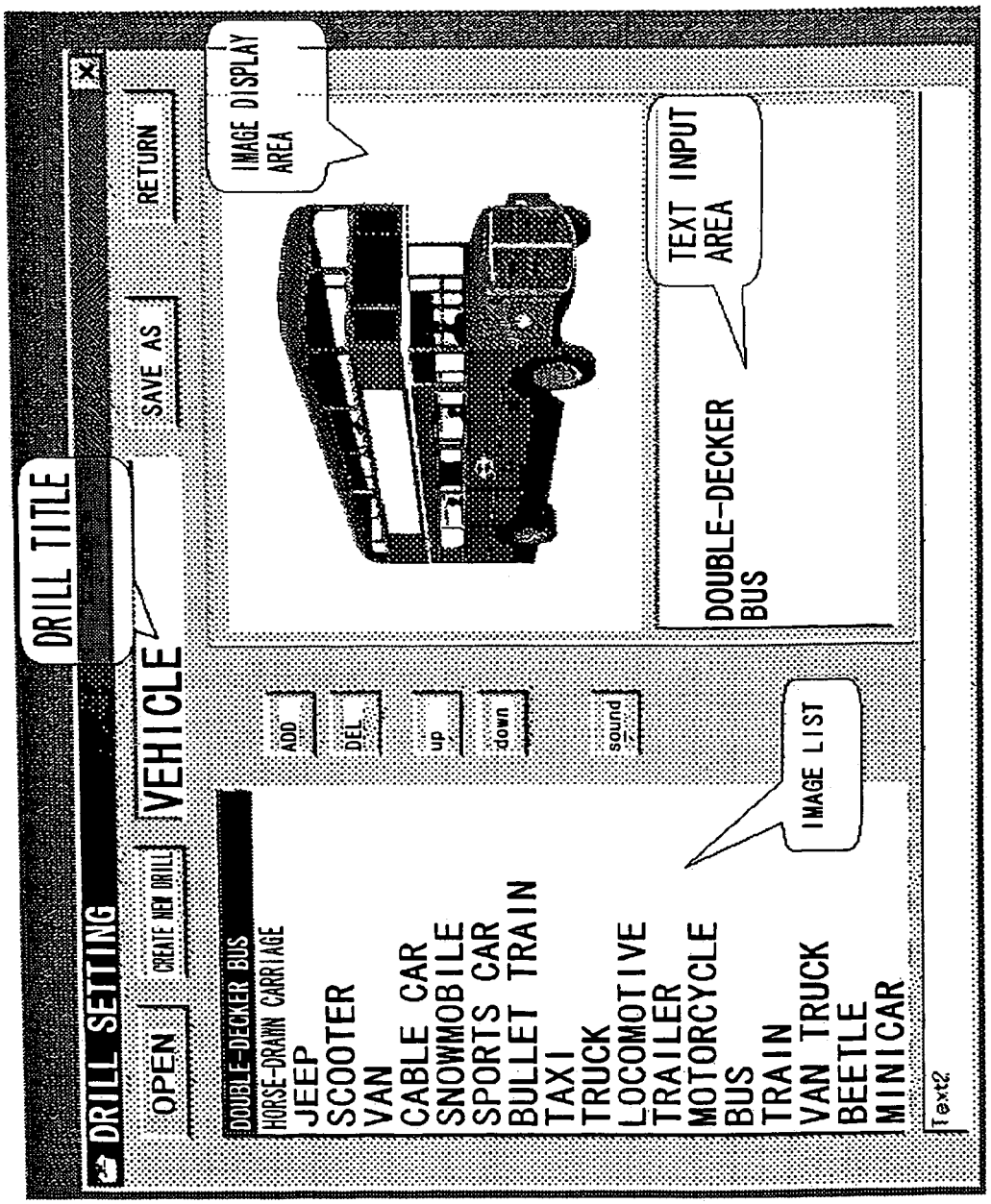
FIG. 45 is a diagram showing a drill setting screen, wherein in this specific example, image data is called on the screen and text data and voice data associated are linked to the image data.

FIG. 45 is a diagram showing a drill setting screen. In this screen, a user can call image data and can input text data to be linked to the image data. It is also possible to link desired music data to the image data. In this screen an "open" button is used to open an existing drill list. A "create" button is used to create a new drill list. In a "drill title" filed, a drill title is displayed. A "save as" button is used to specify a name of a file into which to store a drill list. A "return" button is used to return to the main screen. An "add" button is used to add an image to an image list. A "delete" button is used to delete a specified image from a list. An "up" button is used to move the location of a specified image upwardly by one position. A "down" button is used to move the location of a specified image downwardly by one position. When the flip card system is executed for the first time, no drill name is specified. In this case, after completion of installing image files, the "open" button is clicked to open a desired file such as "vehicles.1st" in the directory "ClipArt", and setting associated with the drill is performed.

Figure 47:
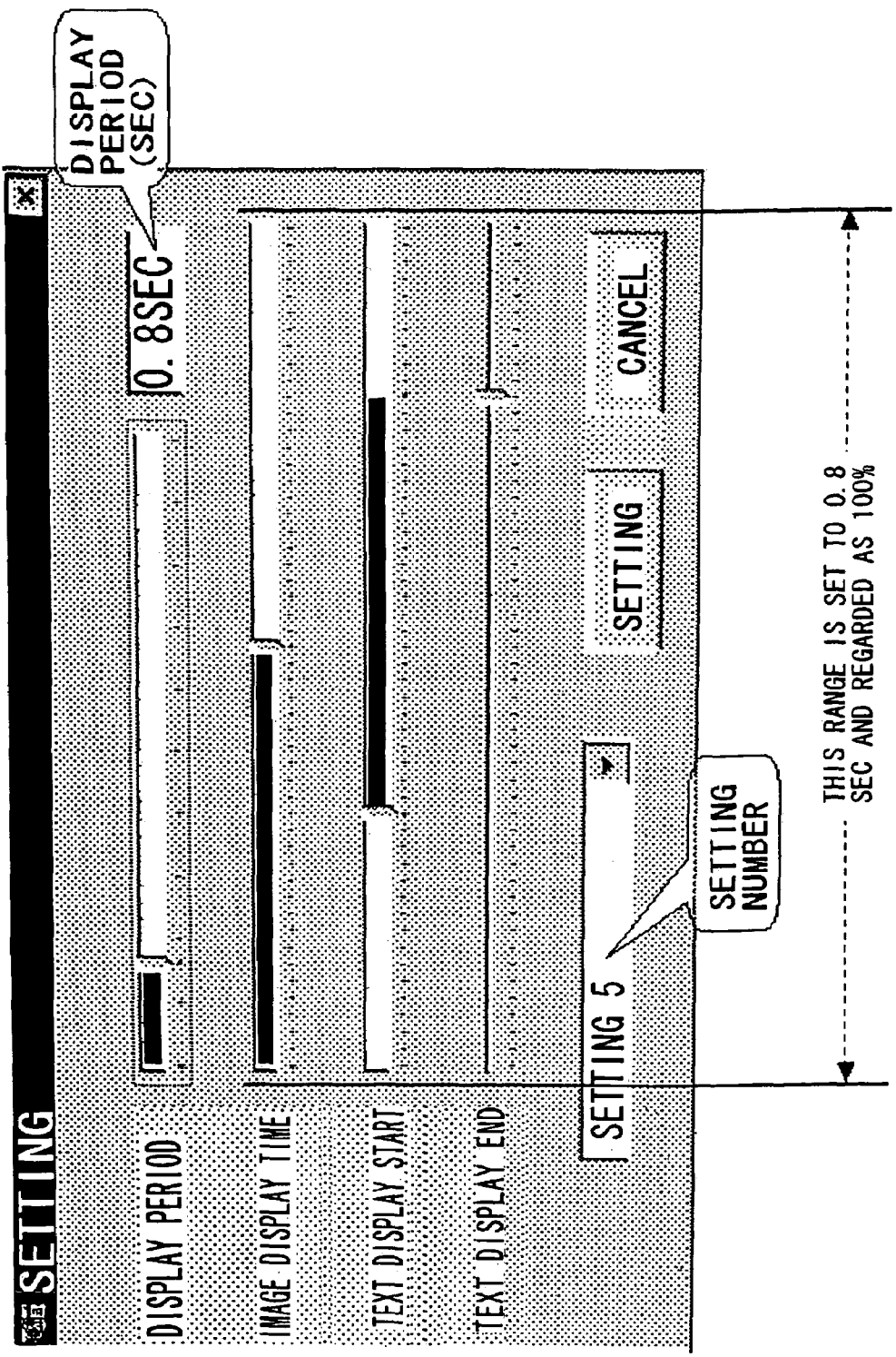
FIG. 47 is a hard copy of a screen for setting conditions associated with a display cycle time, an image display period, a text display time, and a text delete timing.

Display parameters are described below with reference to FIG. 47. FIG. 47 is a hard copy of a screen for setting conditions associated with a display cycle time, an image display period, a text display time, and a text delete timing. In this screen, a "display cycle time" slider is used to specify periodic intervals at which flip cards are displayed one after another. A shortest allowable display cycle time is 0.3 sec. An "image display period" slider is used to specify a period during which to display an image, wherein the image display period is represented in % relative to the display cycle time specified by the "display cycle time" slider. A "text display time" slider is used to specify a time at which displaying of text information is started, wherein the time is represented in % relative to the display cycle time. Playback of a corresponding voice is also started at the same time as the text display time. A "text delete time" slider is used to specify a time at which the text information is deleted. However, if a corresponding voice is played back further after the specified text delete time, the text information is also further displayed. That is, the length of the period of displaying text information varies depending on the length of the period of playing back corresponding voice data. A "setting number" selection box is used to select a setting number assigned to a set of parameters. A "setting" button is used to apply the specified parameters to a selected setting number. A "cancel" button is used to return to the main screen without changing any parameter.

Figure 48:
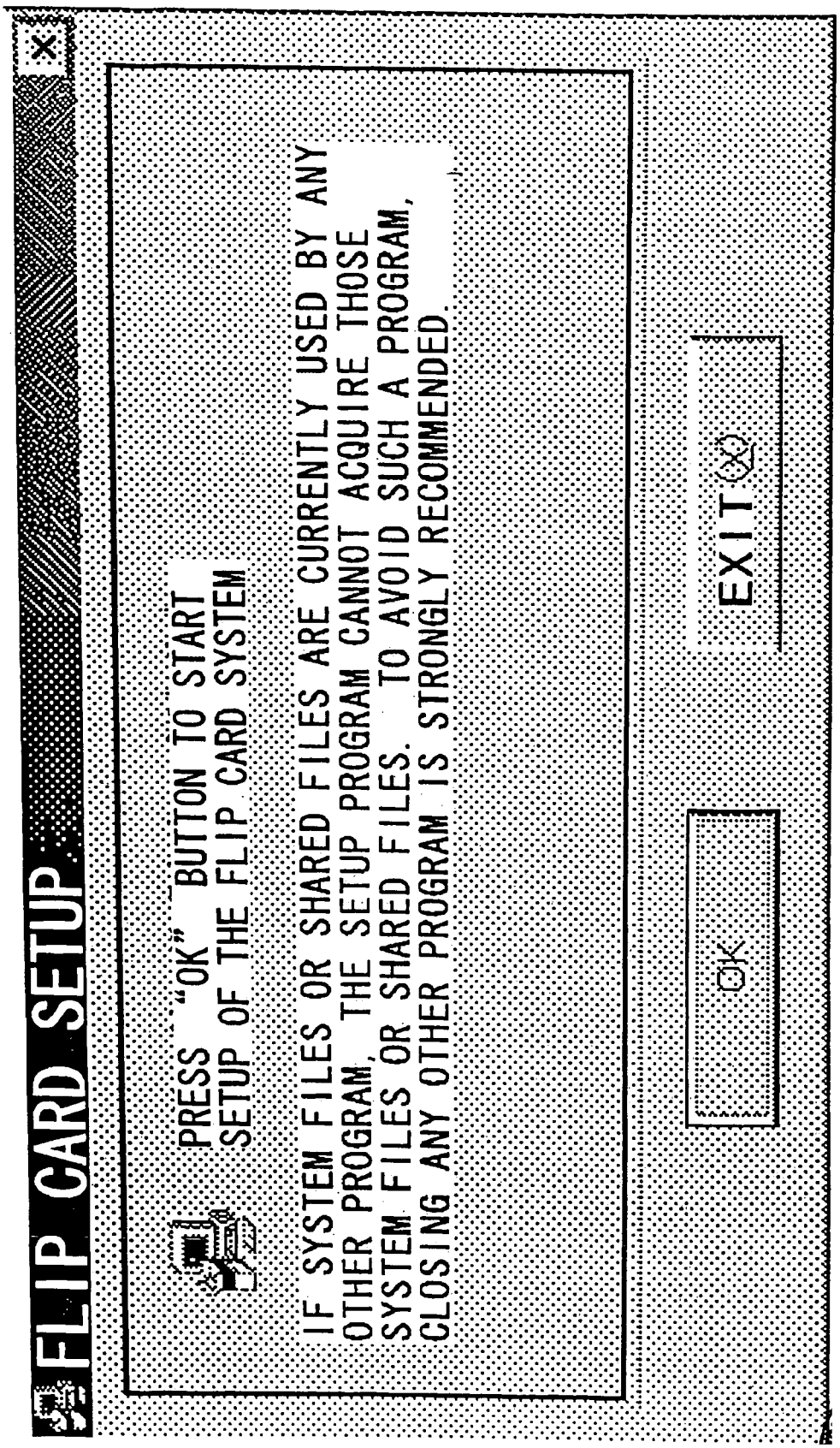
FIG. 48 is a diagram showing an initial screen for installing the program of the method of assisting memorization according to the present invention onto a computer.

FIG. 48 is a diagram showing an initial screen for installing onto a computer the program of the method of assisting memorization according to the present invention. After a CD-ROM on which the flip card program is stored is opened, if setup.exe is executed by double-clicking, the initial screen shown in FIG. 48 appears. If an "OK" button is clicked, the installation is started.

Figure 49:
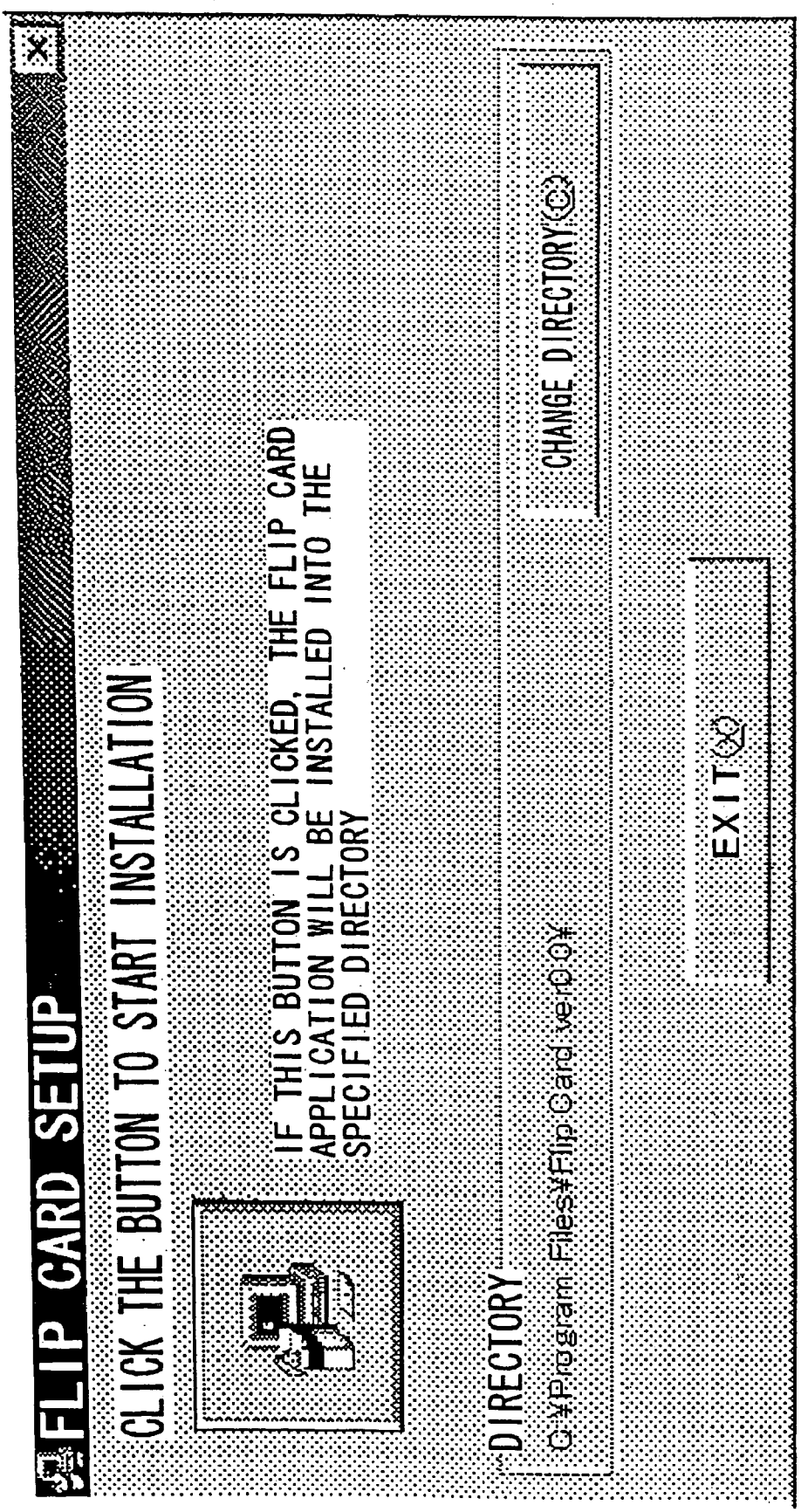
FIG. 49 is a diagram showing a screen for specifying a directory into which to install the program.

FIG. 49 is a diagram showing a screen for specifying a directory into which to install the program. When it is desired to change the directory into which to install the flip card program, a "change directory" button is clicked and a directory is specified. After specifying the directory, if a "setup" button is clicked, the installation is started.

Figure 50:
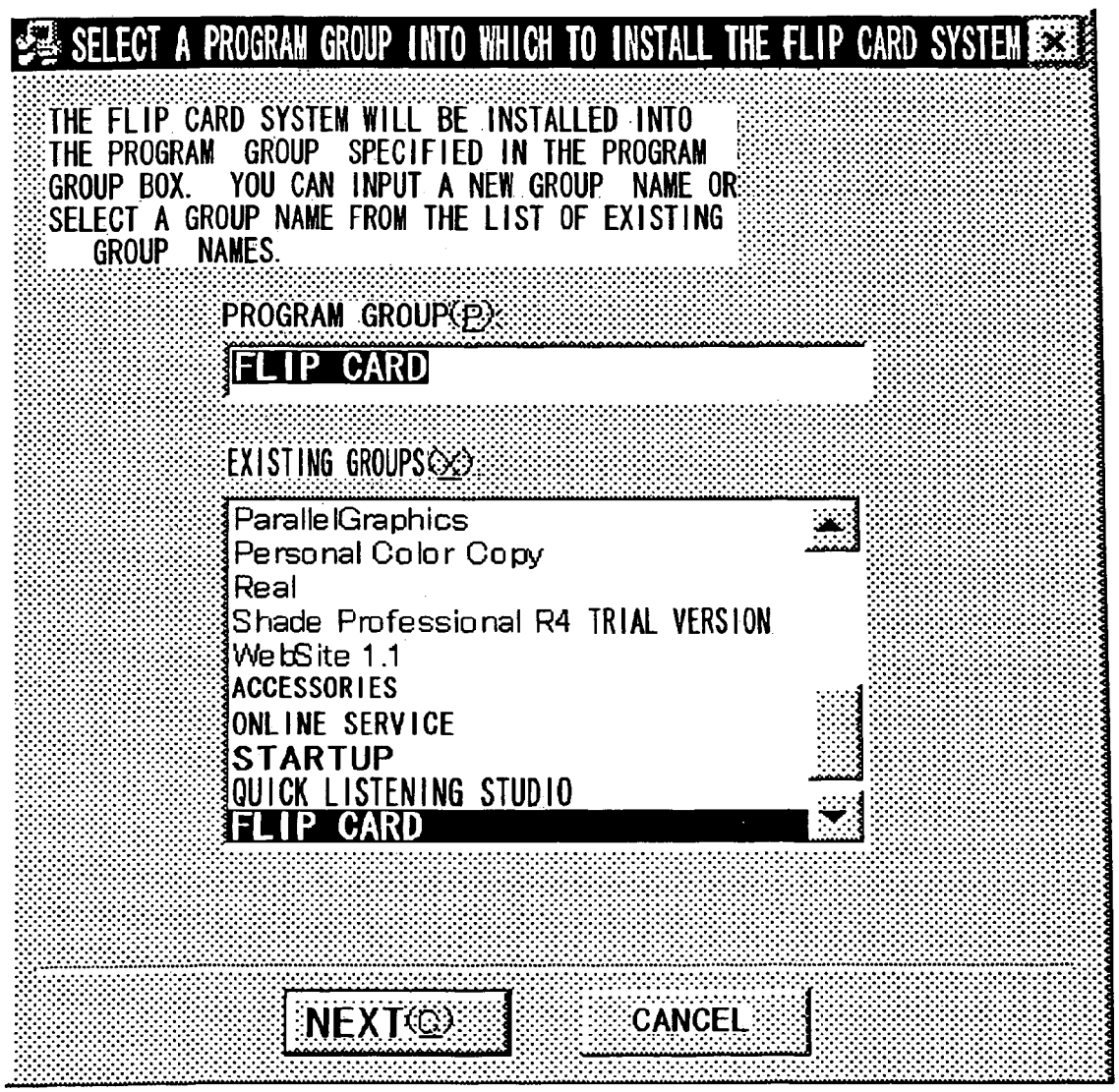
FIG. 50 is a diagram showing a screen for specifying a program group name into which to install the program.

FIG. 50 is a diagram showing a screen for specifying a program group name into which to register the flip card system.

Figure 51:
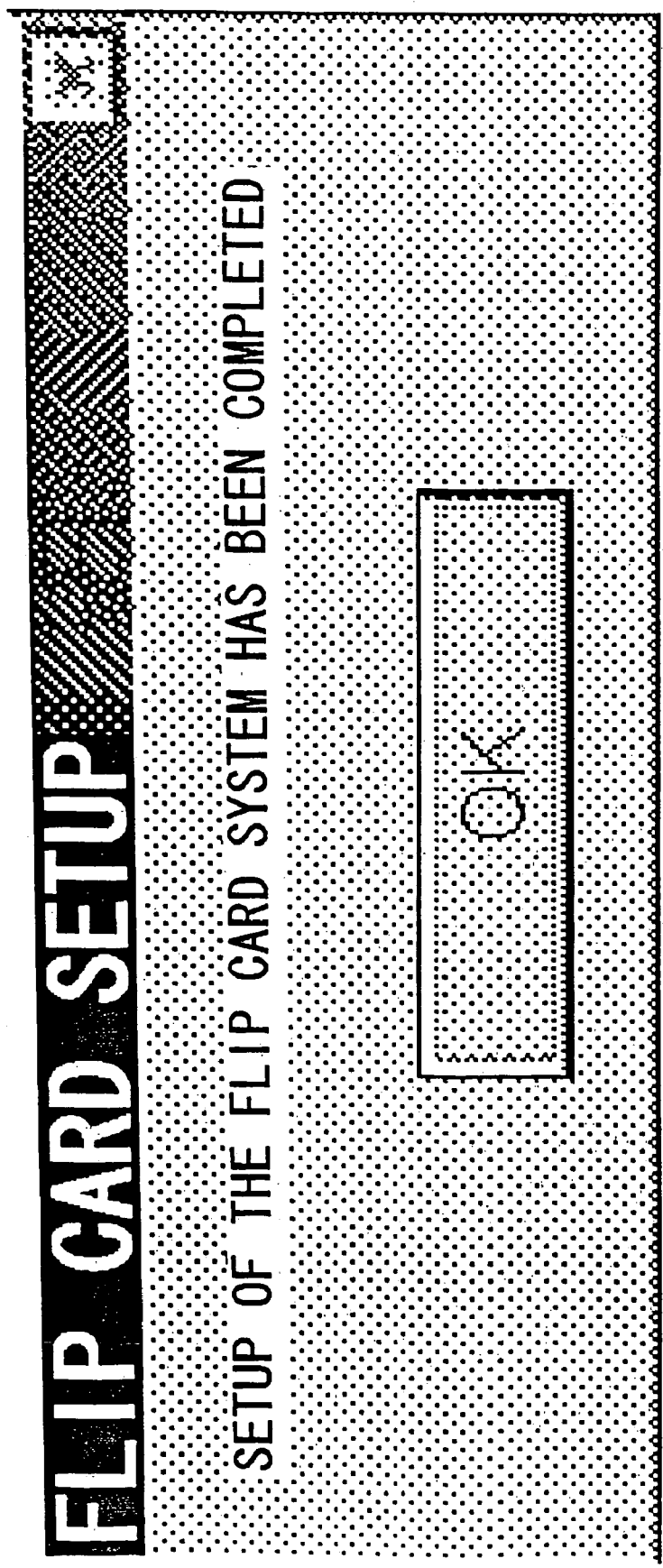
FIG. 51 is a diagram showing a window in which a message indicating the completion of the installation is displayed.

FIG. 51 is a diagram showing a window in which a message indicating the completion of the installation is displayed. At this point of time, the installation of the program has been completed. Thereafter, installing of image data is performed.

Figure 46:
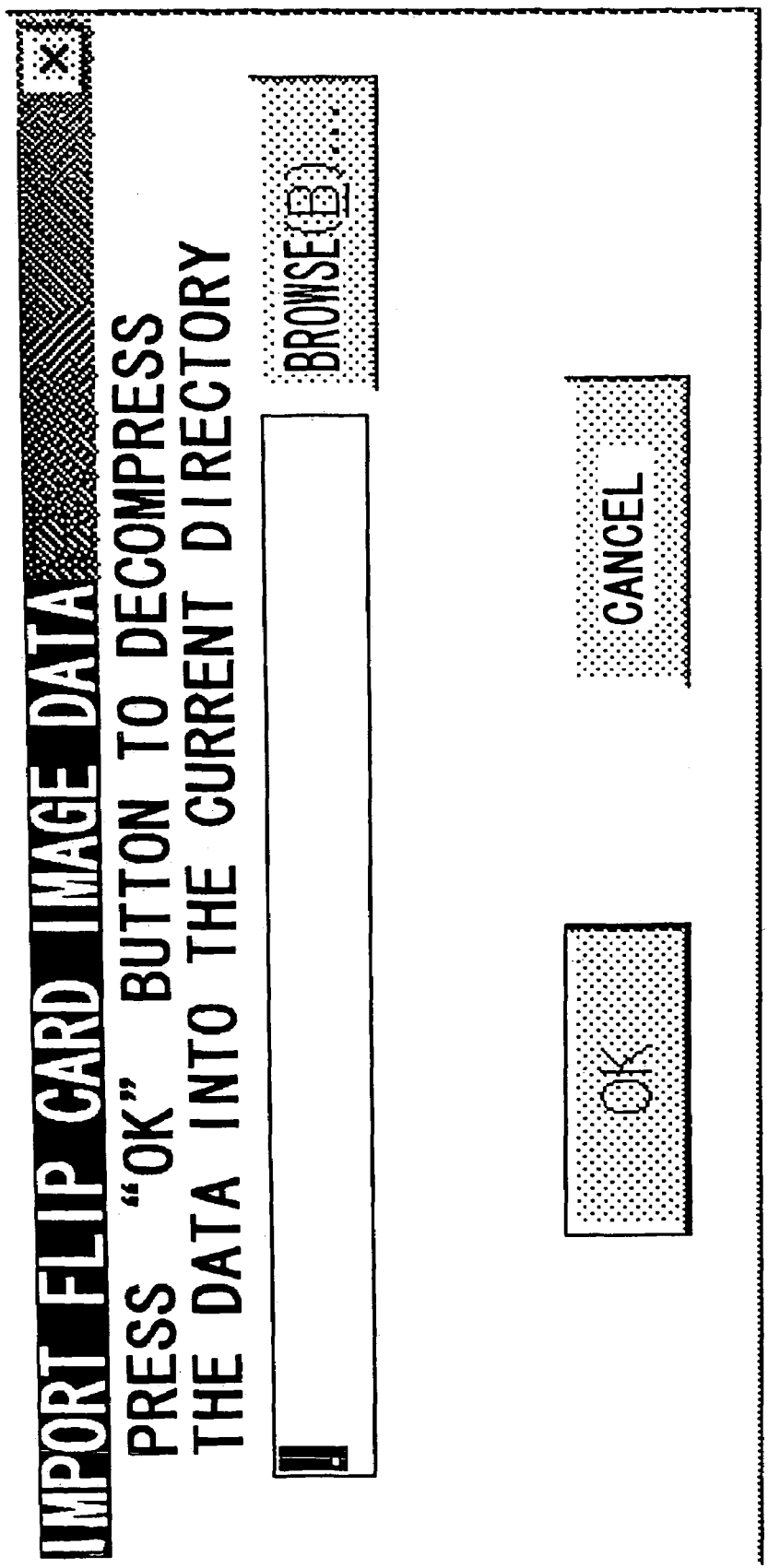
FIG. 46 is a diagram showing a screen for installing image data.

FIG. 46 is a diagram showing a screen for installing image data or voice data to be used in the flip card system. This screen can be opened by successively selecting "start", "program", "flip card", and "install image data", from menus.

Figure 52:
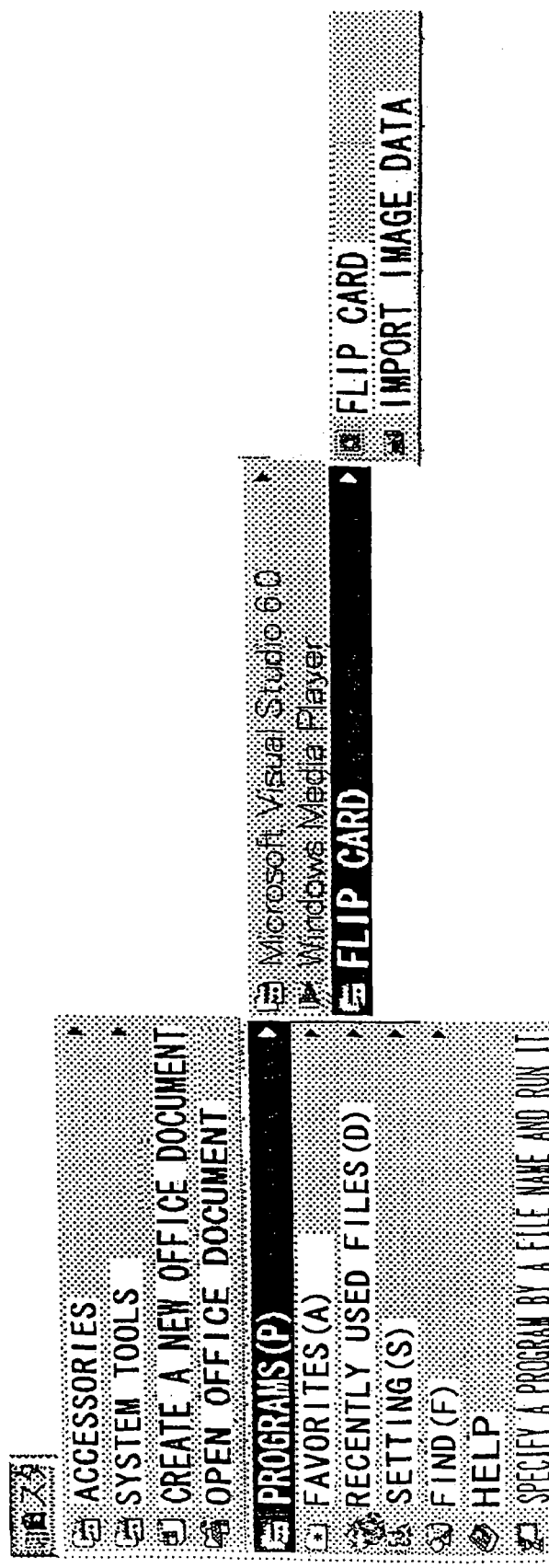
FIG. 52 is a diagram showing a manner in which the program is started.

FIG. 52 is a diagram showing a manner in which the program is started. As shown in FIG. 52, the program can be started by selecting "flip card" from the "start" menu.

Figure 53:
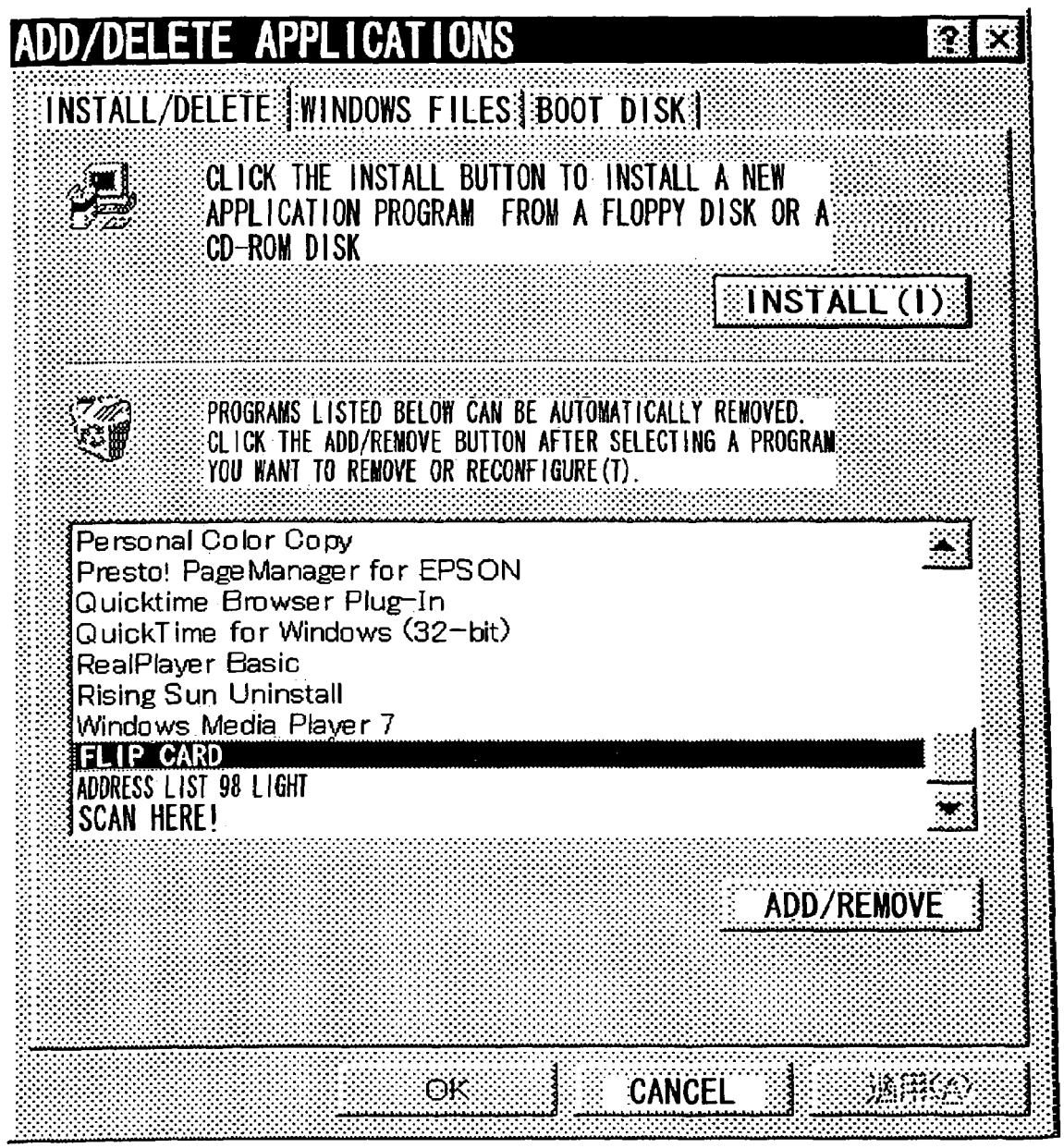
FIG. 53 is a diagram showing a manner in which the program is uninstalled.

FIG. 53 is a diagram showing a manner in which the program is uninstalled. When the flip card system is deleted or upgraded, the existing flip card system is uninstalled.

After a control panel is opened, if "add/delete applications" is selected in the control panel, a list of applications is displayed. If "flip card" is selected from the list, and an "add/delete" button is clicked, the flip card program is uninstalled.

Figure 54:
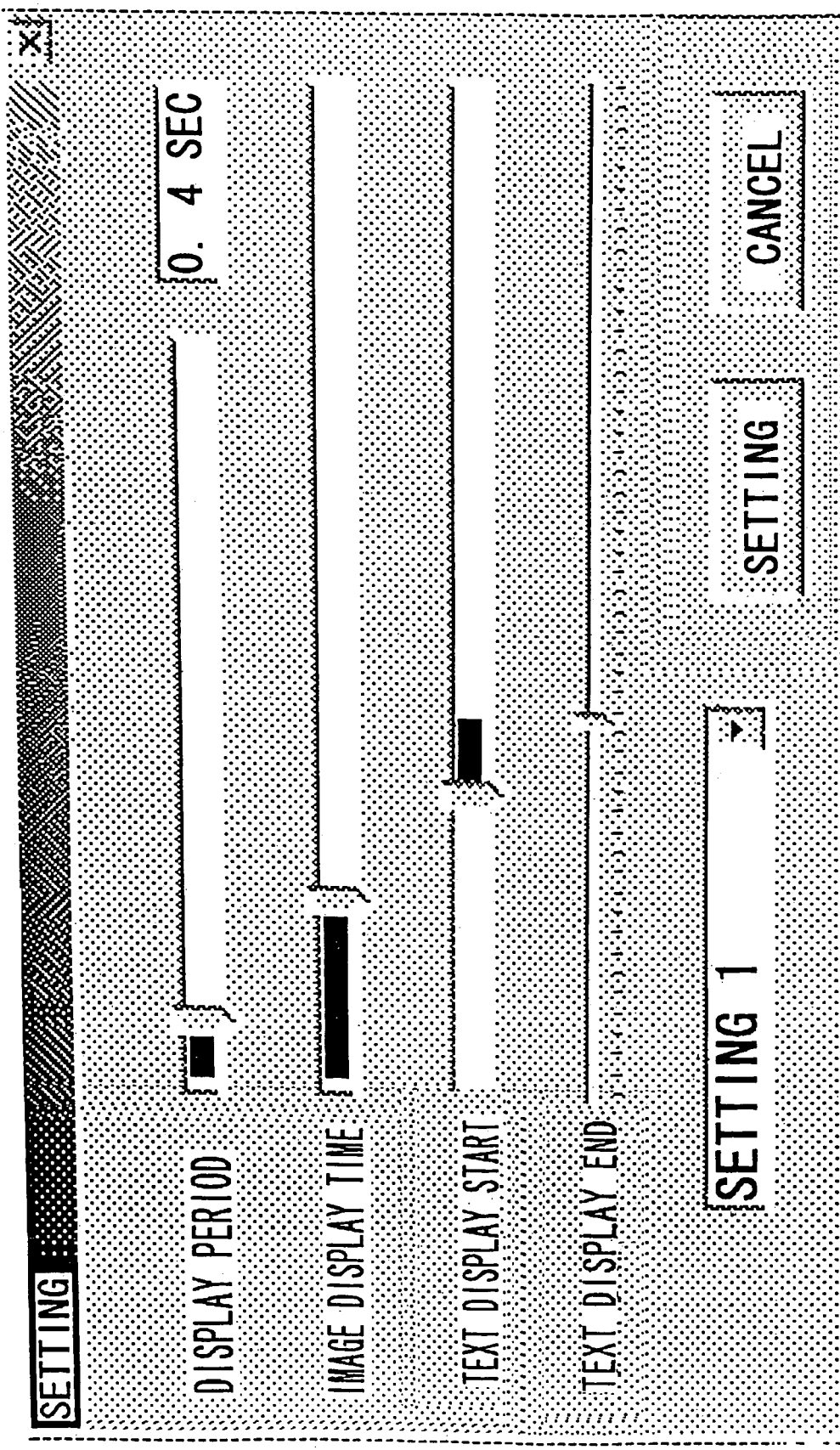
FIG. 54 is a diagram showing a screen in which condition 1 is set.

FIG. 54 is a diagram showing a screen in which condition 1 is set. In this specific example, the display cycle time is set to 0.4 sec and other conditions are set as follows. At the beginning of each display cycle time, an image is displayed for the image display period equal to 20% of the display cycle time. After deleting the image at the end of the image display period, a short pause is put. After the short pause, text data is displayed for the text display period equal to 10% of the display cycle time. At the end of the text display period, the text data is deleted.

Figure 55:
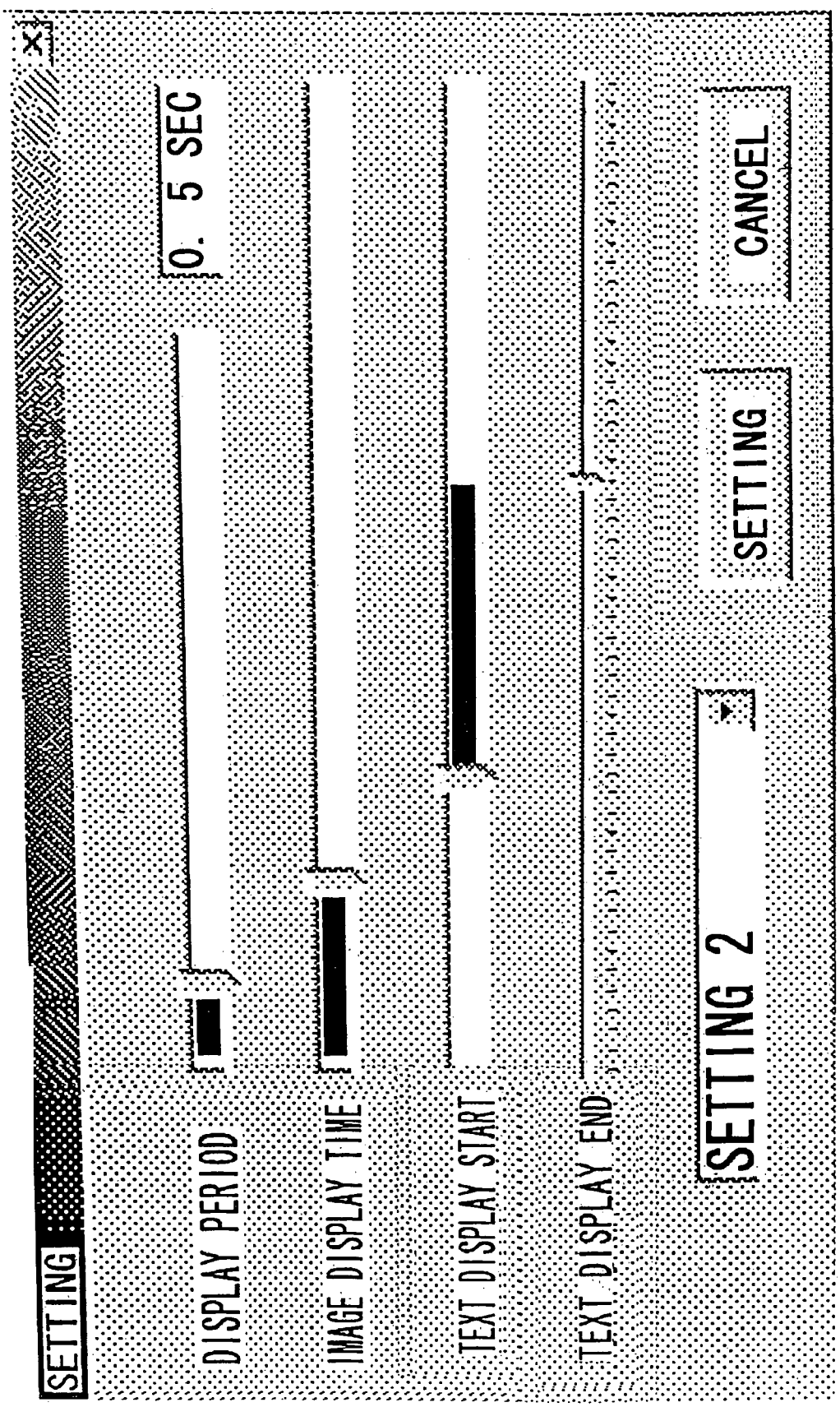
FIG. 55 is a diagram showing a screen in which condition 2 is set.

FIG. 55 is a diagram showing a screen in which condition 2 is set. In this specific example, the display cycle time is set to 0.5 sec and other conditions are set as follows. At the beginning of the display cycle time, an image is displayed for the image display period equal to 20% of the display cycle time. After deleting the image at the end of the image display period, a short pause is put. After the short pause, text data is displayed for a period equal to 40% of the display cycle time.

Figure 56:
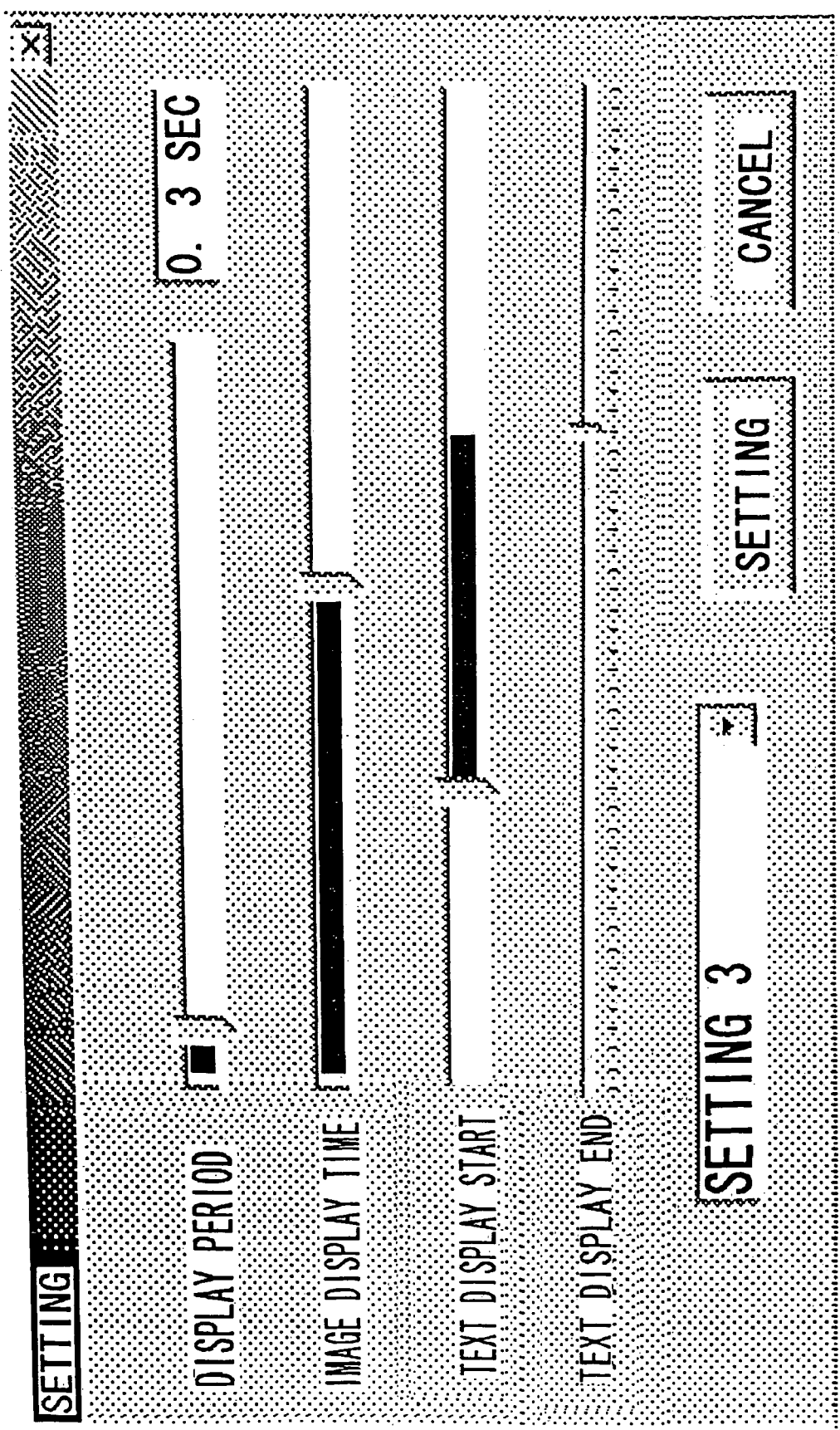
FIG. 56 is a diagram showing a screen in which condition 3 is set.

FIG. 56 is a diagram showing a screen in which condition 3 is set. In this specific example, the display period is set to 0.3 sec and other conditions are set as follows. At the beginning of the display cycle time, an image is displayed for a period equal to 50% of the display cycle time. Text data is displayed for a period equal to 40% of the display cycle time, partially overlapping with the image display period.

Figure 57:
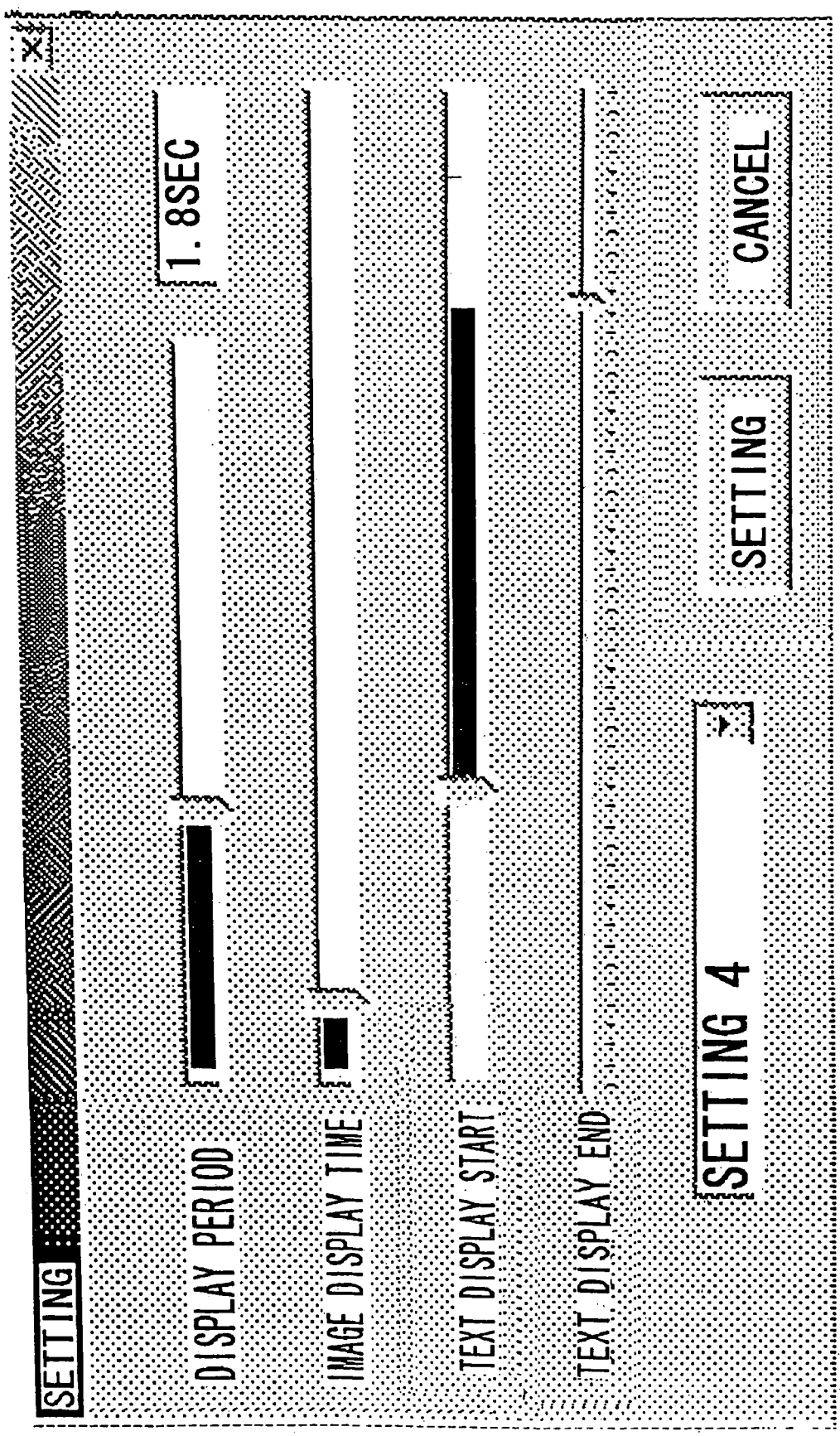
FIG. 57 is a diagram showing a screen in which condition 4 is set.

FIG. 57 is a diagram showing a screen in which condition 4 is set. In this specific example, the display cycle time is set to 1.8 sec, and other conditions are set as follows. At the beginning of the display cycle time, an image is displayed for a period equal to 5% of the display cycle time. After the image display period, a short pause is put. After the short pause, text data is displayed for a period equal to 50% of the display cycle time.

Figure 58:
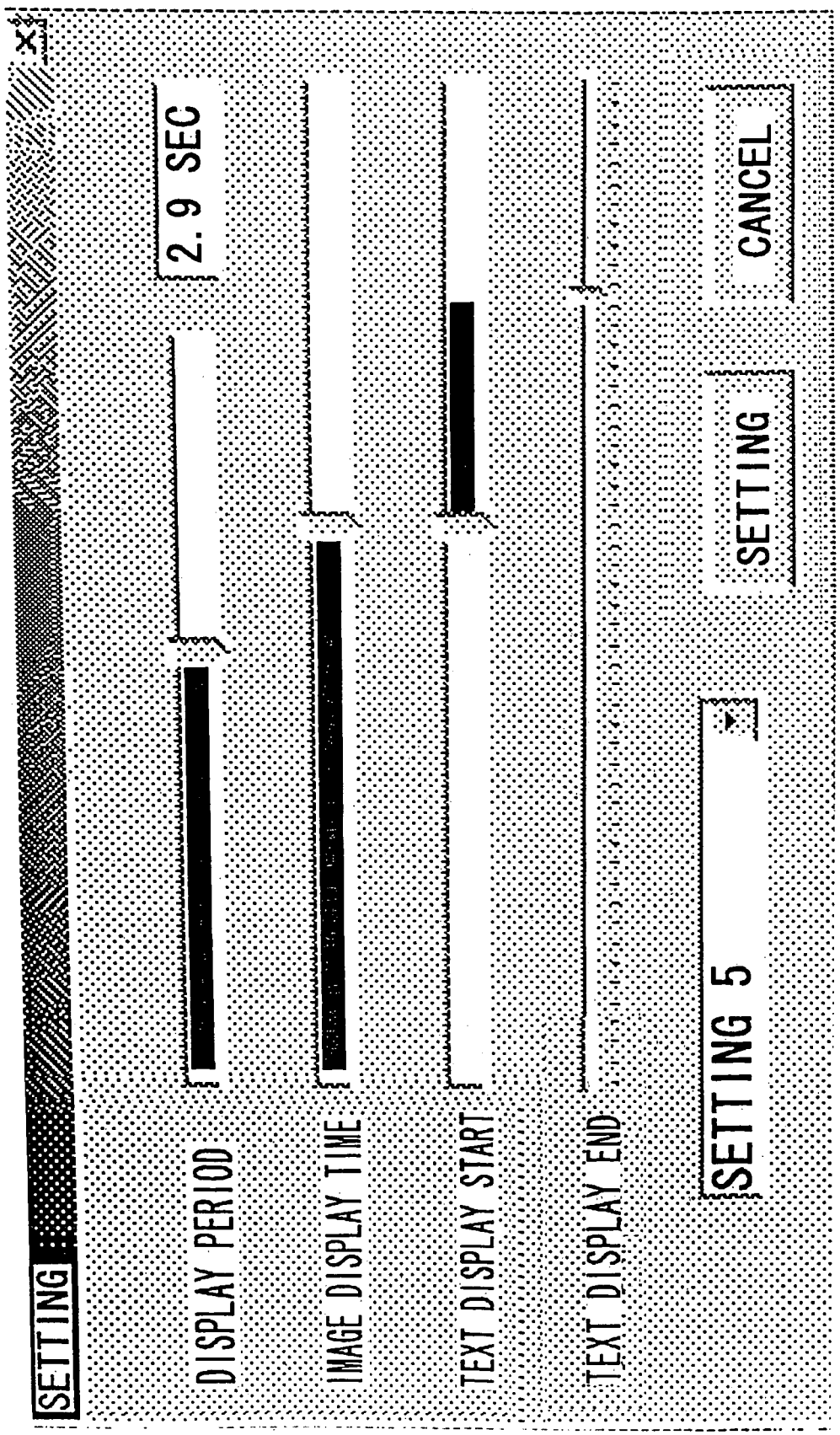
FIG. 58 is a diagram showing a screen in which condition 5 is set.

FIG. 58 is a diagram showing a screen in which condition 5 is set. In this specific example, the display cycle time is set to 2.9 sec, and other conditions are set as follows. An image is displayed for a period equal to 60% of the display cycle time, and text data is displayed for a period equal to 20% of the display cycle time following the image display period.

Figure 59:
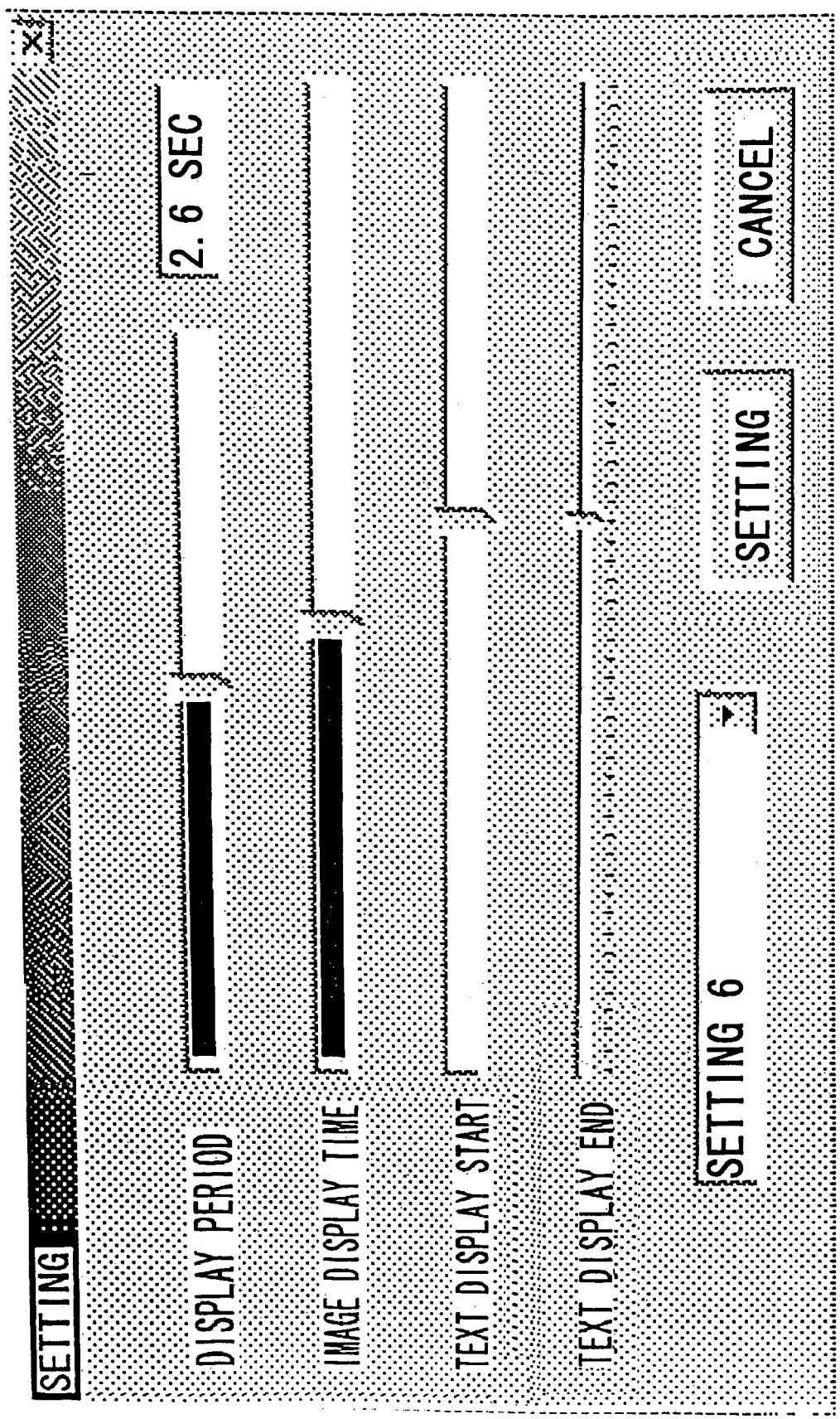
FIG. 59 is a diagram showing a screen in which condition 6 is set.

FIG. 59 is a diagram showing a screen in which condition 6 is set. The display cycle time is set to 2.6 sec, and an image is displayed for a period equal to 50% of the display cycle time. Text data is displayed for a very short period.

Figure 60:
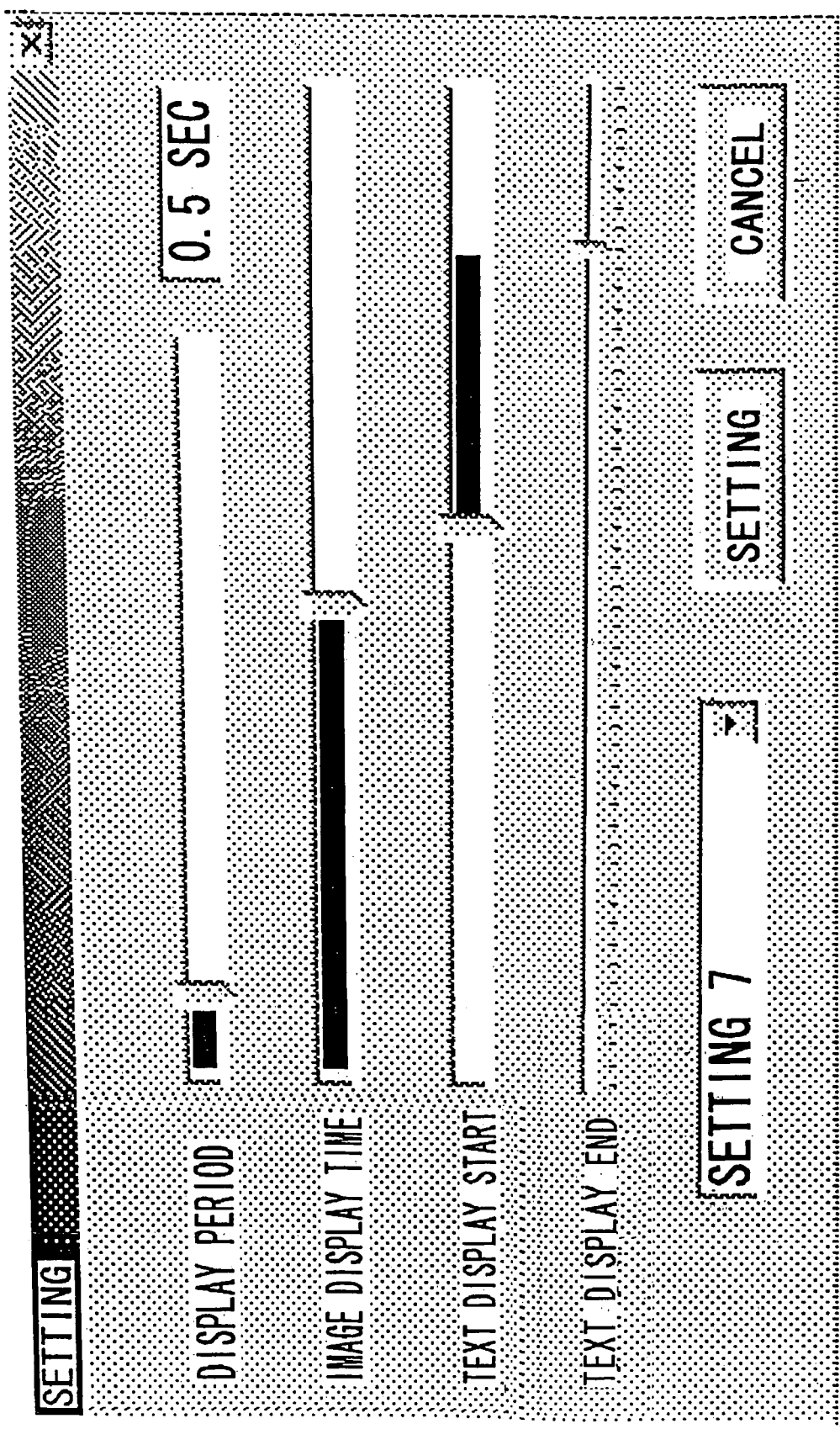
FIG. 60 is a diagram showing a screen in which condition 7 is set.

FIG. 60 is a diagram showing a screen in which condition 7 is set. The display cycle time is set to 0.5 sec. An image is displayed for a period equal to 50% of the display cycle time, and an image is displayed for a period equal to 20% of the display cycle time.

Figure 61:
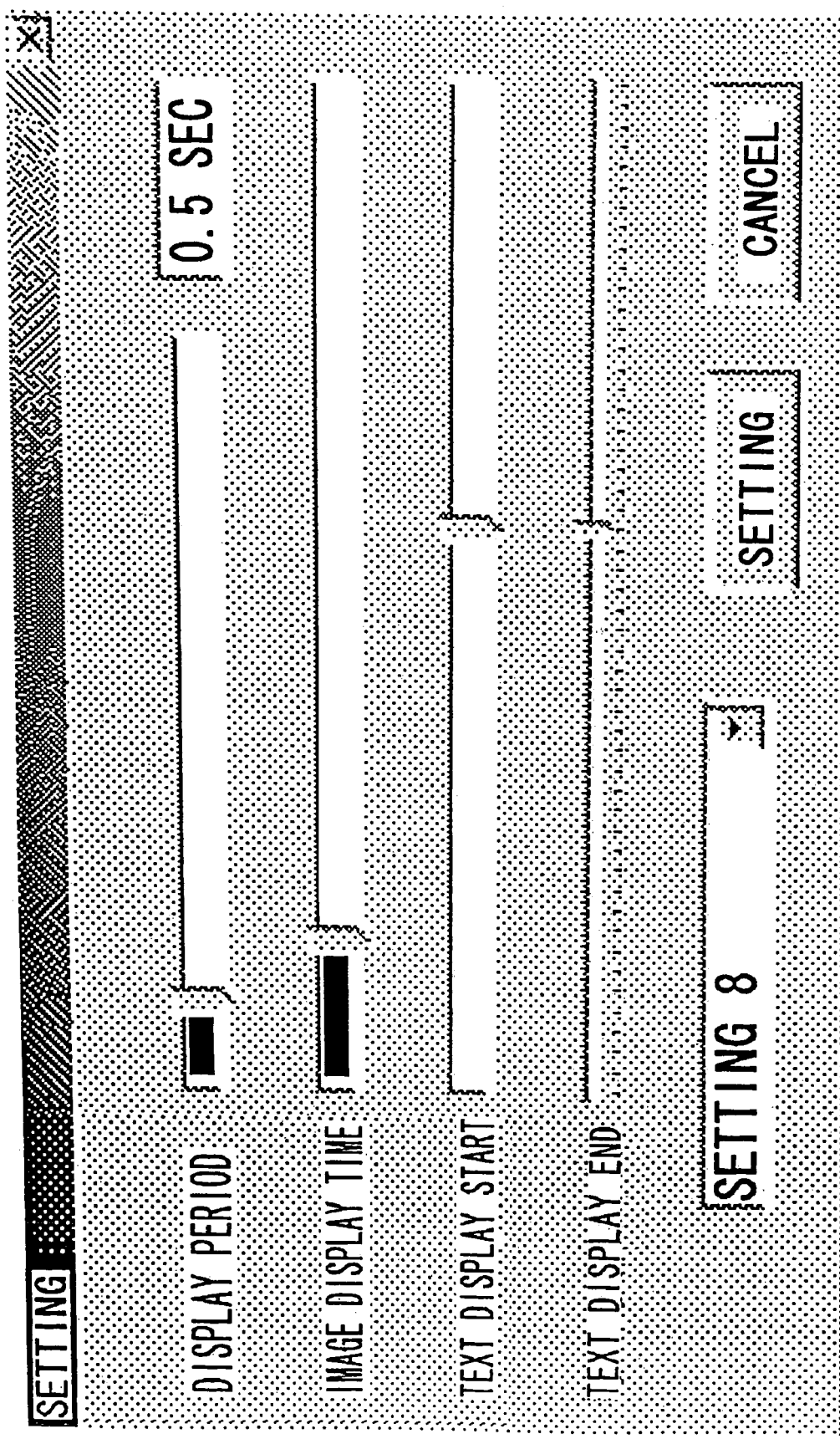
FIG. 61 is a diagram showing a screen in which condition 8 is set.

FIG. 61 is a diagram showing a screen in which condition 8 is set. The display cycle time is set to 0.5 sec. An image is displayed for a period equal to 10% of the display cycle time, and text data is displayed for a very short period.

Figure 62:
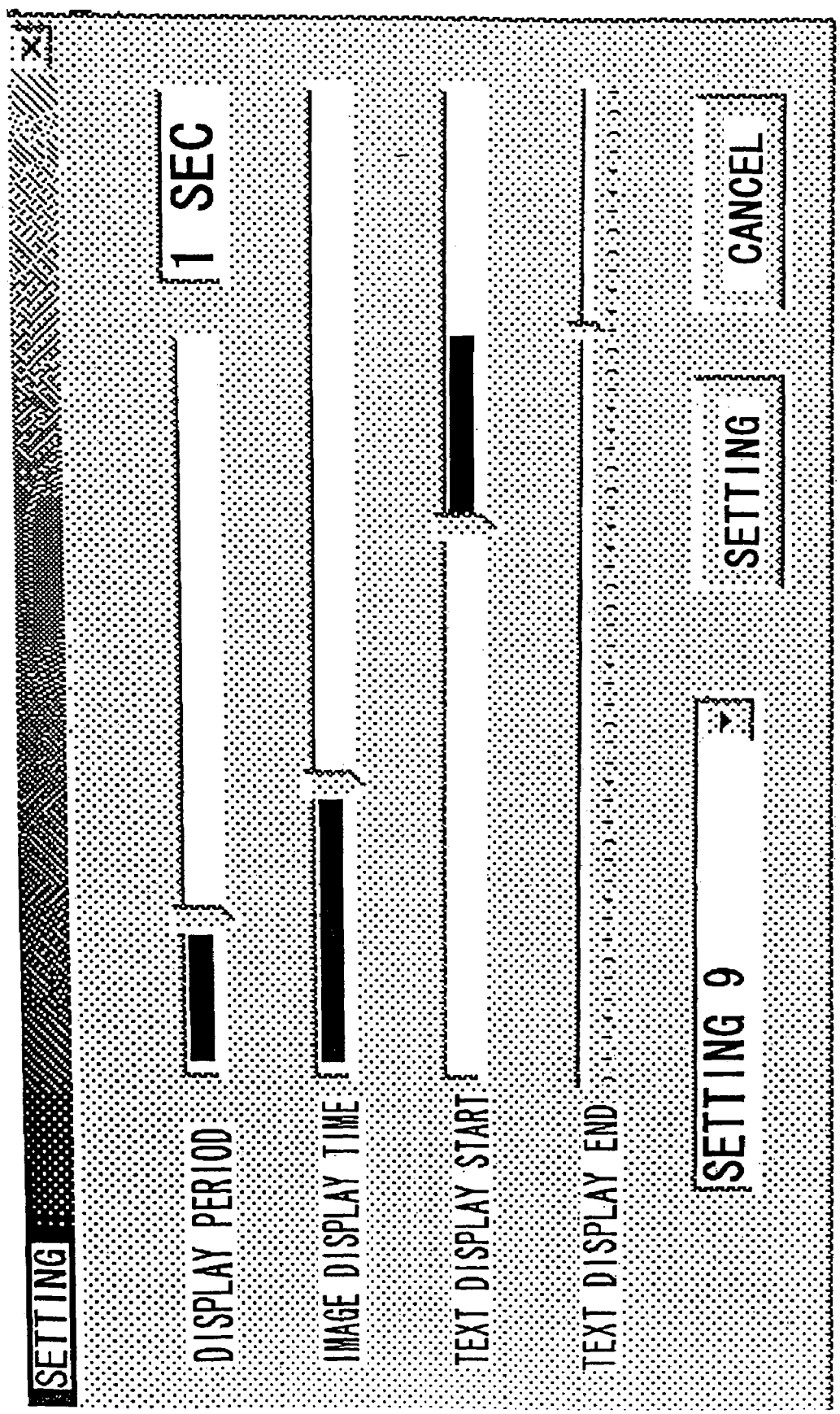
FIG. 62 is a diagram showing a screen in which condition 9 is set.

FIG. 62 is a diagram showing a screen in which condition 9 is set; The display cycle time is set to 1 sec. An image is displayed for a period equal to 30% of the display cycle time, and an image is displayed for a period equal to 20% of the display cycle time.

Although sets of conditions are defined as default, they can be modified by an operator. For example, conditions may be modified depending on the degree of acustomness of a user of the system or depending on the degree of progress in learning.

Although in the embodiments described above, it is assumed that a machine using basic software provided by Microsoft Corp. in the USA is used as the computer, another type of machine such as a personal digital assistance (PDA) device or a video game machine may be employed. In some cases in which a portable video game machine is employed, a music CD cannot be used to playback background music. In such a case, music data represented in mpg3 or a similar format may be used to playback background music. In a case in which a machine using Microsoft Windows is employed as the computer, a user of the computer may add images and store text data and/or voice data in relation with respective images thereby growing the image database in a customized manner. However, in a case in which a game machine is used as the computer, customization is limited, depending on the machine.

Although in the embodiments described above, images of animals or vehicles are displayed by example, the invention may be applied to learning of not only words representing concrete objects but also words representing abstract concepts. In learning languages using the system according to the present invention, when a word can correspond in many ways to images, a representative image is selected and the word is linked to the selected image. In the conventional technique of learning languages, a dictionary indicating correspondence between words in one language and words in another language is used. In contrast, the present method of assisting users to memorize or learn languages makes it possible to learn a plurality of languages via images rather than correspondence. Thus, in this method, learning is performed efficiently using not only the left-hand part of the human brain of user but also other parts.

As described above, the present invention has great advantages. That is, the present invention makes it possible to achieve a multimedia-based quick playback system. Furthermore, the invention also makes it possible to achieve a quick playback system in which combinations between voices and corresponding images are effectively used. The quick playback system according to the present invention makes it possible to memorize or learn languages using not only either one of the left-hand part and right-hand part of the human brain but using both parts and also using both conscious and subconscious activities of the brain.

What is claimed is:

1. A computer-assisted method of assisting a user of a computer to memorize, comprising the steps of:
   displaying an image indicating a content to be memorized, on a left-hand side of a computer screen for a predetermined period of time;
   displaying text data indicating language information related to the image displayed in the image displaying step, on a right-hand side of the computer screen for a predetermined period of time; and
   setting, by the user of the computer, an area overlap ratio indicating a degree of overlapping between an area in which images are displayed in the image displaying step and an area in which text data is displayed in the text data displaying step,
   wherein the image displaying step and the text data displaying step are performed repeatedly to successively display a plurality of images and text data thereby assisting the user of the computer to memorize, and wherein, once the setting step is performed by the user of the computer, displaying of the image in the image displaying step and displaying of the text data in the text data displaying step are performed in accordance with the overlap ratio set in the setting step.

2. The computer-assisted method of assisting a user to memorize, according to claim 1, further comprising a time parameter adjustment step of adjusting, by the user of the computer, a cycle time of repeatedly displaying images in the image displaying step, the length of an image display period during which each image is displayed in the image displaying step, the timing of starting displaying text data in the text data displaying step, and the length of a text display period during which text data is displayed in the text data displaying step, wherein once the adjustment in the time adjustment step is performed by the user of the computer, displaying of the image in the image displaying step and displaying of the text data in the text data displaying step are performed in accordance with conditions set in the time parameter adjustment step.

3. The computer-assisted method of assisting a user to memorize, according to claim 1, wherein the plurality of image data are stored in the form of a database;

the method further comprises the step of extracting image data categorized by synonym, antonym, grade, type, or the like; and the extracted image data are displayed in the steps performed repeatedly.

4. The computer-assisted method of assisting a user to memorize, according to claim 1, wherein a natural sound or music is played back when the method of assisting the user to memorize is being executed.

5. A computer program for causing the computer to execute the computer-assisted method of assisting a user to memorize according to one of claims 1, 2, 3, or 4.

6. The computer-assisted method of assisting a user to memorize according to one of claims 1, 2, 3, or 4, wherein the computer is included in a personal digital assistance (PDA) device, a game machine, or a similar device.

7. The computer-assisted method of assisting a user to memorize according to one of claims 1, 2, 3, or 4, further comprising an image data modification step performed by the user to add, change, and/or delete image data thereby allowing the user to modify the image data so as to adapt to progress of memorization.

8. A computer-assisted method of assisting a user of a computer to learn a language, comprising the steps of:

displaying an image indicating a content to be learned, on a left-hand side of a computer screen for a predetermined period of time;

displaying text data indicating language information related to the image displayed in the image displaying step, on a right-hand side of the computer screen for a predetermined period of time; and setting, by the user of the computer, an area overlap ratio indicating a degree of overlapping between an area in which images are displayed in the image displaying step and an area in which text data is displayed in the text data displaying step, wherein the image displaying step and the text data displaying step are performed repeatedly to successively display a plurality of images and text data thereby assisting the user of the computer to learn the language, and wherein, once the setting step is performed by the user of the computer, displaying of the image in the image displaying step and displaying of the text data in the text data displaying step are performed in accordance with the overlap ratio set in the setting step.

9. A computer-assisted method of assisting a user of a computer to learn a language, comprising the steps of:

displaying an image indicating a content to be learned, on a left-hand side of a computer screen for a predetermined period of time;

displaying text data indicating language information related to the image displayed in the image display displaying step, on a right-hand side of the computer screen for a predetermined period of time;

playing back a voice pronouncing the text data displayed in the text data displaying step; and setting, by the user of the computer, an area overlap ratio indicating a degree of overlapping between an area in which images are displayed in the image displaying step and an area in which text data is displayed in the text data displaying step, wherein the image displaying step, text data displaying step and voice playing back step are performed repeatedly to successively display a plurality of images and text data and play back voices thereby assisting the user of the computer to learn the language, and wherein, once the setting step is performed by the user of the computer, displaying of the image in the image displaying step and displaying of the text data in the text data displaying step are performed in accordance with the overlap ratio set in the setting step.

10. The computer-assisted method of assisting a user to learn a language, according to one of claims 8 and 9, further comprising a time parameter adjustment step of adjusting, by the user of the computer, a cycle time of repeatedly displaying images in the image displaying step, the length of an image display period during which each image is displayed in the image displaying step, the timing of starting displaying text data in the text data displaying step, and the length of a text display period during which text data is displayed in the text data displaying step, wherein once the adjustment in the time adjustment step is performed by the user of the computer, displaying of the image in the image displaying step and displaying of the text data in the text data displaying step are performed in accordance with the conditions set in the time adjustment step.

11. The computer-assisted method of assisting a user to learn a language, according to claim 9, further comprising a time parameter adjustment step of adjusting, by the user of the computer, a cycle time of repeatedly displaying images in the image displaying step, the length of an image display period during which each image is displayed in the image displaying step, the timing of starting displaying text data in the text data displaying step, the length of a text display period during which text data is displayed in the text data displaying step, and the timing of starting playing back the voice in the voice playing back step, wherein once the adjustment in the time adjustment step is performed by the user of the computer, displaying of the image in the image displaying step, displaying of the text data in the text data displaying step, and playback of the voice in the voice playing back step are performed in accordance with the conditions set in the time adjustment step.

12. The computer-assisted method of assisting a user to learn a language, according to claim 9, further comprising a voice playback speed adjustment step of adjusting, by the user of the computer, the speed of playing back the voice in the voice playing back step, wherein once the adjustment in the voice playback speed adjustment step is performed by the user of the computer, playback of the voice in the voice playing back step is performed in accordance with the condition set in the adjustment step.

13. The computer-assisted method of assisting a user to learn a language, according to claim 12, further comprising the step of playing back a natural sound or music such that the natural sound or music is superimposed on the voice played back at the adjusted speed in the voice playing back step.

14. The computer-assisted method of assisting a user to learn a language, according to one of claims 8 and 9, wherein
- the plurality of image data are stored in the form of a database for each language;
- the method further comprises the step of extracting image data categorized by synonym, antonym, grade, type, or the like; and
- the extracted image data are displayed in the steps performed repeatedly.

15. The computer-assisted method of assisting a user to learn a language, according to claim 8, wherein
- a natural sound or music is played back when the method of assisting the user to learn the language is being executed.

16. A computer program for causing the computer to execute the computer-assisted method of assisting a user to learn a language according to one of claims 8, 9, 11, 12, 13, or 15.

17. The computer-assisted method of assisting a user to learn a language according to one of claims 8, 9, 11, 12, 13, or 15, wherein the computer is included in a personal digital assistance (PDA) device, a game machine, or a similar device.

18. The computer-assisted method of assisting a user to learn a language according to one of claims 8, 9, 10, 11, 12, 13, or 15, further comprising
- an image data modification step performed by the user to add, change, and/or delete image data thereby allowing the user to modify the image data so as to adapt to progress in learning the language.

* * * * *